United States Patent
Han et al.

(10) Patent No.: US 11,228,376 B2
(45) Date of Patent: Jan. 18, 2022

(54) DEVICE AND METHOD FOR TRANSMITTING AND RECEIVING DATA ON BASIS OF SOUND SIGNAL IN WIRELESS COMMUNICATION SYSTEM

(71) Applicant: Samsung Electronics Co., Ltd., Gyeonggi-do (KR)

(72) Inventors: Kwang-Hoon Han, Gyeonggi-do (KR); Myoung-Hwan Lee, Gyeonggi-do (KR); Jang-Hee Lee, Gyeonggi-do (KR); Hee-Su Kim, Seoul (KR); Seong-Hee Park, Seoul (KR); Chil-Youl Yang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 774 days.

(21) Appl. No.: 16/065,977

(22) PCT Filed: Dec. 23, 2016

(86) PCT No.: PCT/KR2016/015202
§ 371 (c)(1),
(2) Date: Oct. 16, 2018

(87) PCT Pub. No.: WO2017/111545
PCT Pub. Date: Jun. 29, 2017

(65) Prior Publication Data
US 2019/0372678 A1 Dec. 5, 2019

(30) Foreign Application Priority Data
Dec. 24, 2015 (KR) .......................... 10-2015-0186385

(51) Int. Cl.
*H04W 4/80* (2018.01)
*H04B 11/00* (2006.01)
(Continued)

(52) U.S. Cl.
CPC ............ *H04B 11/00* (2013.01); *H04L 1/0007* (2013.01); *H04W 4/70* (2018.02); *H04W 4/80* (2018.02)

(58) Field of Classification Search
CPC ........... H04B 11/00; H04W 4/70; H04W 4/80
(Continued)

(56) References Cited

U.S. PATENT DOCUMENTS 7,260,221 B1 * 8/2007 Atsmon .............. H04M 1/2155
380/247
2006/0019605 A1 1/2006 Shau
(Continued)

FOREIGN PATENT DOCUMENTS

CN 102215042 10/2011
CN 102457332 5/2012
(Continued)

OTHER PUBLICATIONS

PCT/ISA/210 Search Report issued on PCT/KR2016/015202 (pp. 3).
(Continued)

*Primary Examiner* — April G Gonzales
(74) *Attorney, Agent, or Firm* — The Farrell Law Firm, P.C.

(57) ABSTRACT

Disclosed is a method by which a transmission device transmits data on the basis of a sound signal in a wireless communication system, the method including transmitting a sound packet corresponding to transmission data, with the sound packet including at least one sound symbol, the sound symbol including at least one sound sub-symbol, a plurality of sound symbol types are supported in the wireless communication system, and each of the plurality of sound symbol types is mapped to a preset data value.

20 Claims, 39 Drawing Sheets

(51) Int. Cl.
*H04W 4/70* (2018.01)
*H04L 1/00* (2006.01)

(58) Field of Classification Search
USPC .......................................................... 367/137
See application file for complete search history.

(56) References Cited

U.S. PATENT DOCUMENTS

| | | | | |
|---|---|---|---|---|
| 2006/0153389 | A1* | 7/2006 | Temerinac | H04H 20/88 381/2 |
| 2008/0304361 | A1 | 12/2008 | Peng et al. | |
| 2011/0249818 | A1* | 10/2011 | Sawada | H04W 52/367 381/2 |
| 2014/0015684 | A1* | 1/2014 | Ha | H04L 12/2825 340/679 |
| 2014/0089112 | A1* | 3/2014 | Argue | G06Q 20/327 705/16 |
| 2014/0274212 | A1* | 9/2014 | Zurek | G10L 25/48 455/563 |
| 2014/0355389 | A1 | 12/2014 | Reunamaki et al. | |
| 2015/0127228 | A1* | 5/2015 | Jeong | B60R 16/023 701/49 |
| 2015/0163336 | A1* | 6/2015 | Ramos | H04R 3/00 367/137 |
| 2015/0215734 | A1* | 7/2015 | Colangelo | H04W 4/023 455/456.3 |
| 2015/0219755 | A1* | 8/2015 | Borggaard | G01S 5/186 367/118 |
| 2015/0230043 | A1* | 8/2015 | Yakir | H04W 76/10 455/426.1 |
| 2015/0304789 | A1 | 10/2015 | Babayoff et al. | |

FOREIGN PATENT DOCUMENTS

| | | |
|---|---|---|
| CN | 203289452 | 11/2013 |
| CN | 103761540 | 4/2014 |
| CN | 104219784 | 12/2014 |
| CN | 104378124 | 2/2015 |
| CN | 104702344 | 6/2015 |
| CN | 104811250 | 7/2015 |
| CN | 104937660 | 9/2015 |
| JP | 2014220741 | 11/2014 |
| KR | 1020140004506 | 1/2014 |

OTHER PUBLICATIONS

PCT/ISA/237 Written Opinion issued on PCT/KR2016/015202 (pp. 5).
Chinese Office Action dated Jan. 19, 2021 issued in counterpart application No. 201680076259.1, 16 pages.
Hongwei Yao et al., "A Cell Phone Sign-in System based on Acoustic Authentication", Enterprise Technology Development, vol. 34, No. 12, Apr. 26, 2015, 2 pages.
Chinese Office Action dated Oct. 8, 2021 issued in counterpart application No. 201680076259.1, 15 pages.
Korean Office Action dated Nov. 23, 2021 issued in counterpart application No. 10-2015-0186385, 11 pages.

* cited by examiner

DEVICE AND METHOD FOR TRANSMITTING AND RECEIVING DATA ON BASIS OF SOUND SIGNAL IN WIRELESS COMMUNICATION SYSTEM

PRIORITY

This application is a U.S. National Phase entry of International Application No. PCT/KR2016/015202, which was filed on Dec. 23, 2016, and claims priority to Korean Patent Application No. 10-2015-0186385, which was filed on Dec. 24, 2015, the disclosure of each of which are incorporated herein by reference.

TECHNICAL FIELD

The present disclosure relates to devices and methods for transmitting and receiving data in wireless communication systems, and particularly, to devices and methods for transmitting and receiving data based on sound signals in wireless communication systems.

BACKGROUND ARTS

The Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-the-art medical services, through conversion or integration of existing IT technologies and various industries.

Communication between things nowadays expand its concept from machine-to-machine (M2M), which supports intelligent communication between a human being and a thing or between one thing and another based on a mobile communication network, to the Internet, rapidly evolving to enable mutual interworking with all the information in a virtual and real-life world as well as things. In other words, M2M, enabling real-time, intelligent communication between a human being and a thing or between things anytime, anywhere in a convenient manner, is expanding its realm to the Internet of Things (IoT) while connecting all ambient things via the Internet.

The IoT means technology in which various things are equipped with sensors and communication functions to connect to the Internet. Here, the term "things" may refer to various embedded systems (computing systems of electronic devices such as smartphones), e.g., home appliances, mobile devices, or wearable computers. IoT-connected things should be connected to the Internet based their own unique Internet protocol (IP) addresses for distinguishing therebetween and may have sensors for obtaining information from an external environment.

In particular, the recent sharp growth of IoT brings short-range communication, e.g., Bluetooth, schemes—especially, those supportive of Bluetooth low energy (BLE) mode—to significant attention. Generally, users are able to control BLE mode-applied devices using portable terminals, e.g., smartphones. More and more devices are coming up with BLE mode applicable.

Meanwhile, the above-described information is provided only as background information for a better understanding of the present disclosure. No determinations and claims are made as to whether what has been described in this section may be applicable as the prior art related to the present disclosure.

SUMMARY

According to an embodiment of the present disclosure, there are proposed a device and method for transmitting and receiving data based on sound signals in a wireless communication system.

According to an embodiment of the present disclosure, there are also proposed a device and method for transmitting and receiving data based on sound signals in a wireless communication system, considering space.

According to an embodiment of the present disclosure, there are also proposed a device and method for transmitting and receiving data based on sound signals in a wireless communication system, considering distance.

According to an embodiment of the present disclosure, there are also proposed a device and method for transmitting and receiving data based on sound signals in a wireless communication system, which enhance security capabilities.

According to an embodiment of the present disclosure, there are also proposed a device and method for transmitting and receiving data based on sound signals in a wireless communication system, which give differentiated reception capabilities depending on spaces.

According to an embodiment of the present disclosure, there are also proposed a device and method for transmitting and receiving data based on sound signals in a wireless communication system, which give differentiated reception capabilities depending on distances.

As a method proposed according to an embodiment of the present disclosure, a method for transmitting data based on a sound signal, by a transmitting device, in a wireless communication system, may comprise transmitting a sound packet corresponding to transmission data, wherein the sound packet includes at least one sound symbol, and the sound symbol includes at least one sound sub symbol, wherein the wireless communication system is configured to support multiple sound symbol types, and wherein each of the multiple sound symbol types is mapped to a preset data value.

As another method proposed according to an embodiment of the present disclosure, a method for receiving data based on a sound signal, by a receiving device, in a wireless communication system may comprise receiving a sound packet corresponding to transmission data, wherein the sound packet includes at least one sound symbol, and the sound symbol includes at least one sound sub symbol, wherein the wireless communication system is configured to support multiple sound symbol types, and wherein each of the multiple sound symbol types is mapped to a preset data value.

As a device proposed according to an embodiment of the present disclosure, a transmitting device in a wireless communication system may comprise a transceiver configured to transmit a sound packet corresponding to transmission data, wherein the sound packet includes at least one sound symbol, and the sound symbol includes at least one sound sub symbol, wherein the wireless communication system is configured to support multiple sound symbol types, and wherein each of the multiple sound symbol types is mapped to a preset data value.

As another device proposed according to an embodiment of the present disclosure, a receiving device in a wireless communication system may comprise a transceiver configured to receive a sound packet corresponding to transmission data, wherein the sound packet includes at least one sound symbol, and the sound symbol includes at least one sound sub symbol, wherein the wireless communication system is configured to support multiple sound symbol types, and wherein each of the multiple sound symbol types is mapped to a preset data value.

Other aspects, advantages, and core features of the present disclosure will be apparent to one of ordinary skill in the art from the following detailed description of exemplary embodiments of the present disclosure, taken into conjunction with the drawings.

Prior to going into the detailed description of the disclosure, it might be effective to define particular words and phrases as used herein. As used herein, the words "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of" As used herein, the word "controller" may mean any device, system, or part thereof controlling at least one operation. The device may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

An embodiment of the present disclosure enables transmission and reception of data based on sound signals in a wireless communication system.

An embodiment of the present disclosure enables transmission and reception of data based on sound signals in a wireless communication system, considering space.

An embodiment of the present disclosure enables transmission and reception of data based on sound signals in a wireless communication system, considering distance.

An embodiment of the present disclosure enables transmission and reception of data based on sound signals in a wireless communication system, which enhance security capabilities.

An embodiment of the present disclosure enables transmission and reception of data based on sound signals in a wireless communication system, which give differentiated reception capabilities depending on spaces.

An embodiment of the present disclosure enables transmission and reception of data based on sound signals in a wireless communication system, which give differentiated reception capabilities depending on distances.

BRIEF DESCRIPTION OF DRAWINGS

The above and other aspects, features, and advantages of certain embodiments of the present disclosure will be more apparent from the following description taken in conjunction with the accompanying drawings, in which.

It should be noted that the same or similar reference denotations may be used to refer to the same or similar elements, features, or structures throughout the drawings.

DETAILED DESCRIPTION OF THE DISCLOSURE

Figure 1:
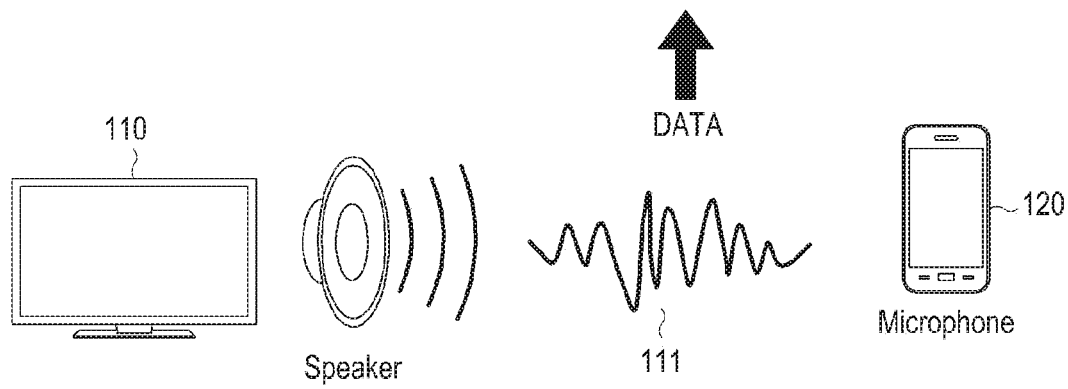
FIG. 1 is a view schematically illustrating a process of transmitting and receiving data based on sound signals in a wireless communication system according to an embodiment of the present disclosure.

The following detailed description taken in conjunction with the accompanying drawings is provided for a comprehensive understanding of various embodiments of the present disclosure which are defined by the appended claims or equivalents thereof. However, various particular matters set forth below in the detailed description should be regarded simply as examples. Hence, it should be appreciated by one of ordinary skill in the art that various changes or modifications may be made to the embodiments without departing from the spirit or scope of the present disclosure. Known functions and components related to the present disclosure may be excluded from the description for clarity and brevity.

The terms and words used herein should not be interpreted as limited to their literal meanings, and it should be noted that they are rather provided merely for a clear and consistent understanding of the present disclosure. Thus, it is apparent to one of ordinary skill in the art that the detailed description of various embodiments of the present disclosure is intended for description purposes alone, but not for limiting the subject matter of the present disclosure defined by the appended claims and equivalents thereof.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. Such terms as those generally defined in the dictionary should be appreciated to be consistent with contextual meanings of relevant technology.

According to an embodiment of the present disclosure, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the present disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the present disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the present disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the present disclosure, an electronic device may be a combination of the above-listed devices. It should be appreciated by one of ordinary skill in the art that the electronic device is not limited to the above-described devices.

According to an embodiment of the present disclosure, the transmitting device and the receiving device may be, e.g., electronic devices.

According to an embodiment of the present disclosure, there are proposed a device and method for transmitting and receiving data based on sound signals in a wireless communication system.

According to an embodiment of the present disclosure, there are also proposed a device and method for transmitting and receiving data based on sound signals in a wireless communication system, considering space.

According to an embodiment of the present disclosure, there are also proposed a device and method for transmitting and receiving data based on sound signals in a wireless communication system, considering distance.

According to an embodiment of the present disclosure, there are also proposed a device and method for transmitting and receiving data based on sound signals in a wireless communication system, which enhance security capabilities.

According to an embodiment of the present disclosure, there are also proposed a device and method for transmitting and receiving data based on sound signals in a wireless communication system, which give differentiated reception capabilities depending on spaces.

According to an embodiment of the present disclosure, there are also proposed a device and method for transmitting and receiving data based on sound signals in a wireless communication system, which give differentiated reception capabilities depending on distances.

Meanwhile, apparatuses and methods as proposed as proposed according to embodiments of the present disclosure may be applicable to various communication systems, such as long-term evolution (LTE) mobile communication systems, long-term evolution-advanced (LTE-A) mobile communication systems, licensed-assisted access (LAA)-LTE mobile communication system, high speed downlink packet access (HSDPA) mobile communication systems, high speed uplink packet access (HSUPA) mobile communication systems, 3rd generation project partnership 2 (3GPP2) high rate packet data (HRPD) mobile communication systems, 3GPP2 wideband code division multiple access (WCDMA) mobile communication systems, 3GPP2 code division multiple access (CDMA) mobile communication systems, Institute of electrical and electronics engineers (IEEE) 802.16m communication systems, IEEE 802.16e communication system, evolved packet systems (EPSs), mobile Internet protocol (Mobile IP) systems, digital multimedia broadcast (DMB) services, portable digital video broadcasting-handheld (DVP-H) and advanced television systems committee-mobile/handheld (ATSC-M/H) services or other mobile broadcast services, internet protocol television (IPTV) services or other digital video broadcast systems, and moving picture experts group (MPEG) media transport (MMT) systems or other various communication systems.

The recent sharp growth of IoT brings short-range communication, e.g., Bluetooth, schemes—especially, those supportive of Bluetooth low energy (BLE) mode—to significant attention. Generally, users are able to control BLE mode-applied devices using portable terminals, e.g., smartphones. More and more devices are coming up with BLE mode applicable.

As such, flourishing BLE mode-applied devices lead to a demand for transmitting and receiving data considering spaces differentiated based on distances. Such demand is described below in detail.

(1) Wireless communication systems demand more beacon signals, making it more important to identify whether a device is present in the same space as other devices.

(2) For wireless communication systems, it matters to transmit and receive authentication codes and security codes for authentication processes and security processes among devices. Considering such authentication and security processes, it may thus be critical to differentiate between spaces based on distances.

(3) For wireless communication systems, the need arises for limiting transmission and reception of data only to devices existing in the same space, and given this, it might be of significance to differentiate between spaces based on distances.

(4) Wireless communication systems may be subject to the need for differentiating between reception capabilities depending on distances even when the devices are present in the same space. Given this, it might be material to differentiate between spaces based on distances.

Various reasons as set forth above lead to the need for a scheme to identify whether corresponding devices exist in the same space in a wireless communication system and to enable differentiated data transmission and reception operations depending on distances.

Accordingly, according to an embodiment of the present disclosure, there is proposed a scheme for checking whether corresponding devices are present in the same space based on sound signals.

Also proposed herein is a scheme for transmitting and receiving data, e.g., personal identification number (PIN) codes, based on sound signals.

Proposed as well is a scheme for differentiating transmission and reception capabilities depending on inter-device distances based on sound signals according to an embodiment of the present disclosure.

There is also proposed a scheme for measuring inter-device distances based on sound signals according to an embodiment of the present disclosure.

Described below with reference to FIG. 1 is a process for transmitting and receiving data based on sound signals in a wireless communication system according to an embodiment of the present disclosure.

FIG. 1 is a view schematically illustrating a process of transmitting and receiving data based on sound signals in a wireless communication system according to an embodiment of the present disclosure.

Referring to FIG. 1, in the wireless communication system, a first device, e.g., a TV 110, transmits data to a second device, e.g., a smartphone 120, based on a sound signal (step 111). Here, the smartphone 120 may detect whether the smartphone 120 is present in the same space as the TV 110 based on the sound signal, and the TV 110 may transmit various data based on the sound signal.

A process for transmitting and receiving data based on a sound signal in a wireless communication system has been described with reference to FIG. 1. Next described with reference to FIG. 2 is a process for differentiating transmission and reception capabilities depending on distances based on a sound signal in a wireless communication system according to an embodiment of the present disclosure.

Figure 2:
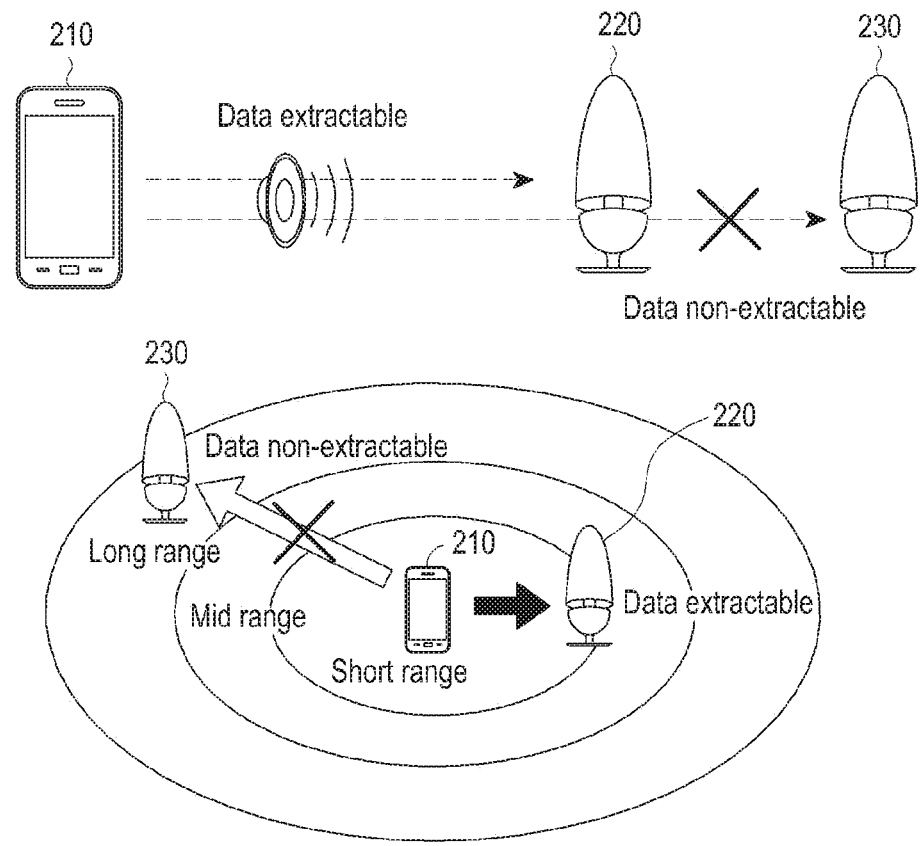
FIG. 2 is a view schematically illustrating a process of differentiating transmission capabilities and reception capabilities depending on distances based on sound signals in a wireless communication system according to an embodiment of the present disclosure.

FIG. 2 is a view schematically illustrating a process of differentiating transmission capabilities and reception capabilities depending on distances based on sound signals in a wireless communication system according to an embodiment of the present disclosure.

Referring to FIG. 2, 'short range' indicates a distance not more than a preset first threshold distance from a first device, e.g., a smartphone 210, 'mid range' indicates a distance more than the first threshold and not more than a preset second threshold distance from the smartphone 210, and 'long range' indicates a distance more than the second threshold distance from the smartphone 210. Here, the first threshold distance and the second threshold distance each may adequately be set to fit the context of the smartphone 210 or the wireless communication system, and a detailed description thereof is omitted.

The first device, e.g., the smartphone 210, may transmit data based on a sound signal so that only devices present within the short range from the smartphone 210 may receive the data from the smartphone 210. FIG. 2 assumes that a second device 220 is present within the short range from the smartphone 210. Thus, the second device 220 may receive data transmitted from the smartphone 210.

Meanwhile, a third device 230 is assumed to be located within the long range from the smartphone 210. Thus, the third device 230 cannot receive data transmitted from the smartphone 210.

A process for differentiating transmission and reception capabilities based on a sound signal in a wireless communication system has been described with reference to FIG. 2. Next described with reference to FIG. 3 is a sound transmission process for transmitting data in a wireless communication system according to an embodiment of the present disclosure.

Figure 3:
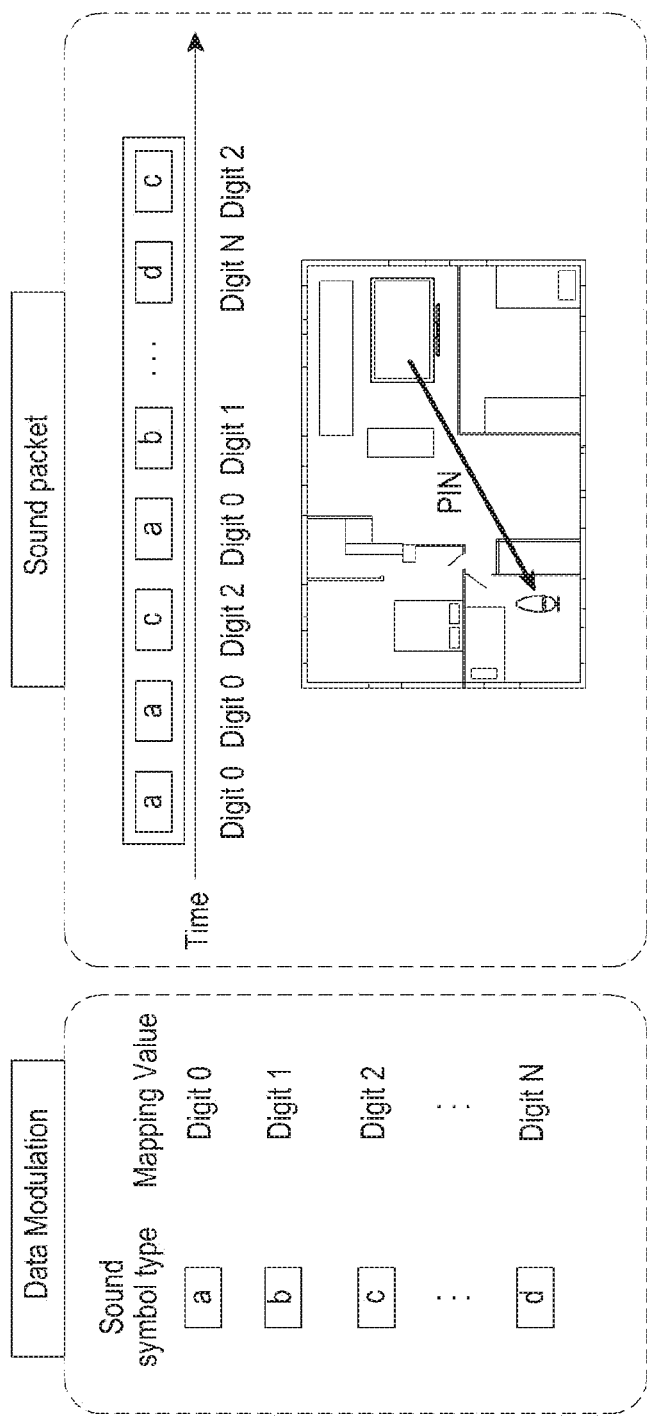
FIG. 3 is a view schematically illustrating a sound signal transmission process for transmitting data in a wireless communication system according to an embodiment of the present disclosure.

FIG. 3 is a view schematically illustrating a sound signal transmission process for transmitting data in a wireless communication system according to an embodiment of the present disclosure.

Referring to FIG. 3, assuming that there are a total of N+1 data values, e.g., mapping values, as supportable in the wireless communication system, the total number of sound symbol types should also be N+1. As an example, under the assumption that there are N+1 mapping values as supportable in the wireless communication system as shown in FIG. 3, the number of sound symbol types should be N+1 as well. For example, symbol type a, symbol type b, symbol type c, and symbol type d are mapped to mapping value digit 0, mapping value digit 1, mapping value digit 2, and mapping value digit N, respectively.

Meanwhile, sound symbol denotes the minimum unit for data transmission used in the wireless communication system, and one sound symbol includes multiple sound sub symbols. Here, the type of a sound symbol may be represented as a combination of the sub symbols contained in the sound symbol. Further, a sub symbol may be a particular waveform which is the minimum unit for the receiving device to receive and detect on the time axis.

Further, a sound packet includes multiple sound symbols; for example, where the transmitting device sends out its PIN code, it may transmit the PIN code through the sound packet.

As an example, where the PIN code of the transmitting device is 00201 . . . N2 as shown in FIG. 3, the transmitting device may send its PIN code by transmitting a sound packet such as aacab . . . dc.

As such, since the transmitting device transmits data based on sound signals, only receiving devices present in the same space as the transmitting device may receive the data from the transmitting device.

Further, according to the number of sound symbol types supportable, the data transmission capability of the transmitting device increases, and the data reception capability of the receiving device increases.

A sound signal transmission process for transmitting data in a wireless communication system according to an embodiment of the present disclosure has been described with reference to FIG. 3. Then described with reference to FIG. 4 is the data reception capability as per distances in a wireless communication system according to an embodiment of the present disclosure.

Figure 4:
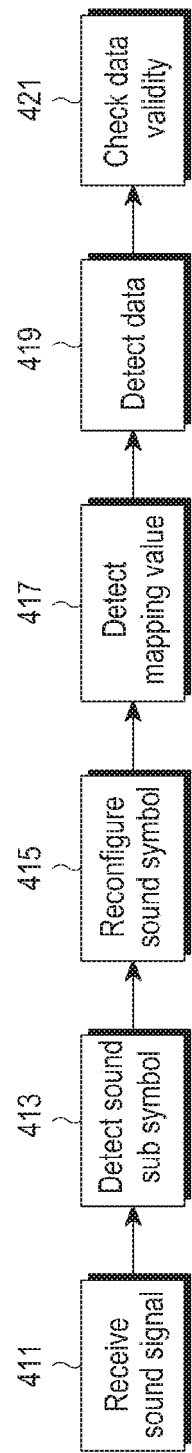
FIG. 4 is a view schematically illustrating data reception capabilities depending on distances in a wireless communication system according to an embodiment of the present disclosure.

FIG. 4 is a view schematically illustrating data reception capabilities depending on distances in a wireless communication system according to an embodiment of the present disclosure.

Referring to FIG. 4, the receiving device receives a sound signal through a microphone (step 411) and detects sound sub symbols based on the sound signal received through the microphone (step 413). The receiving device reconfigures the sound symbol based on the sound sub symbols so detected (step 415) and detects the mapping value based on the produced sound symbol (step 417).

The receiving device detects data corresponding to the sound packet based on the detected mapping value (step 419) and checks the validity of the data (step 421). Here, the data validity may be checked by a cyclic redundancy check (CRC) procedure or feedback procedure, which are excluded from the detailed description.

The data reception capability depending on distances in a wireless communication system has been described with reference to FIG. 4. Next described with reference to FIG. 5 is a process for differentiating spaces by varying the sound sub symbol length in a wireless communication system according to an embodiment of the present disclosure.

Figure 5:
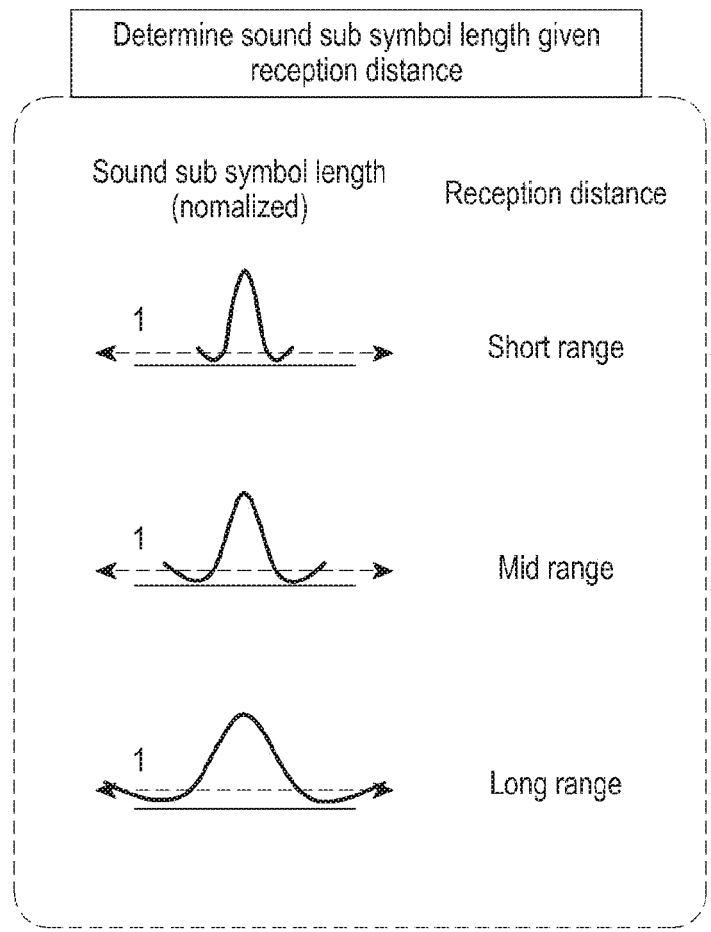
FIG. 5 is a view schematically illustrating a process of differentiating spaces by varying the sound symbol length in a wireless communication system according to an embodiment of the present disclosure.

FIG. 5 is a view schematically illustrating a process of differentiating spaces by varying the sound symbol length in a wireless communication system according to an embodiment of the present disclosure.

Referring to FIG. 5, the sound sub symbol length has a correlation with the data reception length which is a distance within which the receiving device is able to receive sound sub symbols transmitted from the transmitting device. As the sound sub symbol length reduces, the data reception distance decreases, and conversely, as the sound sub symbol length increases, the data reception distance increases.

FIG. 5 assumes that, e.g., three sound sub symbol lengths, e.g., a first sound sub symbol length, a second sound sub symbol length, and a third sound sub symbol length, are supported in the wireless communication system.

The first sound sub symbol length represents the length of sound sub symbols that may be received only by receiving devices present within a short range from the transmitting device. Here, the short range indicates a distance not more than a preset first threshold distance from the transmitting device, for example.

The second sound sub symbol length represents the length of sound sub symbols that may be received only by receiving devices present within a mid range from the transmitting device. Here, the mid range indicates a distance more than the first threshold distance and not more than a preset second threshold distance from the transmitting device, for example.

The third sound sub symbol length represents the length of sound sub symbols that may be received only by receiving devices present within a long range from the transmitting device. Here, the long range indicates a distance more than the second threshold distance from the transmitting device, for example.

Meanwhile, a parameter for determining the sound sub symbol length may be the number of sub-sub symbols contained in the sound sub symbol or the length of sub symbols contained in the sound sub symbol.

A process for differentiating spaces by varying the sound sub symbol length in a wireless communication system according to an embodiment of the present disclosure has been described with reference to FIG. 5. Next described with reference to FIG. 6 is a process for varying the sound symbol length in a wireless communication system according to an embodiment of the present disclosure.

Figure 6:
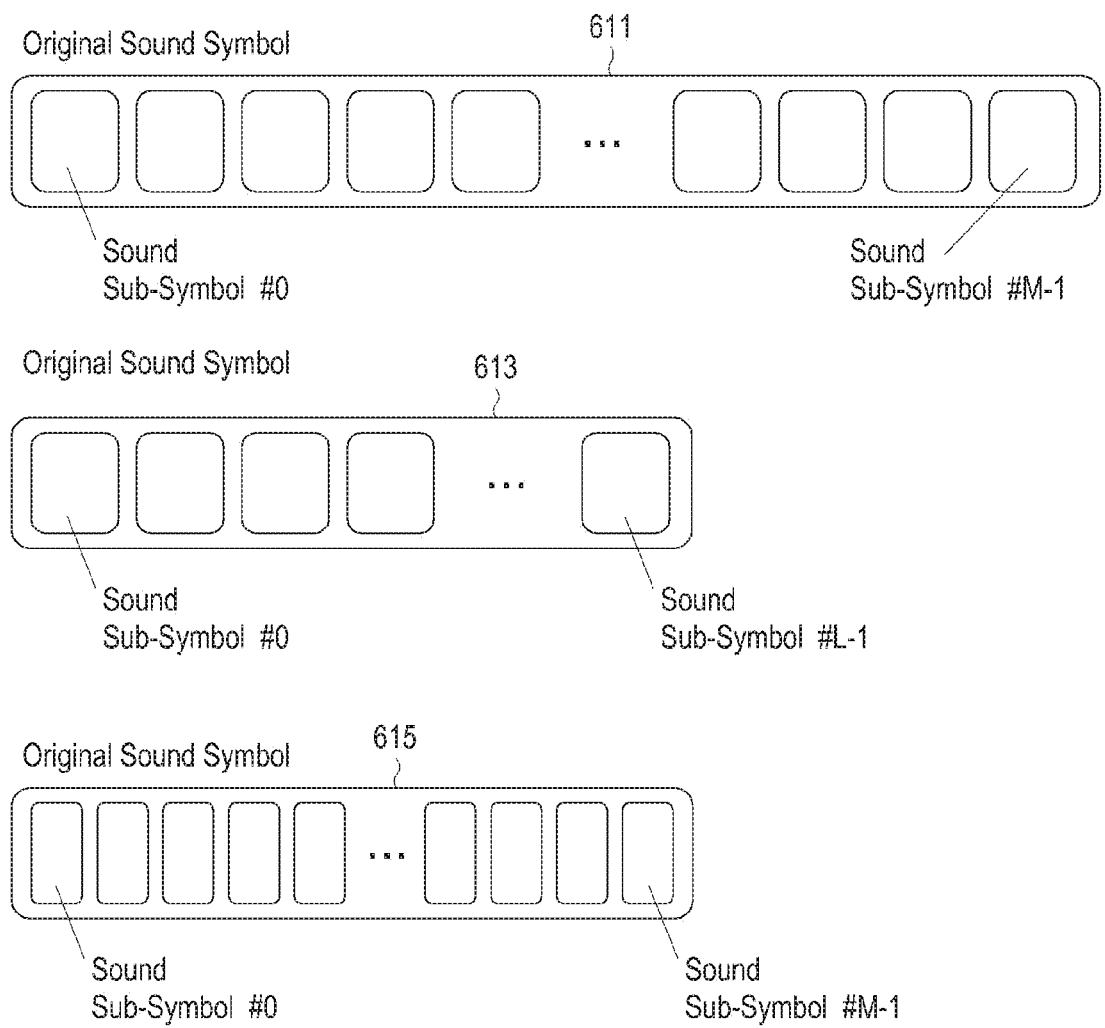
FIG. 6 is a view schematically illustrating a process of varying the sound symbol length in a wireless communication system according to an embodiment of the present disclosure.

FIG. 6 is a view schematically illustrating a process of varying the sound symbol length in a wireless communication system according to an embodiment of the present disclosure.

Referring to FIG. 6, an original sound symbol 611 includes, e.g., M sound sub symbols, e.g., sound sub symbol #0 through sound sub symbol #M−1.

Accordingly, the length of the original sound symbol 611 is shortened by reducing the number of sound sub symbols contained in the original sound symbol 611. As an example, the original sound symbol 611 contains a total of M sound sub symbols. The length of the original sound symbol 611 is shortened by including less than M sound sub symbols in the original sound symbol 611. FIG. 6 illustrates a sound symbol 613 containing a total of L sound sub symbols, e.g., sound sub symbol #0 through sound sub symbol #L−1.

As set forth above, shortening the length of the original sound symbol 611 may be achieved by reducing the number of sound sub symbols contained in the original sound symbol 611 or the length of the sound sub symbols contained in the original sound symbol 611. As an example, the original sound symbol 611 may contain a total of M sound sub symbols each having a length of P. The length of the original sound symbol 611 may be shortened by making the length of the sound sub symbols contained in the original sound symbol 611 smaller than P. FIG. 6 illustrates a sound symbol 615 including a total of M sound sub symbols smaller in length than P.

A process for varying the sound symbol length in a wireless communication system according to an embodiment of the present disclosure has been described with reference to FIG. 6. Now described with reference to FIG. 7 is an example of a process for producing a sound packet in a wireless communication system according to an embodiment of the present disclosure.

Figure 7:
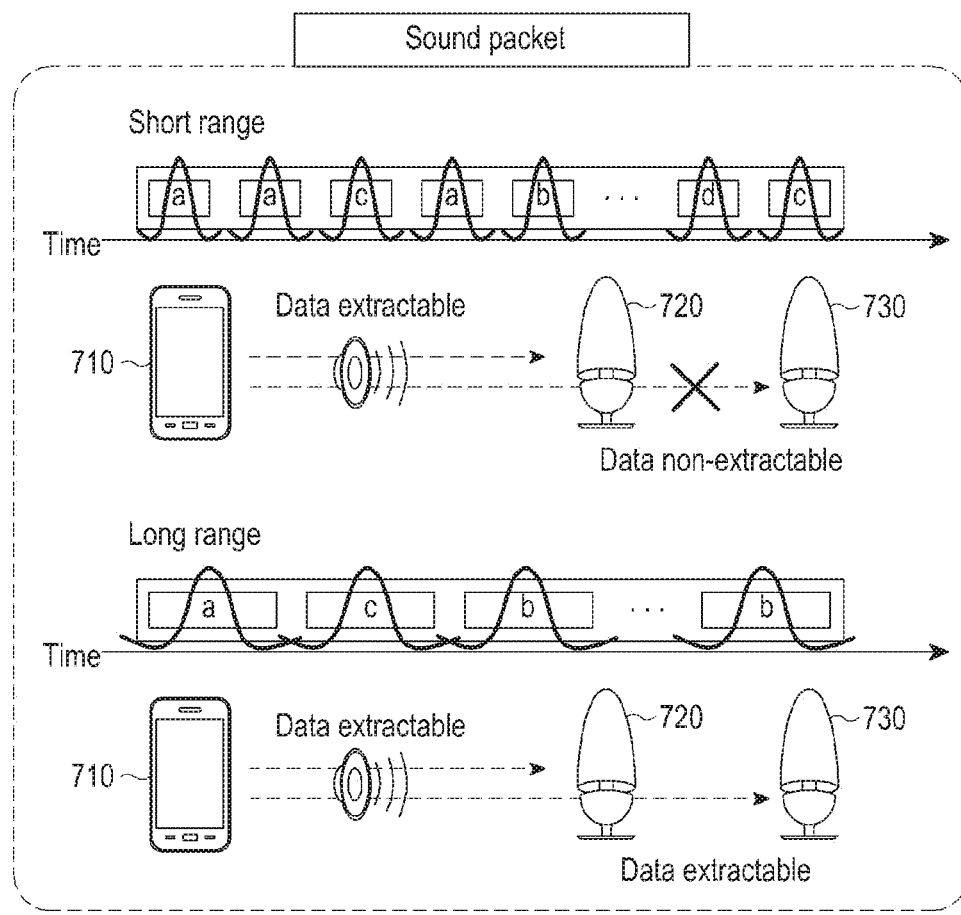
FIG. 7 is a view schematically illustrating an example of a process of producing a sound packet in a wireless communication system according to an embodiment of the present disclosure.

FIG. 7 is a view schematically illustrating an example of a process of producing a sound packet in a wireless communication system according to an embodiment of the present disclosure.

Referring to FIG. 7, a first device, e.g., a smartphone 710, may send out short range sound packets to allow only devices present within a short range from the smartphone 710 to receive data. Here, the short range may be set depending on the context of the smartphone 710 or the wireless communication system, and no detailed description thereof is given. FIG. 7 assumes that a second device 720 is located within the short range from the smartphone 710. Thus, the second device 720 may receive short range sound packets from the smartphone 710 and may accordingly extract data corresponding to the short range sound packets.

Meanwhile, since a third device 730 is located in a long range from the smartphone 710, the third device 730 cannot receive short range sound packets from the smartphone 710, thus failing to extract data corresponding to the short range sound packets.

Meanwhile, the smartphone 710 may send out long range sound packets so that devices present within the long range from the smartphone 710 may also receive data from the smartphone 710. Here, the long range may be set depending on the context of the smartphone 710 or the wireless communication system, and no detailed description thereof is given. Accordingly, the second device 720 and the third device 730 both may receive long range sound packets from the smartphone 710 and may thus extract data corresponding to the long range sound packets.

An example of a process for producing sound packets in a wireless communication system according to an embodiment of the present disclosure has been described above with reference to FIG. 7. Now described with reference to FIG. 8 is a process for differentiating spaces by varying the volume of the sound sub symbol in a wireless communication system according to an embodiment of the present disclosure.

Figure 8:
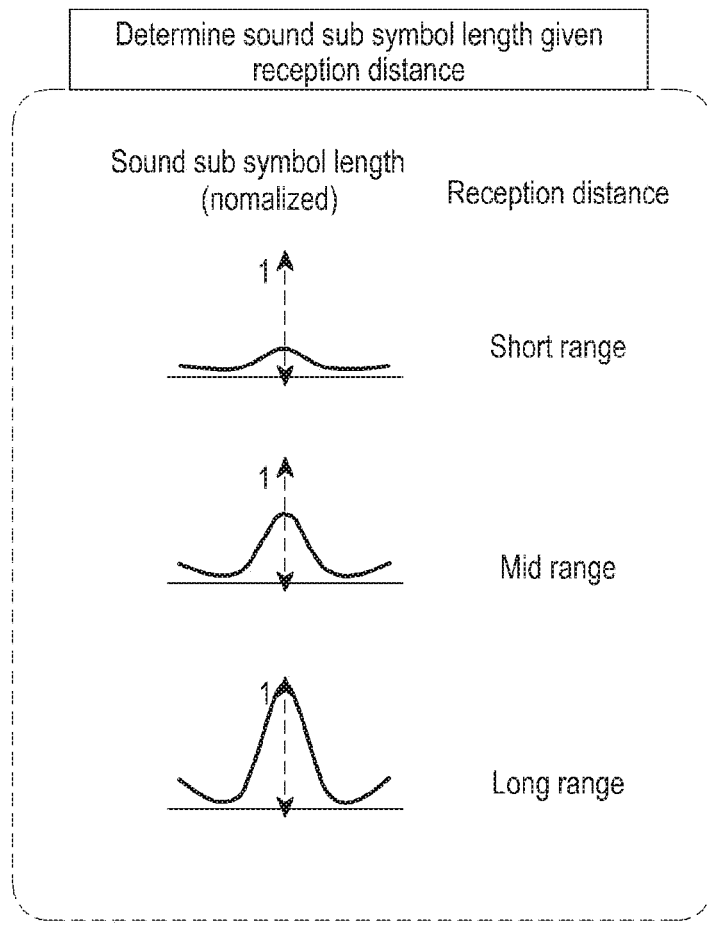
FIG. 8 is a view schematically illustrating a process of differentiating spaces by varying the sound symbol volume in a wireless communication system according to an embodiment of the present disclosure.

FIG. 8 is a view schematically illustrating a process of differentiating spaces by varying the volume of sound sub symbol in a wireless communication system according to an embodiment of the present disclosure.

Referring to FIG. 8, the volume of sound sub symbol has a correlation with the data reception length which is a distance within which the receiving device is able to receive sound sub symbols transmitted from the transmitting device. As an example, as the sound sub symbol volume increases, the data reception distance lengthens, and conversely, as the sound sub symbol volume decreases, the data reception distance shortens.

FIG. 8 assumes that, e.g., three sound sub symbol volumes, e.g., a first sound sub symbol volume, a second sound sub symbol volume, and a third sound sub symbol volume, are supported in the wireless communication system.

The first sound sub symbol volume represents the volume of sound sub symbols that may be received only by receiving devices present within a short range from the transmitting device. Here, the short range indicates a distance not more than a preset first threshold distance from the transmitting device, for example.

The second sound sub symbol volume represents the volume of sound sub symbols that may be received only by receiving devices present within a mid range from the transmitting device. Here, the mid range indicates a distance more than the first threshold distance and not more than a preset second threshold distance from the transmitting device, for example.

The third sound sub symbol volume represents the volume of sound sub symbols that may be received only by receiving devices present within a long range from the transmitting device. Here, the long range indicates a distance more than the second threshold distance from the transmitting device, for example.

A process for differentiating spaces by varying the sound sub symbol volume in a wireless communication system according to an embodiment of the present disclosure has been described with reference to FIG. 8. Now described with reference to FIG. 9 is another example of a process for producing a sound packet in a wireless communication system according to an embodiment of the present disclosure.

Figure 9:
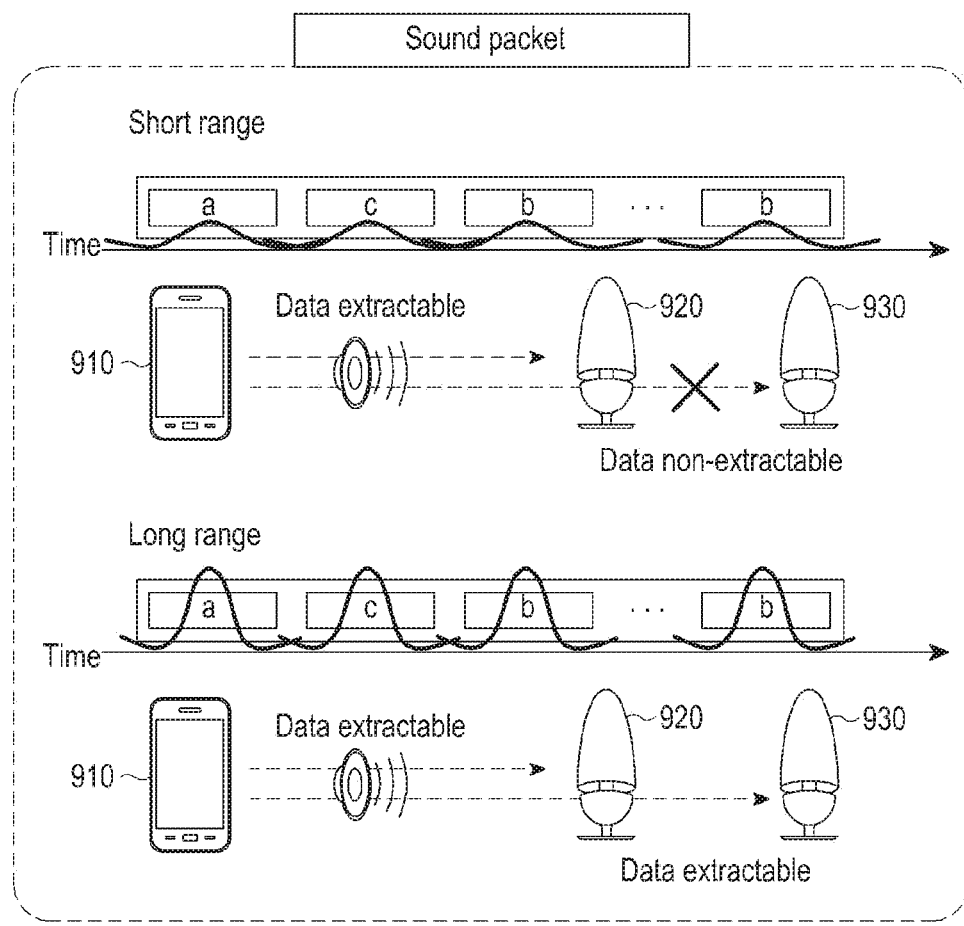
FIG. 9 is a view schematically illustrating another example of a process of producing a sound packet in a wireless communication system according to an embodiment of the present disclosure.

FIG. 9 is a view schematically illustrating another example of a process of producing a sound packet in a wireless communication system according to an embodiment of the present disclosure.

Referring to FIG. 9, a first device, e.g., a smartphone 910, may send out short range sound packets to allow only devices present within a short range from the smartphone 910 to receive data. Here, the short range may be set depending on the context of the smartphone 910 or the wireless communication system, and no detailed description thereof is given. FIG. 9 assumes that a second device 920 is located within the short range from the smartphone 910. Thus, the second device 920 may receive short range sound packets from the smartphone 910 and may accordingly extract data corresponding to the short range sound packets.

Meanwhile, since a third device 930 is located in a long range from the smartphone 910, the third device 930 cannot receive short range sound packets from the smartphone 910, thus failing to extract data corresponding to the short range sound packets.

Meanwhile, the smartphone 910 may send out long range sound packets so that devices present within the long range from the smartphone 910 may also receive data from the smartphone 910. Here, the long range may be set depending on the context of the smartphone 910 or the wireless communication system, and no detailed description thereof is given. Accordingly, the second device 920 and the third device 930 both may receive long range sound packets from the smartphone 910 and may thus extract data corresponding to the long range sound packets.

Another example of a process for producing sound packets in a wireless communication system according to an embodiment of the present disclosure has been described above with reference to FIG. 9. Now described with reference to FIG. 10 is a process for differentiating spaces by measuring distance based on 2-way sounds in a wireless communication system according to an embodiment of the present disclosure.

Figure 10:
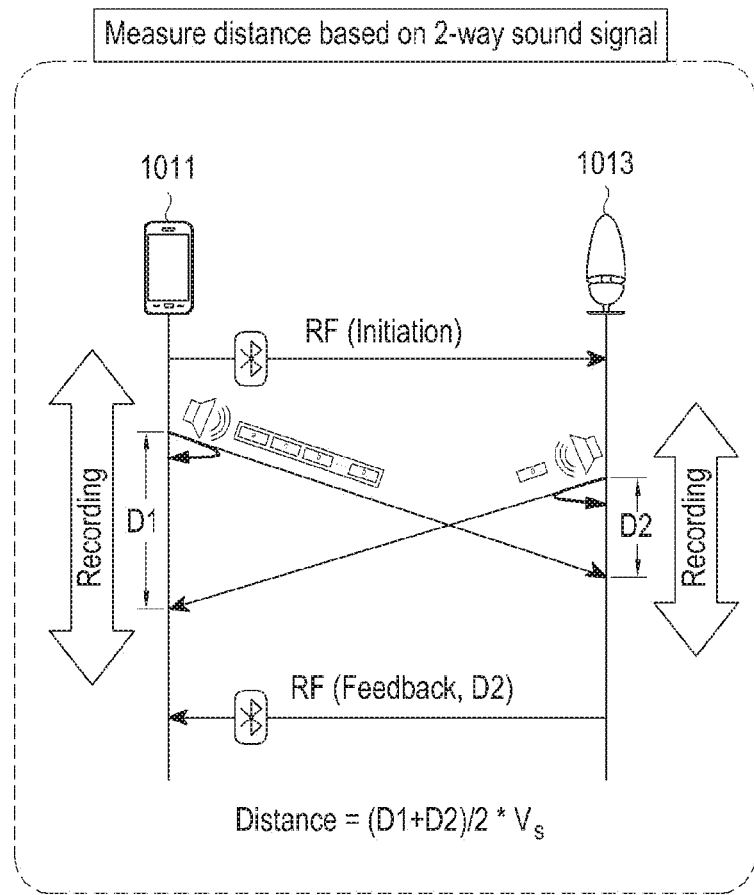
FIG. 10 is a view schematically illustrating a process of differentiating spaces by measuring distance based on 2-way sound signals in a wireless communication system according to an embodiment of the present disclosure.

FIG. 10 is a view schematically illustrating a process of differentiating spaces by measuring distance based on 2-way sound signals in a wireless communication system according to an embodiment of the present disclosure.

Referring to FIG. 10, two devices, for example, a first device, e.g., a smartphone 1011, and a second device 1013, both may send out sound signals, and the smartphone 1011 and the second device 1013 both may receive sound signals.

Meanwhile, sound signals may be transmitted through a speaker and received through a microphone. Accordingly, where a first sound signal transmitted from the smartphone 1011 is received by the second device 1013, a predetermined time is required due to a difference in installation position between the speaker and the microphone. As an example, the smartphone 1011 receives at time t12 a first sound signal that was transmitted at time t11, and the second device 1013 receives at time t22 a second sound signal that was transmitted at time t21. At this time, the time interval between the transmission and reception of the first sound signal by the smartphone 1011 is R1, and the time interval between the transmission and reception of the second sound signal by the second device 1013 is R2.

Thereafter, the smartphone 1011 receives the second sound signal at time t13, and the second device 1013 receives the first sound signal at time t23. Accordingly, the smartphone 1011 may calculate the time difference D1 (=t13−t12+R1) between the transmission of the first sound signal and the reception of the second sound signal by the smartphone 1011, and the second device 1013 may calculate the time difference D2 (=t23−t22+R2) between the transmission of the second sound signal and the reception of the first sound signal by the second device 1013. At this time, the smartphone 1011 may detect the times t12 and t13 based on recording data about the first sound signal and the second sound signal and R1 based on the distance between the speaker and the microphone. Or, the smartphone 1011 may directly measure t11 and t13.

Here, the sum of D1 and D2 is the same as the round-trip time (RTT) of sound signals between the smartphone 1011 and the second device 1013. Typically, the RTT may be defined as a difference between the time of transmission of a first signal and the time of reception of a second signal measured by a particular one of two devices when the particular device sends the first signal, and the other device sends the second signal immediately after receiving the first signal.

In FIG. 10, since the second sound signal is not one transmitted after the reception of the first sound signal, the time interval between t11 and t13 differs from the RTT. However, as compared with normal RTT measurement environments, the second sound signal is transmitted D2 earlier. Accordingly, adding D1 and D2 gives the same value as the RTT under the assumption that the second device 1013 sends out the second sound signal after receiving the first sound signal. Thus, the distance may be measured by calculating the propagation delay time of sound signal by dividing the sum of D1 and D2 by 2 followed by dividing the propagation delay time by the speed VS of sound signal.

A process for differentiating spaces by measuring distance based on 2-way sound signals in a wireless communication system according to an embodiment of the present disclosure has been described with reference to FIG. 10. Now described with reference to FIG. 11 is still another example of a process for producing a sound packet in a wireless communication system according to an embodiment of the present disclosure.

Figure 11:
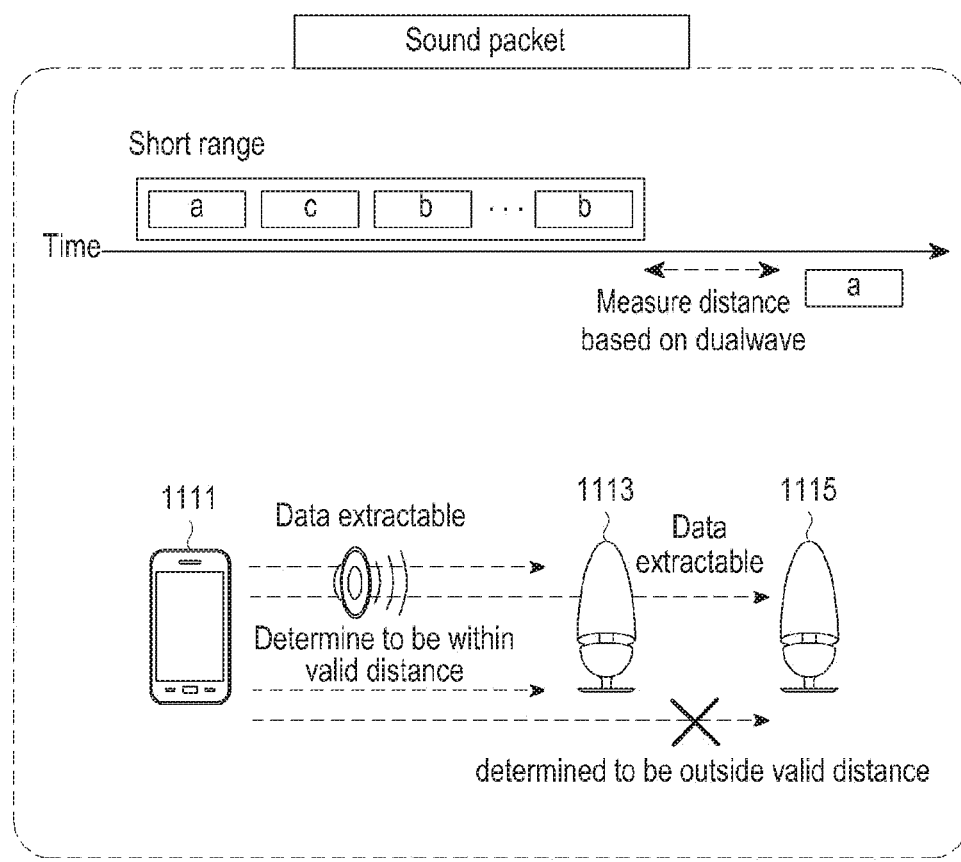
FIG. 11 is a view schematically illustrating still another example of a process of producing a sound packet in a wireless communication system according to an embodiment of the present disclosure.

FIG. 11 is a view schematically illustrating still another example of a process of producing a sound packet in a wireless communication system according to an embodiment of the present disclosure.

Referring to FIG. 11, a second device 1113 may explicitly measure the distance between the second device 1113 and a first device, e.g., a smartphone 1111, and in the case where the explicitly measured distance between the second device 1113 and the smartphone 1111 is less than a preset distance, the second device 1113 may receive sound packets from the smartphone 1111, thus able to extract data corresponding to the sound packets. For ease of description, it should be noted that in FIG. 11 among sound packets transmitted from the smartphone 1111, those receivable by the second device 1113 are indicated by "short range sound packets."

Meanwhile, a third device 1115 may also explicitly measure the distance between the third device 1115 and the smartphone 1111, and in the case where the explicitly measured distance between the third device 1115 and the smartphone 1111 is less than the preset distance, the third device 1115 may receive sound packets from the smartphone 1111. However, since the distance between the third device 1115 and the smartphone 1111 is not less than the preset distance as shown in FIG. 11, the third device 1115 cannot receive sound packets from the smartphone 1111, thus unable to extract data corresponding to the sound packets.

The scheme of detecting the distance from the smartphone 1111 by the second device 1113 and the third device 1115 as shown in FIG. 11 is the same as what has been described with reference to FIG. 10, and no further description thereof is presented.

Still another example of a process for producing sound packets in a wireless communication system according to an embodiment of the present disclosure has been described above with reference to FIG. 11. Now described with reference to FIGS. 12a and 12b is a process for setting a reception space based on a noise canceling scheme and the directivity of sound signals in a wireless communication system according to an embodiment of the present disclosure.

Figure 12A:
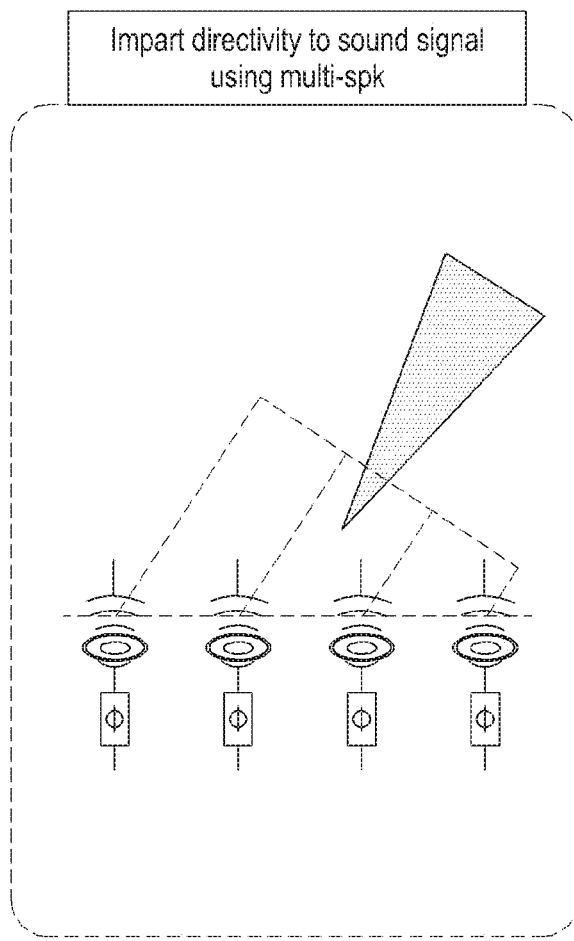
FIGS. 12a and 12b are views schematically illustrating an example of a process of setting a reception space based on a noise canceling scheme and directivity of sound signals in a wireless communication system according to an embodiment of the present disclosure.
Figure 12B:
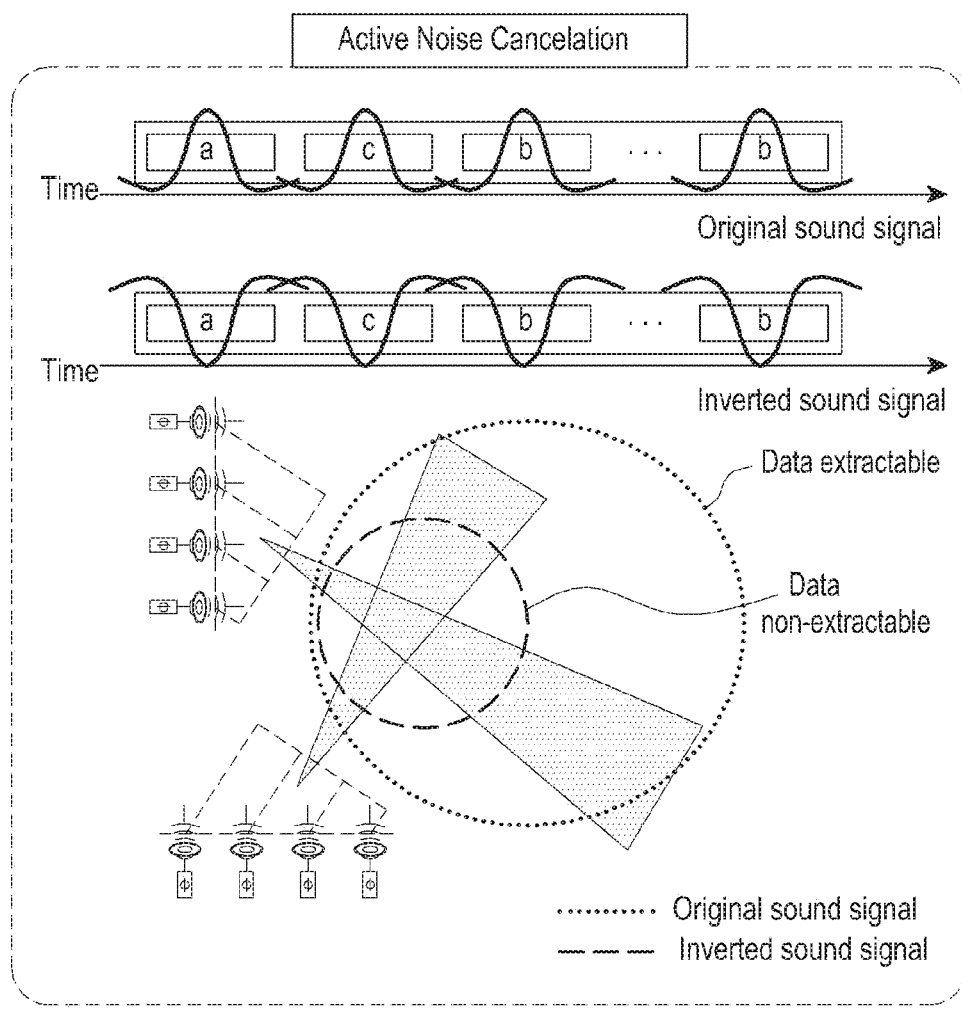

FIGS. 12a and 12b are views schematically illustrating an example of a process of setting a reception space based on a noise canceling scheme and directivity of sound signals in a wireless communication system according to an embodiment of the present disclosure.

Referring to FIGS. 12a and 12b, a transmitting device may impart directivity to sound signals using multiple speakers. FIGS. 12a and 12b show the scenario case where the transmitting device gives directivity to sound signals using, e.g., four speakers.

As given directivity, sound signals with different directions from the original sound symbol play as inverted sound signals on the original sound symbol and may thus be removed based on an active noise canceling scheme. As an example, if signals with opposite phases are radiated in different directions through different speaker arrays as shown in FIG. 12b, data reception is impossible in the area where all the signals are received and are thus canceled off but it is possible to extract the data of each of the signals in the other areas.

Accordingly, referring to FIGS. 12a and 12b, there are defined a reception space where data extraction is possible based on the directivity applied to the sound signals and another reception space where data extraction is impossible.

An example of a process for setting reception spaces based on a noise canceling scheme and directivity of sound signals in a wireless communication system according to an embodiment of the present disclosure has been described above with reference to FIGS. 12a and 12b. Now described with reference to FIGS. 13a and 13b is another example of a process for setting a reception space based on a noise canceling scheme and the directivity of sound signals in a wireless communication system according to an embodiment of the present disclosure.

Figure 13A:
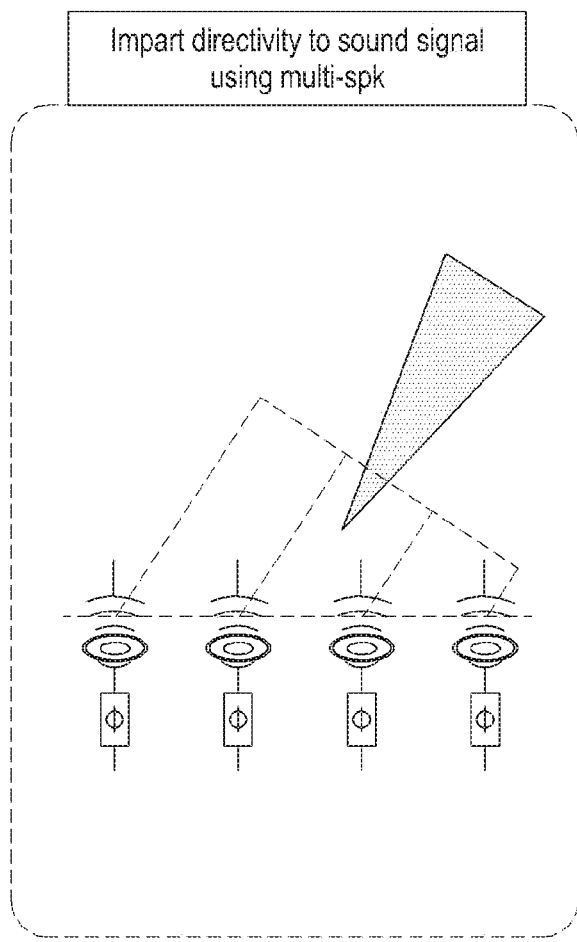
FIGS. 13a and 13b are views schematically illustrating another example of a process of setting a reception space based on a noise canceling scheme and directivity of sound signals in a wireless communication system according to an embodiment of the present disclosure.
Figure 13B:
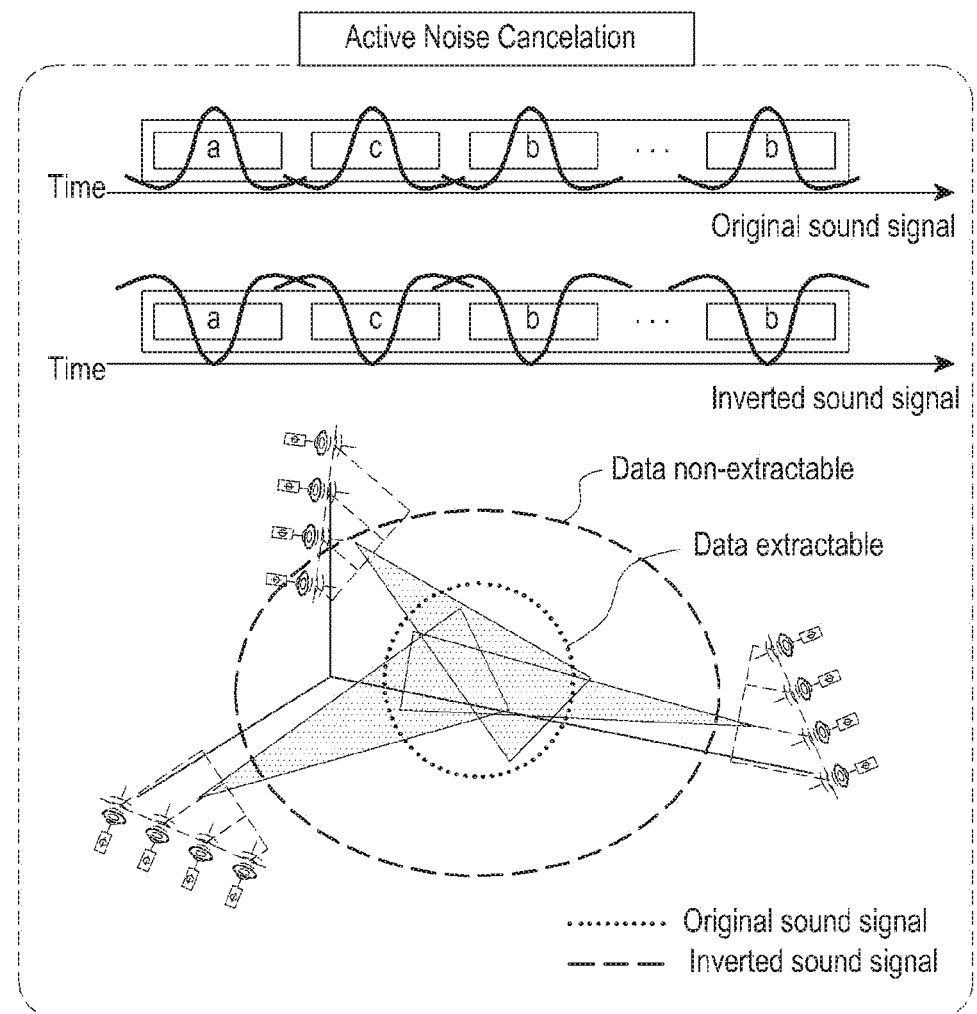

FIGS. 13a and 13b are views schematically illustrating another example of a process of setting a reception space based on a noise canceling scheme and directivity of sound signals in a wireless communication system according to an embodiment of the present disclosure.

Referring to FIGS. 13a and 13b, a transmitting device may impart directivity to sound signals using multiple speakers. FIGS. 13a and 13b show the scenario case where the transmitting device gives directivity to sound signals using, e.g., four speakers.

As given directivity, sound signals with different directions from the original sound symbol play as inverted sound signals on the original sound symbol and may thus be removed based on an active noise canceling scheme.

Accordingly, referring to FIGS. 13a and 13b, there are defined a reception space where data extraction is possible based on the directivity applied to the sound signals and another reception space where data extraction is impossible. In particular, FIGS. 13a and 13b illustrate an example of setting reception spaces based on three-dimensional targeting; a reception space where data extraction is possible based on three-dimensional targeting and another where data extraction is impossible.

Another example of a process for setting reception spaces based on a noise canceling scheme and directivity of sound signals in a wireless communication system according to an embodiment of the present disclosure has been described above with reference to FIGS. 13a and 13b. Now described with reference to FIG. 14 is a process for detecting the direction of a device based on a difference in reception time in a wireless communication system according to an embodiment of the present disclosure.

Figure 14:
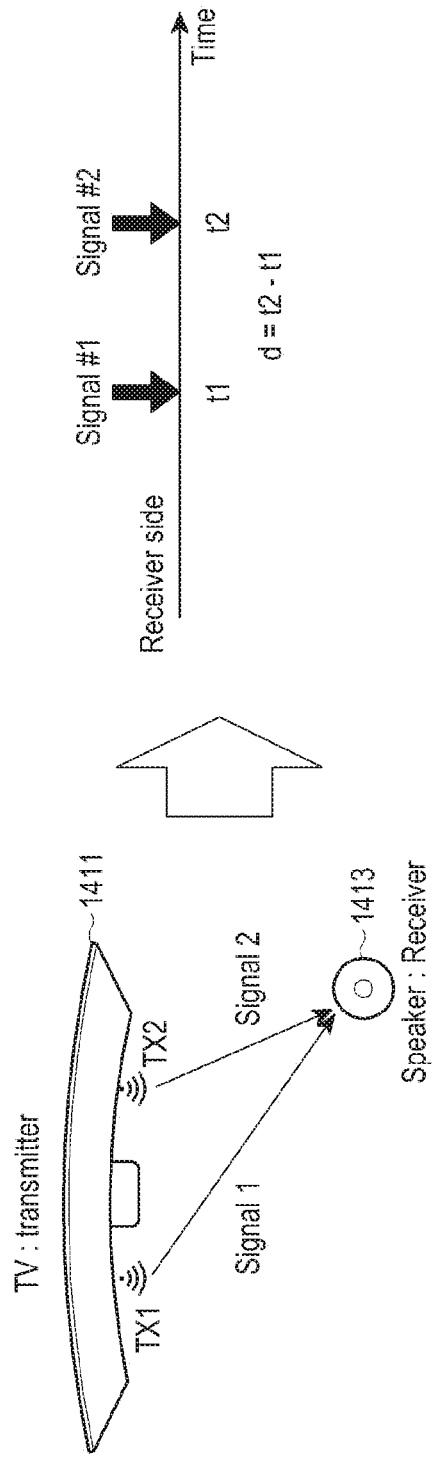
FIG. 14 is a view schematically illustrating a process of detecting the direction of a device based on a difference in reception time in a wireless communication system according to an embodiment of the present disclosure.

FIG. 14 is a view schematically illustrating a process of detecting the direction of a device based on a difference in reception time in a wireless communication system according to an embodiment of the present disclosure.

Referring to FIG. 14, a transmitter, e.g., a TV 1411, sends out two signals, e.g., signal #1 and signal #2. It is assumed here that signal #1 is transmitted in a direction TX1, and signal #2 is transmitted in a direction TX2.

Then, a receiver, e.g., a speaker 1413, receives the signals, i.e., signal #1 and signal #2, from the TV 1411. It is assumed that the time when the speaker 1413 receives signal #1 is t1, and the time when the speaker 1413 receives signal #2 is t2 and that the difference between t1 and t2 is d (d=t2−t1).

Accordingly, where the difference d exceeds a preset threshold m (d>m), the speaker 1413 determines that it is closer to the direction TX2 than TX1. Here, the threshold m is a value determined given a preset margin. No detailed description is made of the margin.

In contrast, where the difference d is less than the threshold m (d<m), the speaker 1413 determines that it is closer to the direction TX1 than TX2.

A process for detecting the direction of a device based on a difference in reception time in a wireless communication system according to an embodiment of the present disclosure has been described with reference to FIG. 14. Now described with reference to FIG. 15 is an example of an operation scenario of applying a process for transmitting and receiving data based on sound signals in a wireless communication system according to an embodiment of the present disclosure.

Figure 15:
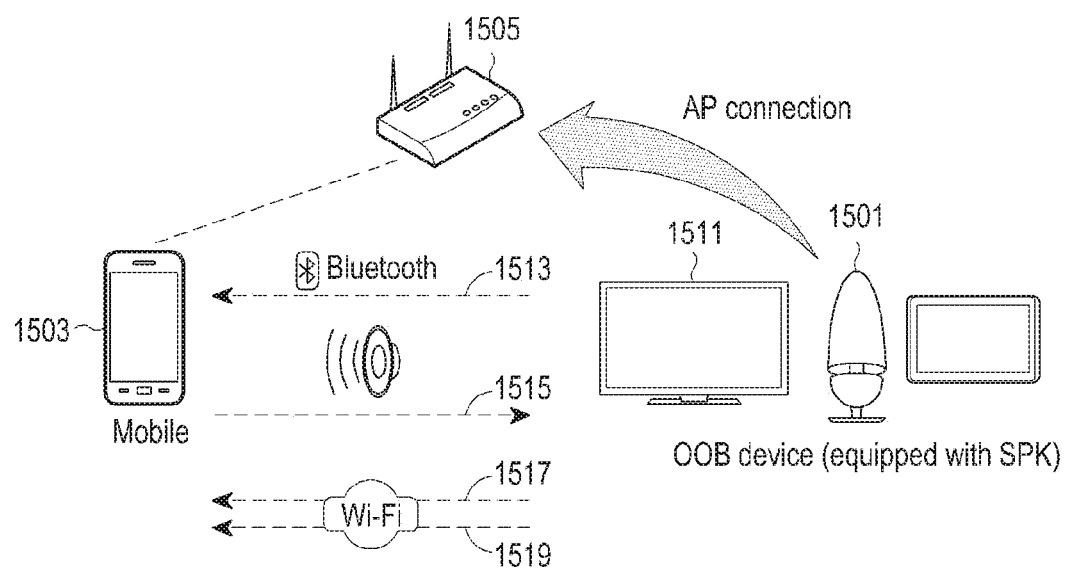
FIG. 15 is a view schematically illustrating an example of an operation scenario of applying a process of transmitting and receiving data based on sound signals in a wireless communication system according to an embodiment of the present disclosure.

FIG. 15 is a view schematically illustrating an example of an operation scenario of applying a process of transmitting and receiving data based on sound signals in a wireless communication system according to an embodiment of the present disclosure.

Referring to FIG. 15, it should be noted that the example operation scenario of applying a process for transmitting and receiving data based on sound signals shown in FIG. 15 is such that a new device, upon powering on, automatically connects to an access point (AP) through an ambient device. For ease of description, hereinafter, the new device is referred to as an out-of-box (OOB) device, and the OOB device includes a speaker.

If the OOB device 1501 powers on (step 1511), the OOB device 1501 sends out a sound signal corresponding to a PIN code that is randomly produced (step 1513). Thus, a receiving device 1503 that is present in the same space as the OOB device 1501 may receive the sound signal from the OOB device 1501. FIG. 15 assumes that the receiving device 1503 is, e.g., a smartphone. The smartphone 1503 detects the PIN code of the OOB device 1501 based on the received sound signal, and in a BLE mode, sends the detected PIN code to the OOB device 1501 (step 1515).

Then, the OOB device 1501 sends a request for Wi-Fi connection information to the smartphone 1503 present within the same space as the OOB device 1501 (step 1517). Then, the smartphone 1503 sends Wi-Fi connection information that the smartphone 1503 retains to the OOB device 1501 (step 1519). The OOB device 1501 performs a connection operation with an AP 1505 based on the Wi-Fi connection information received from the smartphone 1503.

An example of an operation scenario of applying a processor for transmitting and receiving data based on sound signals in a wireless communication system according to an embodiment of the present disclosure has been described with reference to FIG. 15. Now described with reference to FIG. 16 is an example of signal transmission and reception as per an operation scenario example, as shown in FIG. 15, of applying a process for transmitting and receiving data based on sound signals in a wireless communication system according to an embodiment of the present disclosure.

Figure 16:
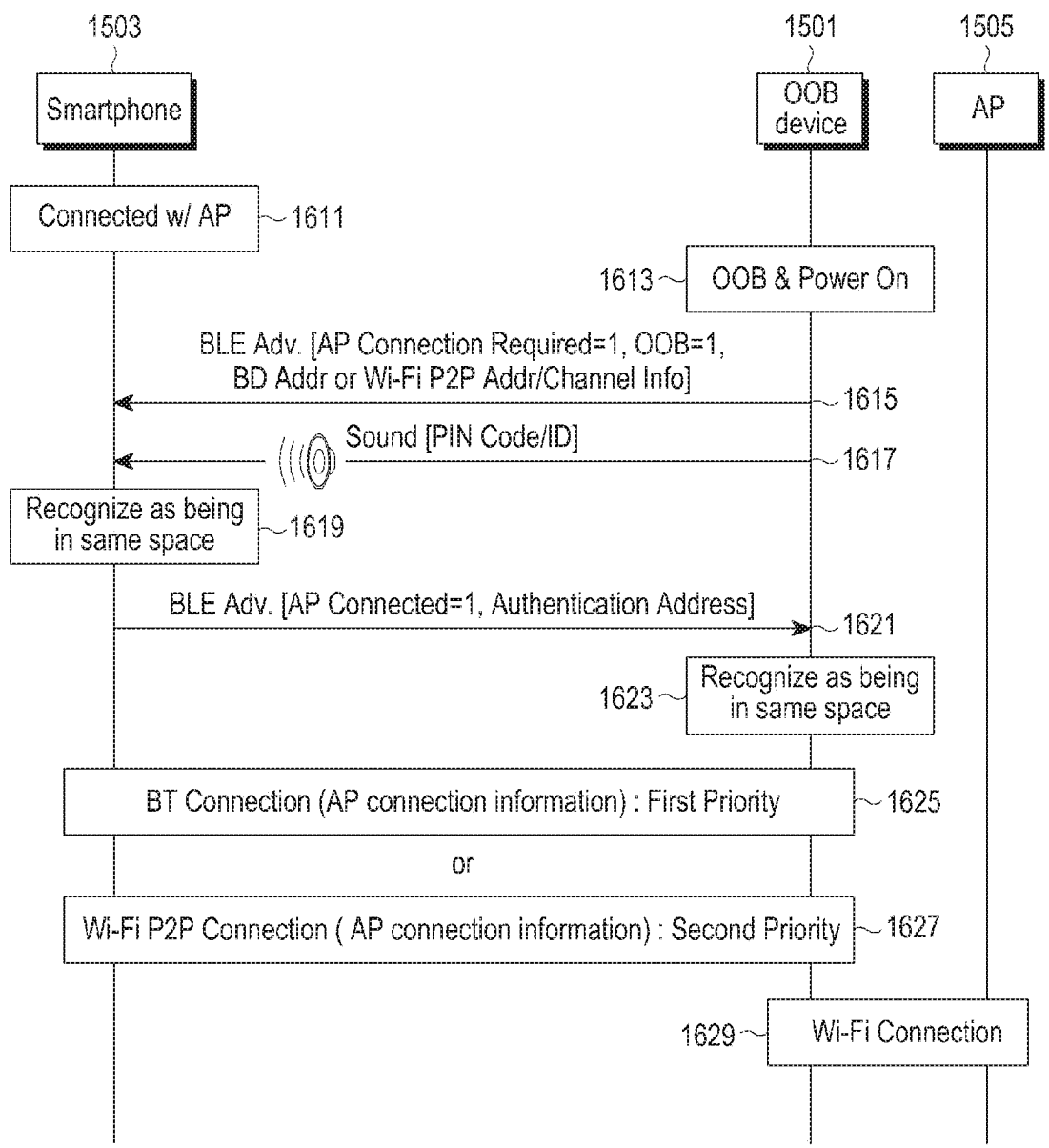
FIG. 16 is a signal flowchart schematically illustrating an example of a process of transmitting and receiving signals as per an example of an operation scenario, as shown in FIG. 15, of applying a process of transmitting and receiving data based on sound signals in a wireless communication system according to an embodiment of the present disclosure.

FIG. 16 is a signal flowchart schematically illustrating an example of a process of transmitting and receiving signals as per an example of an operation scenario, as shown in FIG. 15, of applying a process of transmitting and receiving data based on sound signals in a wireless communication system according to an embodiment of the present disclosure.

Referring to FIG. 16, the wireless communication system includes an OOB device 1501, a smartphone 1503, and an AP 1505.

While the smartphone 1503 remains connected with the AP 1505 (step 1611), if the OOB device 1501 powers on (step 1613), then the OOB device 1501 sends out a BLE Advertisement message (step 1615). It should be noted that the BLE Advertisement message is denoted by BLE Adv. message for convenience in FIG. 16.

The BLE Advertisement message includes an AP Connection Required parameter, an OOB parameter, and a BD Addr or Wi-Fi P2P Addr/Channel Info parameter. The AP Connection Required parameter, the OOB parameter, and the BD Addr or Wi-Fi P2P Addr/Channel Info parameter each are described below.

The AP Connection Required parameter is a parameter indicating whether the corresponding device needs to connect to the AP and may be implemented as, e.g., one bit. Where the AP Connection Required parameter is a first value, e.g., '1,' this denotes that the corresponding device need connect to the AP, and where the AP Connection Required parameter is a second value, e.g., '0,' this denotes that the corresponding device need not connect to the AP.

The OOB parameter is a parameter indicating whether the corresponding device is an OOB device, which may be implemented as, e.g., one bit. Where the OOB parameter is a first value, e.g., '1,' this denotes that the corresponding device is an OOB device, and where the OOB parameter is a second value, e.g., '0,' this denotes that the corresponding device is not an OOB device. Here, the OOB device indicates a device that first powers on and is driven.

The BD Addr or Wi-Fi P2P Addr/Channel Info parameter denotes a Bluetooth device (BD) address or Wi-Fi peer-to-peer (P2P) address and channel information. Here, the BD address indicates the medium access control (MAC) address of BD, the Wi-Fi P2P address indicates an address for Wi-Fi P2P connection, and the channel information indicates channel information for Wi-Fi P2P connection. In the BLE Advertisement message of step 1615, the AP Connection Required parameter is set as 1, and the OOB parameter is set as 1.

Further, the OOB device 1501 sends its PIN code and identifier (ID) based on a sound signal (step 1617).

Receiving the sound signal from the OOB device 1501, the smartphone 1503 detects that the OOB device 1501 is present in the same space as the smartphone 1503 based on the sound signal (step 1619). The smartphone 1503 then transmits the BLE Advertisement message to the OOB device 1501 (step 1621). The BLE Advertisement message includes an AP Connected parameter and an Authentication Address parameter. Here, the AP Connected parameter and the Authentication Address parameter are described below.

The AP Connected parameter is a parameter indicating whether the corresponding device is connected with an AP and may be implemented as, e.g., one bit. Where the AP Connected parameter is a first value, e.g., '1,' this denotes that the corresponding device is connected with the AP, and where the AP Connected parameter is a second value, e.g., '0,' this denotes that the corresponding device is not connected with the AP.

The Authentication Address parameter indicates the address of the corresponding device that has succeeded in an authentication procedure—that is, an authenticated address.

In the BLE Advertisement message of step 1621, the AP Connected parameter is set as 1.

Receiving the BLE Advertisement message from the smartphone 1503, the OOB device 1501 detects that the OOB device 1501 is present in the same space as the smartphone 1503 (step 1623). The OOB device 1501 having detected the presence in the same space as the smartphone 1503 in such a way sets up a Bluetooth connection (BT connection) with the smartphone 1503 (step 1625) or a Wi-Fi P2P connection (step 1627). Here, of the connections between the smartphone 1503 and the OOB device 1501, the Bluetooth connection has a higher priority than the Wi-Fi P2P connection. That is, the Bluetooth connection has a first priority, and the Wi-Fi P2P connection has a second priority.

Further, while the Bluetooth connection setup and Wi-Fi P2P connection operations are performed, the smartphone 1503 provides information about connection with the AP 1505 to the OOB device 1501. In other words, while the operation of setting up the Bluetooth connection between the smartphone 1503 and the OOB device 1501 is performed, the smartphone 1503 provides Bluetooth connection information which the smartphone 1503 retains to the OOB device 1501. In contrast, while the operation of setting up the Wi-Fi P2P connection between the smartphone 1503 and the OOB device 1501 is performed, the smartphone 1503 provides Wi-Fi P2P connection information which the smartphone 1503 retains to the OOB device 1501.

Having set up the Wi-Fi P2P connection with the smartphone 1503, the OOB device 1501 sets up a Wi-Fi connection with the AP 1505 based on the Wi-Fi P2P connection information received from the smartphone 1503 (step 1629).

Although FIG. 16 illustrates an example of a process of transmitting and receiving signals as per an example of an operation scenario, as shown in FIG. 15, of applying a process of transmitting and receiving data based on sound signals in a wireless communication system according to an embodiment of the present disclosure, various changes may be made to FIG. 16. As an example, although the continuous steps are shown in FIG. 16, the steps of FIG. 16 may overlap or arise in parallel or in different order, or several number of times.

An example of a process for transmitting and receiving signals as per an operation scenario, as shown in FIG. 15, of applying a processor for transmitting and receiving data based on sound signals in a wireless communication system according to an embodiment of the present disclosure has been described with reference to FIG. 16. Now described with reference to FIG. 17 is another example of signal transmission and reception as per an operation scenario example, as shown in FIG. 15, of applying a process for transmitting and receiving data based on sound signals in a wireless communication system according to an embodiment of the present disclosure.

Figure 17:
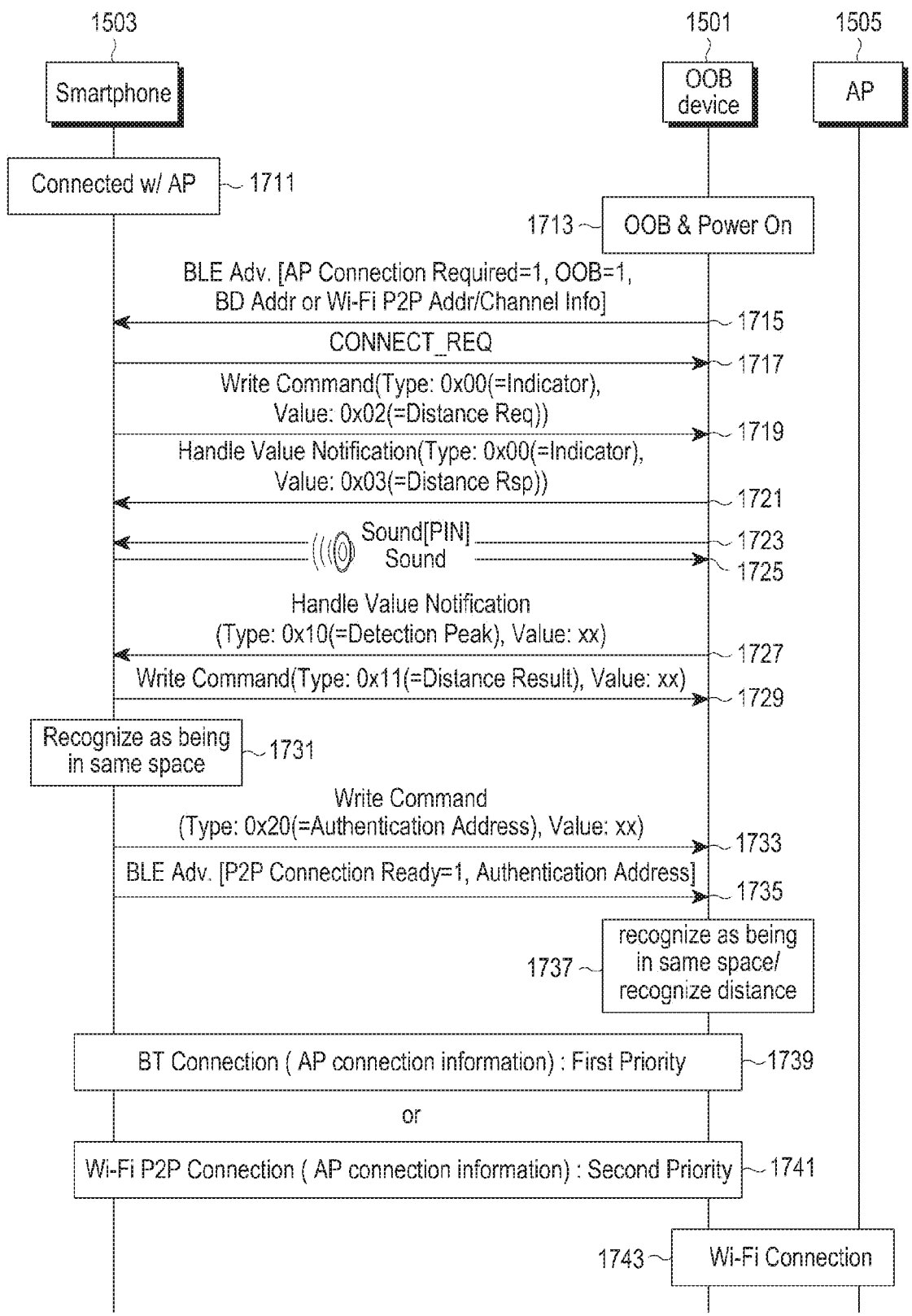
FIG. 17 is a signal flowchart schematically illustrating another example of a process of transmitting and receiving signals as per an example of an operation scenario, as shown in FIG. 15, of applying a process of transmitting and receiving data based on sound signals in a wireless communication system according to an embodiment of the present disclosure.

FIG. 17 is a signal flowchart schematically illustrating another example of a process of transmitting and receiving signals as per an example of an operation scenario, as shown in FIG. 15, of applying a process of transmitting and receiving data based on sound signals in a wireless communication system according to an embodiment of the present disclosure.

Referring to FIG. 17, the wireless communication system includes an OOB device 1501, a smartphone 1503, and an AP 1505.

While the smartphone 1503 remains connected with the AP 1505 (step 1711), if the OOB device 1501 powers on (step 1713), then the OOB device 1501 sends out a BLE Advertisement message (step 1715). It should be noted that the BLE Advertisement message is denoted by BLE Adv. message for convenience in FIG. 17. The BLE Advertisement message includes an AP Connection Required parameter, an OOB parameter, and a BD Addr or Wi-Fi P2P Addr/Channel Info parameter. The AP Connection Required parameter, the OOB parameter, and the BD Addr or Wi-Fi P2P Addr/Channel Info parameter are the same as those described above with reference to FIG. 16, and no detailed description thereof is presented. Further, in the BLE Advertisement message of step 1715, the AP Connection Required parameter is set as 1, and the OOB parameter is set as 1.

Receiving the BLE Advertisement message from the OOB device 1501, the smartphone 1503 transmits a CONNECT_REQ message to the OOB device 1501 (step 1717). Further, the smartphone 1503 transmits a write command message to the OOB device 1501 (step 1719). Here, the write command message, as a BLE generic attribute profile (GATT) command message, includes a type parameter and a value parameter. Where the type parameter is, e.g., a first value, e.g., '0x00,' the type parameter indicates that the write command message is an indicator message. Further, the value parameter indicates the value of a message that the type parameter indicates. As an example, where the value parameter is a first value, e.g., '0x02,' the value parameter indicates that the indicator message is a distance request (Distance Req). Here, the Distance Req indicates that the corresponding device requires detection of the distance to the opposite device.

Receiving the write command message from the smartphone 1503, the OOB device 1501 transmits a handle value notification message in response to the write command message (step 1721). Here, the handle value notification message includes a type parameter and a value parameter.

The type parameter is a first value, e.g., '0x00,' and the value parameter is a second value, e.g., '0x03.' Here, the value parameter which is '0x03' indicates a distance response (Distance Rsp). Here, the Distance Rsp represents a response to the Distance Req, indicating that the corresponding device has confirmed that the detection of distance to the opposite device is required.

Further, receiving the write command message, the OOB device 1501 transmits its PIN code based on a sound signal to perform the operation of detecting the distance from the smartphone 1503 (step 1721), and the smartphone 1503 also sends out a sound signal (step 1725).

Receiving the sound signal from the smartphone 1503, the OOB device 1501 sends a handle value notification message to the smartphone 1503 (step 1727). Here, the handle value notification message includes a type parameter and a value parameter. The type parameter is set as, e.g., a second value, e.g., '0x10,' and the value parameter is set as, e.g., a third value, e.g., 'xx.' Here, where the type parameter is set as '0x10,' this denotes peak detection. Having received the handle value notification message from the OOB device 1501, the smartphone 1503 transmits a write command message to the OOB device 1501 (step 1729). Here, the write command message includes a type parameter and a value parameter. The type parameter is, e.g., a second value, e.g., '0x11,' and the value parameter is, e.g., a third value, e.g., 'xx.' Here, the type parameter being set as '0x11' denotes a distance result, and the value parameter is set to be the same as the value parameter contained in the handle value notification message.

Having transmitted the write command message to the OOB device 1501, the smartphone 1503 detects that the OOB device 1501 is present in the same space as the smartphone 1503 (step 1731). The smartphone 1503 then transmits the write command message to the OOB device 1501. The write command message includes a type parameter and a value parameter. The type parameter is set as, e.g., a fourth value, e.g., '0x20,' and the value parameter is set as, e.g., a third value, e.g., 'xx.' Here, the type parameter being set as '0x20' denotes the Authentication Address, and the value parameter is set to be the same as the value parameter contained in the handle value notification message.

After transmitting the write command message, the smartphone 1503 transmits a BLE Advertisement message to the OOB device 1501 (step 1735). The BLE Advertisement message includes a P2P Connection Ready parameter and an Authentication Address parameter. The P2P Connection Ready parameter is a parameter indicating whether the corresponding device needs a P2P connection and may be implemented as, e.g., one bit. Where the P2P Connection Ready parameter is a first value, e.g., '1,' this denotes that the corresponding device needs a P2P connection, and where the P2P Connection Ready parameter is a second value, e.g., '2,' this denotes that the corresponding device needs no P2P connection. In the BLE Advertisement message of step 1735, the P2P Connection Ready parameter is set as 1.

Having received the BLE Advertisement message from the smartphone 1503, the OOB device 1501 detects that the OOB device 1501 is present in the same space as the smartphone 1503 and detects the distance between the OOB device 1501 and the smartphone 1503 (step 1737). Having detected the presence in the same space as the smartphone 1503 and the distance between the OOB device 1501 and the smartphone 1503, the OOB device 1501 sets up a Bluetooth connection with the smartphone 1503 (step 1739) or a Wi-Fi P2P connection with the smartphone 1503 (step 1741). Here, of the connections between the smartphone 1503 and the OOB device 1501, the Bluetooth connection has a higher priority than the Wi-Fi P2P connection. That is, the Bluetooth connection has a first priority, and the Wi-Fi P2P connection has a second priority.

Further, while the Bluetooth connection setup and Wi-Fi P2P connection operations are performed, the smartphone 1503 provides information about connection with the AP 1505 to the OOB device 1501. In other words, while the operation of setting up the Bluetooth connection between the smartphone 1503 and the OOB device 1501 is performed, the smartphone 1503 provides Bluetooth connection information which the smartphone 1503 retains to the OOB device 1501. In contrast, while the operation of setting up the Wi-Fi P2P connection between the smartphone 1503 and the OOB device 1501 is performed, the smartphone 1503 provides Wi-Fi P2P connection information which the smartphone 1503 retains to the OOB device 1501.

Having set up the Wi-Fi P2P connection with the smartphone 1503, the OOB device 1501 sets up a Wi-Fi connection with the AP 1505 based on the Wi-Fi P2P connection information received from the smartphone 1503 (step 1743).

Although FIG. 17 illustrates another example of a process of transmitting and receiving signals as per an example of an operation scenario, as shown in FIG. 15, of applying a process of transmitting and receiving data based on sound signals in a wireless communication system according to an embodiment of the present disclosure, various changes may be made to FIG. 17. As an example, although the continuous steps are shown in FIG. 17, the steps of FIG. 17 may overlap or arise in parallel or in different order, or several number of times.

Another example of a process for transmitting and receiving signals as per an operation scenario, as shown in FIG. 15, of applying a processor for transmitting and receiving data based on sound signals in a wireless communication system according to an embodiment of the present disclosure has been described with reference to FIG. 17. Now described with reference to FIG. 18 is another example of signal transmission and reception as per an operation scenario example, as shown in FIG. 15, of applying a process for transmitting and receiving data based on sound signals in a wireless communication system according to an embodiment of the present disclosure.

Figure 18:
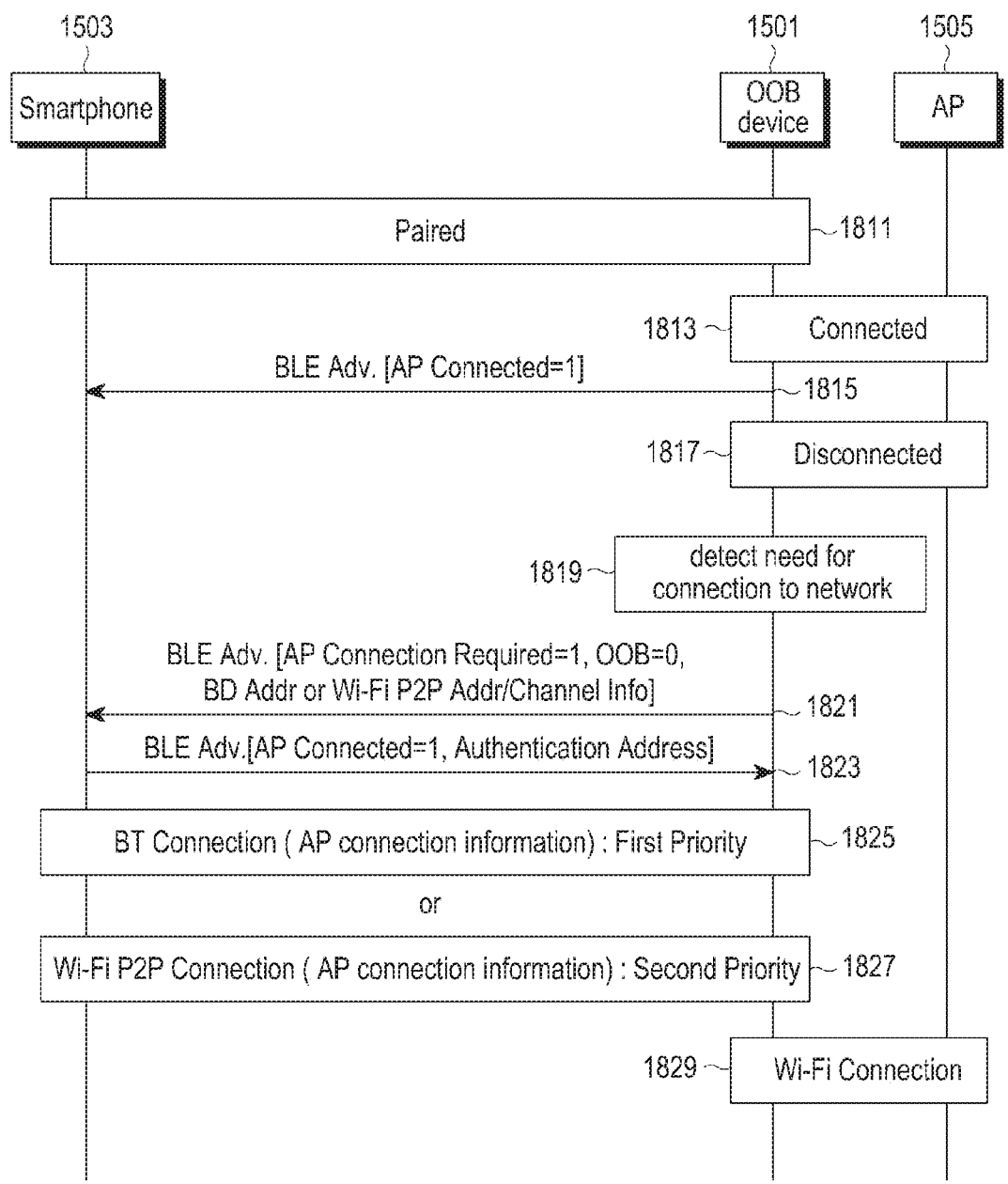
FIG. 18 is a signal flowchart schematically illustrating still another example of a process of transmitting and receiving signals as per an example of an operation scenario, as shown in FIG. 15, of applying a process of transmitting and receiving data based on sound signals in a wireless communication system according to an embodiment of the present disclosure.

FIG. 18 is a signal flowchart schematically illustrating still another example of a process of transmitting and receiving signals as per an example of an operation scenario, as shown in FIG. 15, of applying a process of transmitting and receiving data based on sound signals in a wireless communication system according to an embodiment of the present disclosure.

Referring to FIG. 18, the wireless communication system includes an OOB device 1501, a smartphone 1503, and an AP 1505. Although FIG. 18 sets forth the OOB device 1501 for ease of description, it should be noted that the OOB device 1501 is, rather than an actual OOB device, a device being paired with another device after initial power-on.

The smartphone 1503 and the OOB device 1501 are being paired (step 1811), and the OOB device 1501 and the AP 1505 are maintaining the connected state (step 1813).

The OOB device 1501 transmits a BLE Advertisement message to the smartphone 1503 (step 1815). It should be noted that the BLE Advertisement message is denoted by BLE Adv. message for convenience in FIG. 18. The BLE Advertisement message includes an AP Connected parameter. The AP Connected parameter is a parameter indicating whether the corresponding device is connected with an AP and may be implemented as, e.g., one bit. Where the AP Connected parameter is a first value, e.g., '1,' this denotes that the corresponding device is connected with the AP, and where the AP Connected parameter is a second value, e.g., '0,' this denotes that the corresponding device is not connected with the AP. In the BLE Advertisement message of step 1815, the AP Connected parameter is set as 1.

Where the connection between the OOB device 1501 and the AP 1505 is released due to a particular event occurring while the OOB device 1501 remains in the connected state with the AP 1505, the OOB device 1501 transitions to a disconnected state (step 1817).

Upon detecting the need for connection to the network while operating in the disconnected state (step 1819), the OOB device 1501 sends a BLE Advertisement message to the smartphone 1503 (step 1821). The BLE Advertisement message includes an AP Connection Required parameter, an OOB parameter, and a BD Addr or Wi-Fi P2P Addr/Channel Info parameter. Here, the AP Connection Required parameter, the OOB parameter, and the BD Addr or Wi-Fi P2P Addr/Channel Info parameter in the BLE Advertisement message are the same as those described above with reference to FIG. 16, and no detailed description thereof is presented. In the BLE Advertisement message of step 1821, the AP Connection Required parameter is set as 1, and the OOB parameter is set as 0.

Having received the BLE Advertisement message from the OOB device 1501, the smartphone 1503 transmits a BLE Advertisement message to the OOB device 1501 (step 1823). The BLE Advertisement message includes an AP Connected parameter and an Authentication Address parameter. In the BLE Advertisement message of step 1823, the AP Connected parameter is set as 1.

The OOB device 1501 having received the BLE Advertisement message from the smartphone 1503 sets up a Bluetooth connection with the smartphone 1503 (step 1825) or a Wi-Fi P2P connection (step 1827). Here, of the connections between the smartphone 1503 and the OOB device 1501, the Bluetooth connection has a higher priority than the Wi-Fi P2P connection. That is, the Bluetooth connection has a first priority, and the Wi-Fi P2P connection has a second priority.

Further, while the Bluetooth connection setup and Wi-Fi P2P connection operations are performed, the smartphone 1503 provides information about connection with the AP 1505 to the OOB device 1501. In other words, while the operation of setting up the Bluetooth connection between the smartphone 1503 and the OOB device 1501 is performed, the smartphone 1503 provides Bluetooth connection information which the smartphone 1503 retains to the OOB device 1501. In contrast, while the operation of setting up the Wi-Fi P2P connection between the smartphone 1503 and the OOB device 1501 is performed, the smartphone 1503 provides Wi-Fi P2P connection information which the smartphone 1503 retains to the OOB device 1501.

Having set up the Wi-Fi P2P connection with the smartphone 1503, the OOB device 1501 sets up a Wi-Fi connection with the AP 1505 based on the Wi-Fi P2P connection information received from the smartphone 1503 (step 1829).

Although FIG. 18 illustrates another example of a process of transmitting and receiving signals as per an example of an operation scenario, as shown in FIG. 15, of applying a process of transmitting and receiving data based on sound signals in a wireless communication system according to an embodiment of the present disclosure, various changes may be made to FIG. 18. As an example, although the continuous steps are shown in FIG. 18, the steps of FIG. 18 may overlap or arise in parallel or in different order, or several number of times.

Another example of a process for transmitting and receiving signals as per an operation scenario, as shown in FIG. 15, of applying a processor for transmitting and receiving data based on sound signals in a wireless communication system according to an embodiment of the present disclosure has been described with reference to FIG. 18. Now described with reference to FIG. 19 is still another example of an operation scenario of applying a process for transmitting and receiving data based on sound signals in a wireless communication system according to an embodiment of the present disclosure.

Figure 19:
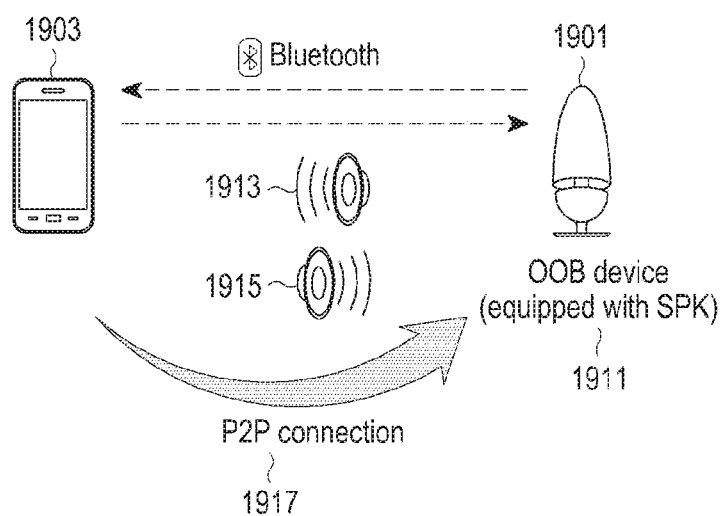
FIG. 19 is a view schematically illustrating another example of an operation scenario of applying a process of transmitting and receiving data based on sound signals in a wireless communication system according to an embodiment of the present disclosure.

FIG. 19 is a view schematically illustrating another example of an operation scenario of applying a process of transmitting and receiving data based on sound signals in a wireless communication system according to an embodiment of the present disclosure.

Referring to FIG. 19, it should be noted that another example operation scenario of applying a process for transmitting and receiving data based on sound signals as shown in FIG. 19 is such that a new device, upon powering on, automatically performs a pairing operation with another device. For ease of description, hereinafter, the new device is referred to as an OOB device, and the OOB device includes a speaker.

If the OOB device 1901 powers on (step 1911), the OOB device 1901 sends out a sound signal corresponding to a PIN code that is randomly produced (step 1913). Thus, a receiving device 1903 that is present in the same space as the OOB device 1901 may receive the sound signal from the OOB device 1901. FIG. 19 assumes that the receiving device 1903 is, e.g., a smartphone. The smartphone 1903 detects the PIN code of the OOB device 1901 based on the received sound signal, and in a BLE mode, sends the detected PIN code to the OOB device 1901 (step 1915).

The OOB device 1901 then attempts a P2P connection to the smartphone 1903 located within a preset threshold distance from the OOB device 1901. Accordingly, the smartphone 1903 sets up a P2P connection with the OOB device 1901 (step 1917).

Where the new device, i.e., the OOB device 1901, automatically pairs with another device as described with reference to FIG. 19, the following effects are achieved:

The P2P network setup step may shrink. This may simplify the P2P connection procedure among devices located in the same space.

(1) Since PIN codes may be sent based on sound signals, devices may authenticate being located in the same space.

(2) The ability of PIN codes being sent based on sound signals enables inter-device detection as well as authentication of being located in the same space.

(3) Accordingly, the authority may be differentiated depending on the inter-device distance. Further, the devices may be paired only when they are located in the same space and within a threshold distance therebetween.

(4) It may be authenticated whether devices are located in the same space through a three-step authentication procedure. Here, the three-step authentication procedure encompasses the case where each device is able to detect sound signals from its opposite device, the case where the smartphone returns the PIN code that the OOB device has sent out, and the case where the distance between the OOB device and the smartphone is less than the threshold distance.

Another example of an operation scenario of applying a processor for transmitting and receiving data based on sound signals in a wireless communication system according to an embodiment of the present disclosure has been described with reference to FIG. 19. Now described with reference to FIG. 20 is an example of signal transmission and reception as per an operation scenario example, as shown in FIG. 20, of applying a process for transmitting and receiving data based on sound signals in a wireless communication system according to an embodiment of the present disclosure.

Figure 20:
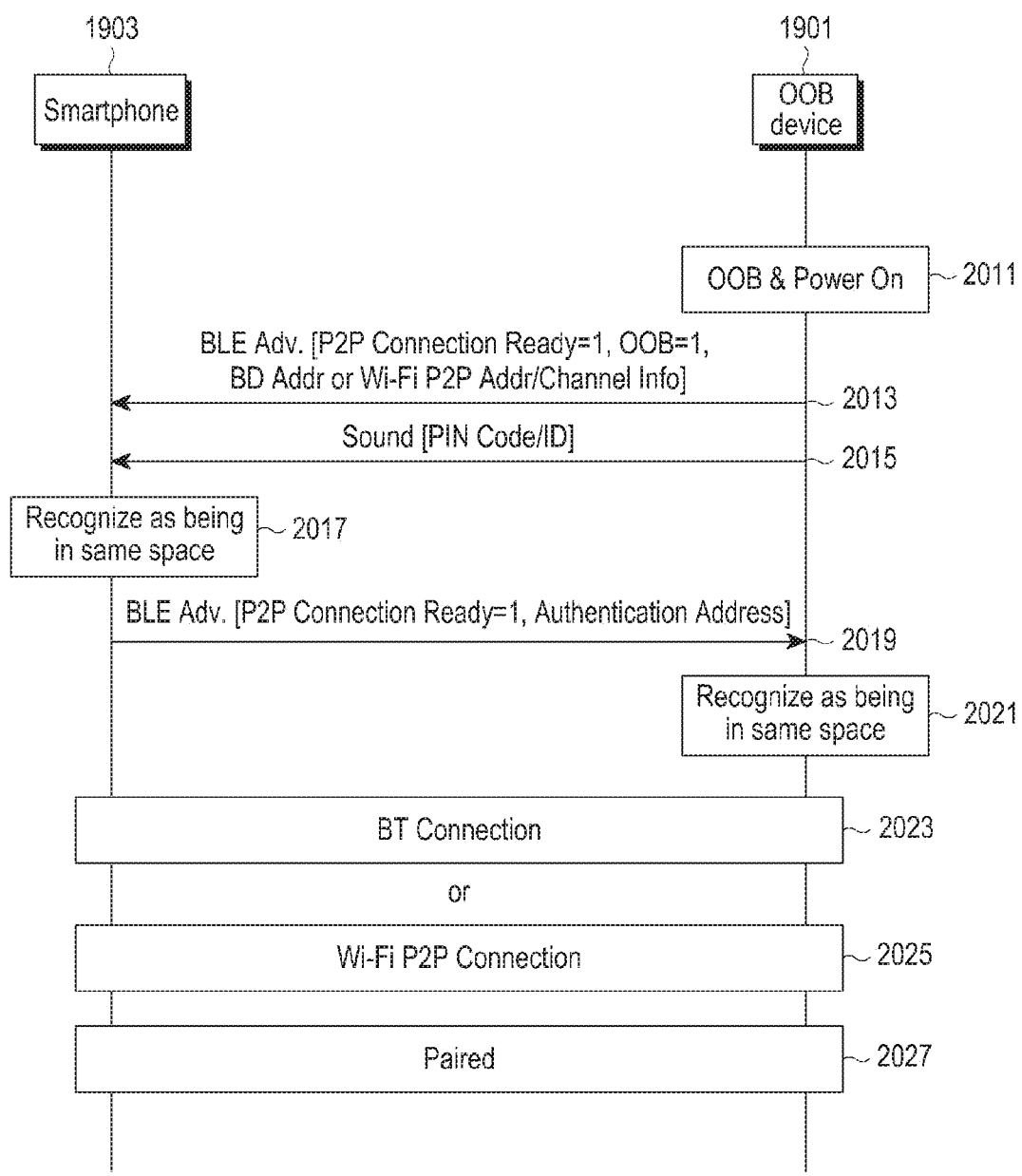
FIG. 20 is a view schematically illustrating an example of a process of transmitting and receiving signals as per another example of an operation scenario of applying a process of transmitting and receiving data based on sound signals in a wireless communication system according to an embodiment of the present disclosure.

FIG. 20 is a view schematically illustrating an example of a process of transmitting and receiving signals as per another example of an operation scenario of applying a process of transmitting and receiving data based on sound signals in a wireless communication system according to an embodiment of the present disclosure.

Referring to FIG. 20, the wireless communication system includes an OOB device 1901 and a smartphone 1903.

If the OOB device 1901 powers on (step 2011), the OOB device 1901 sends out a BLE Advertisement message (step 2013). It should be noted that the BLE Advertisement message is denoted by BLE Adv. message for convenience in FIG. 20. The BLE Advertisement message includes a P2P Connection Ready parameter, an OOB parameter, and a BD Addr or Wi-Fi P2P Addr/Channel Info parameter. The P2P Connection Ready parameter, the OOB parameter, and the BD Addr or Wi-Fi P2P Addr/Channel Info parameter in the BLE Advertisement message are the same as those described above, and no detailed description thereof is presented. In the BLE Advertisement message of step 2013, the P2P Connection Ready parameter is set as 1.

Further, the OOB device 1901 sends its PIN code and ID based on a sound signal (step 2015).

Having received the sound signal from the OOB device 1901, the smartphone 1903 detects that the OOB device 1901 is present in the same space as the smartphone 1903 based on the sound signal (step 2017). The smartphone 1903 then transmits the BLE Advertisement message to the OOB device 1901 (step 2019). The BLE Advertisement message includes a P2P Connection Ready parameter and an Authentication Address parameter. The P2P Connection Ready parameter and the Authentication Address parameter are the same as those described above, and a detailed description thereof is omitted here. In the BLE Advertisement message of step 2019, the P2P Connection Ready parameter is set as 1.

Having received the BLE Advertisement message from the smartphone 1903, the OOB device 1901 detects that the OOB device 1901 is present in the same space as the smartphone 1903 (step 2021). The OOB device 1901 having detected the presence in the same space as the smartphone 1903 in such a way sets up a Bluetooth connection with the smartphone 1903 (step 2023) or a Wi-Fi P2P connection (step 2025).

If the Bluetooth connection or Wi-Fi P2P connection is thus set up between the OOB device 1901 and the smartphone 1903, the OOB device 1901 and the smartphone 1903 are paired (step 2027).

Although FIG. 20 illustrates an example of a process of transmitting and receiving signals as per another example of an operation scenario of applying a process of transmitting and receiving data based on sound signals in a wireless communication system according to an embodiment of the present disclosure, various changes may be made to FIG. 20. As an example, although the continuous steps are shown in FIG. 20, the steps of FIG. 20 may overlap or arise in parallel or in different order, or several number of times.

An example of a process for transmitting and receiving signals as per another example of an operation scenario of applying a processor for transmitting and receiving data based on sound signals in a wireless communication system according to an embodiment of the present disclosure has been described with reference to FIG. 20. Now described with reference to FIG. 21 is another example of signal transmission and reception as per another operation scenario example of applying a process for transmitting and receiving data based on sound signals in a wireless communication system according to an embodiment of the present disclosure.

Figure 21:
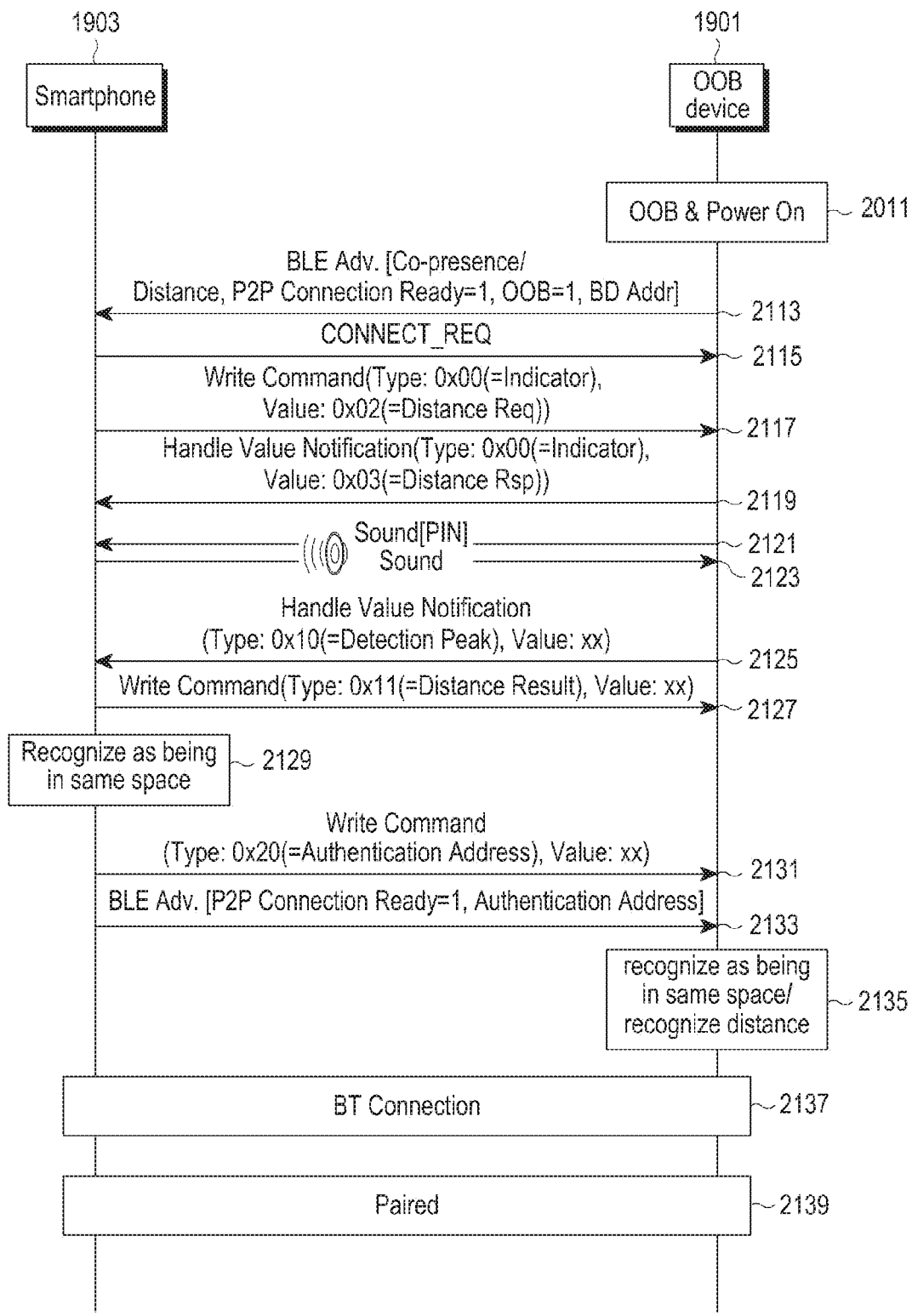
FIG. 21 is a view schematically illustrating another example of a process of transmitting and receiving signals as per another example of an operation scenario of applying a process of transmitting and receiving data based on sound signals in a wireless communication system according to an embodiment of the present disclosure.

FIG. 21 is a view schematically illustrating another example of a process of transmitting and receiving signals as per another example of an operation scenario of applying a process of transmitting and receiving data based on sound signals in a wireless communication system according to an embodiment of the present disclosure.

Referring to FIG. 21, the wireless communication system includes an OOB device 1901 and a smartphone 1903.

If the OOB device 1901 powers on (step 2111), the OOB device 1901 sends out a BLE Advertisement message (step 2113). It should be noted that the BLE Advertisement message is denoted by BLE Adv. message for convenience in FIG. 21. The BLE Advertisement message includes a Co-presence/Distance parameter, a P2P Connection Ready parameter, an OOB parameter, and a BD Addr parameter. The Co-presence/Distance parameter is a parameter indicating that detection in the same space and distance is required. The P2P Connection Ready parameter, OOB parameter, and BD Addr parameter are the same as those described above, and a detailed description thereof is omitted here. Further, in the BLE Advertisement message of step 2113, the P2P Connection Ready parameter is set as 1, and the OOB parameter is set as 1.

Having received the BLE Advertisement message from the OOB device 1901, the smartphone 1903 transmits a CONNECT_REQ message to the OOB device 1901 (step 2115). Further, the smartphone 1903 transmits a write command message to the OOB device 1901 (step 2117). Here, the write command message includes a type parameter and a value parameter, and the write command message, the type parameter, and the value parameter are the same as those described above, and no detailed description thereof is given. In the write command message of step 2117, the type parameter is set as 0x00, and the value parameter is set as 0x02.

Having received the write command message from the smartphone 1903, the OOB device 1901 transmits a handle value notification message in response to the write command message (step 2119). Here, the handle value notification message of step 2119 includes a type parameter and a value parameter. The type parameter is set as a first value, e.g., '0x00,' indicating the indicator, and the value parameter is set as a second value, e.g., '0x03.' That is, the value parameter indicates the Distance Rsp.

Further, receiving the write command message, the OOB device 1901 transmits its PIN code based on a sound signal to perform the operation of detecting the distance from the smartphone 1903 (step 2121), and the smartphone 1903 also sends out a sound signal (step 2123).

Having received the sound signal from the smartphone 1903, the OOB device 1901 sends a handle value notification message to the smartphone 1903 (step 2125). Here, the handle value notification message of step 2125 includes a type parameter and a value parameter. The type parameter is set as, e.g., a second value, e.g., '0x10,' and the value parameter is set as, e.g., a third value, e.g., 'xx.' That is, the type parameter indicates peak detection.

Having received the handle value notification message from the OOB device 1901, the smartphone 1903 transmits a write command message to the OOB device 1501 (step 2127). Here, the write command message includes a type parameter and a value parameter. The type parameter is, e.g., a second value, e.g., '0x11,' and the value parameter is, e.g., a third value, e.g., 'xx.' In other words, the type parameter denotes the distance result, and the value parameter is set to be the same as the value parameter contained in the handle value notification message.

Having transmitted the write command message to the OOB device 1901, the smartphone 1903 detects that the OOB device 1901 is present in the same space as the smartphone 1903 (step 2129). The smartphone 1903 then transmits the write command message to the OOB device 1901 (step 2131). The write command message of step 2123 includes a type parameter and a value parameter. The type parameter is set as, e.g., a fourth value, e.g., '0x20,' and the value parameter is set as, e.g., a third value, e.g., 'xx.' In other words, the type parameter denotes the Authentication Address, and the value parameter is set to be the same as the value parameter contained in the handle value notification message.

After transmitting the write command message, the smartphone 1903 transmits a BLE Advertisement message to the OOB device 1901 (step 2133). The BLE Advertisement message includes a P2P Connection Ready parameter and an Authentication Address parameter. The P2P Connection Ready parameter and the Authentication Address parameter are the same as those described above, and a detailed description thereof is omitted here. In the BLE Advertisement message of step 2133, the P2P Connection Ready parameter is set as 1.

Having received the BLE Advertisement message from the smartphone 1903, the OOB device 1901 detects that the OOB device 1901 is present in the same space as the smartphone 1903 and detects the distance between the OOB device 1901 and the smartphone 1903 (step 2135). Having detected the presence in the same space as the smartphone 1903 and the distance between the OOB device 1901 and the smartphone 1903, the OOB device 1901 sets up a Bluetooth connection with the smartphone 1903 (step 2137).

If the Bluetooth connection is thus set up between the OOB device 1901 and the smartphone 1903, the OOB device 1901 and the smartphone 1903 are paired (step 2139).

Although FIG. 21 illustrates another example of a process of transmitting and receiving signals as per another example of an operation scenario of applying a process of transmitting and receiving data based on sound signals in a wireless communication system according to an embodiment of the present disclosure, various changes may be made to FIG. 21. As an example, although the continuous steps are shown in FIG. 21, the steps of FIG. 21 may overlap or arise in parallel or in different order, or several number of times.

Another example of a process for transmitting and receiving signals as per another example of an operation scenario of applying a processor for transmitting and receiving data based on sound signals in a wireless communication system according to an embodiment of the present disclosure has been described with reference to FIG. 21. Now described with reference to FIG. 22 is still another example of signal transmission and reception as per another operation scenario example of applying a process for transmitting and receiving data based on sound signals in a wireless communication system according to an embodiment of the present disclosure.

Figure 22:
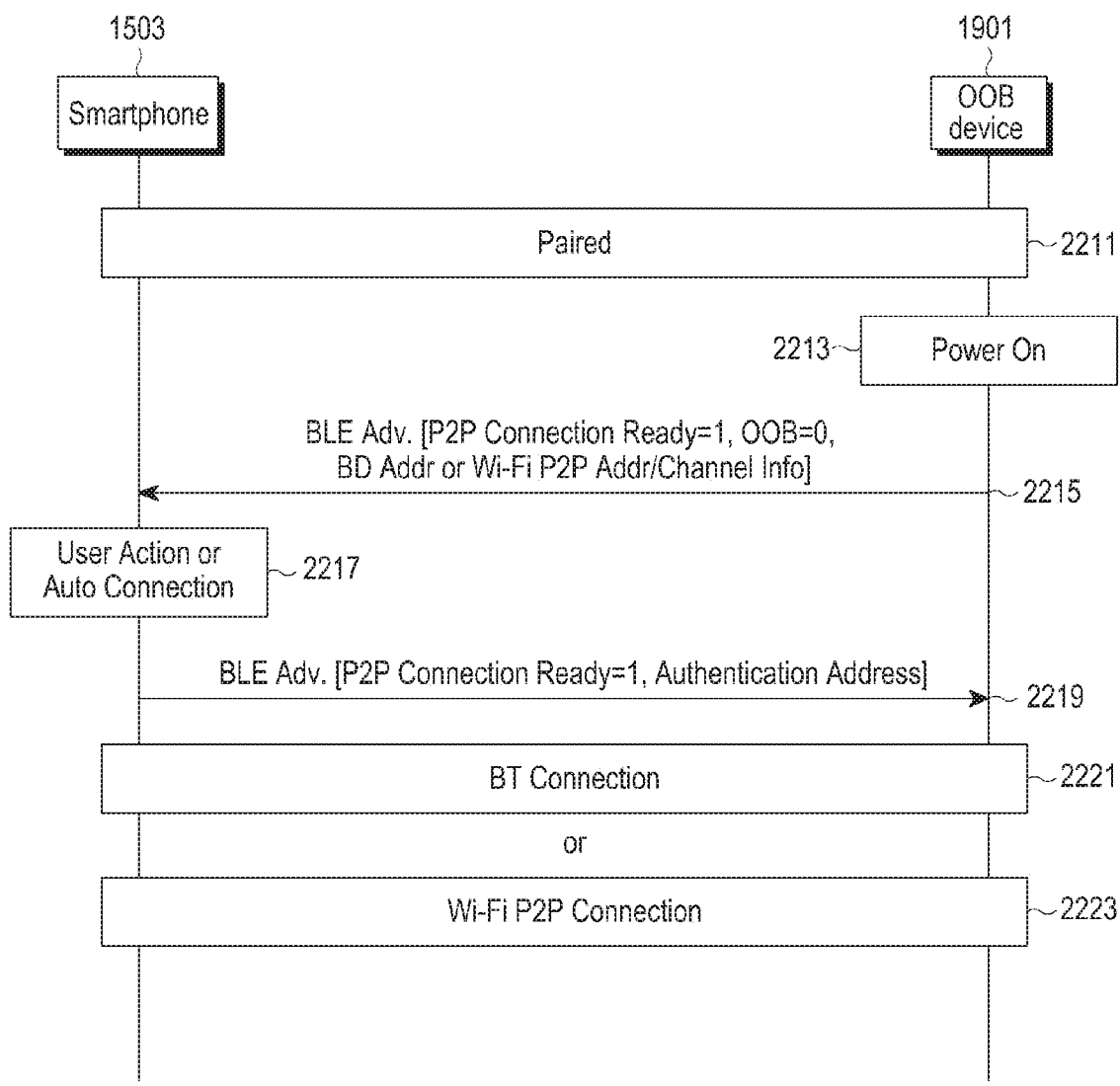
FIG. 22 is a signal flowchart schematically illustrating still another example of a process of transmitting and receiving signals as per another example of an operation scenario of applying a process of transmitting and receiving data based on sound signals in a wireless communication system according to an embodiment of the present disclosure.

FIG. 22 is a signal flowchart schematically illustrating still another example of a process of transmitting and receiving signals as per another example of an operation scenario of applying a process of transmitting and receiving data based on sound signals in a wireless communication system according to an embodiment of the present disclosure.

Referring to FIG. 22, the wireless communication system includes an OOB device 1901 and a smartphone 1903. Although FIG. 22 sets forth the OOB device 1901 for ease of description, it should be noted that the OOB device 1901 is, rather than an actual OOB device, a device being paired with another device after initial power-on.

While the smartphone 1903 remains paired with the OOB device 1901 (step 2211), if the OOB device 1901 powers on (step 2213), then the OOB device 1901 sends out a BLE Advertisement message (step 2215). It should be noted that the BLE Advertisement message is denoted by BLE Adv. message for convenience in FIG. 21. The BLE Advertisement message includes a P2P Connection Ready parameter, an OOB parameter, and a BD Addr or Wi-Fi P2P Addr/Channel Info parameter. The P2P Connection Ready parameter, the OOB parameter, and the BD Addr or Wi-Fi P2P Addr/Channel Info parameter are the same as those described above, and no detailed description thereof is presented. Further, in the BLE Advertisement message of step 2215, the P2P Connection Ready parameter is set as 1, and the OOB parameter is set as 0.

Having received the BLE Advertisement message from the OOB device 1901, the smartphone 1903 detects a user action or automated connection request that may be caused by the user (step 2217). Having detected the user action or automated connection request, the smartphone 1903 sends out a BLE Advertisement message (step 2219). Here, the BLE Advertisement message includes a P2P Connection Ready parameter and an Authentication Address parameter. The P2P Connection Ready parameter and the Authentication Address parameter are the same as those described above, and a detailed description thereof is omitted here. In the BLE Advertisement message of step 2219, the P2P Connection Ready parameter is set as 1.

The 00B device 1901 having received the BLE Advertisement message from the smartphone 1903 sets up a Bluetooth connection with the smartphone 1903 (step 2221) or a Wi-Fi P2P connection (step 2223).

Although FIG. 22 illustrates still another example of a process of transmitting and receiving signals as per another example of an operation scenario of applying a process of transmitting and receiving data based on sound signals in a wireless communication system according to an embodiment of the present disclosure, various changes may be made to FIG. 22. As an example, although the continuous steps are shown in FIG. 22, the steps of FIG. 22 may overlap or arise in parallel or in different order, or several number of times.

Still another example of a process for transmitting and receiving signals as per an operation scenario of applying a processor for transmitting and receiving data based on sound signals in a wireless communication system according to an embodiment of the present disclosure has been described with reference to FIG. 22. Now described with reference to FIG. 23 is still another example of an operation scenario of applying a process for transmitting and receiving data based on sound signals in a wireless communication system according to an embodiment of the present disclosure.

Figure 23:
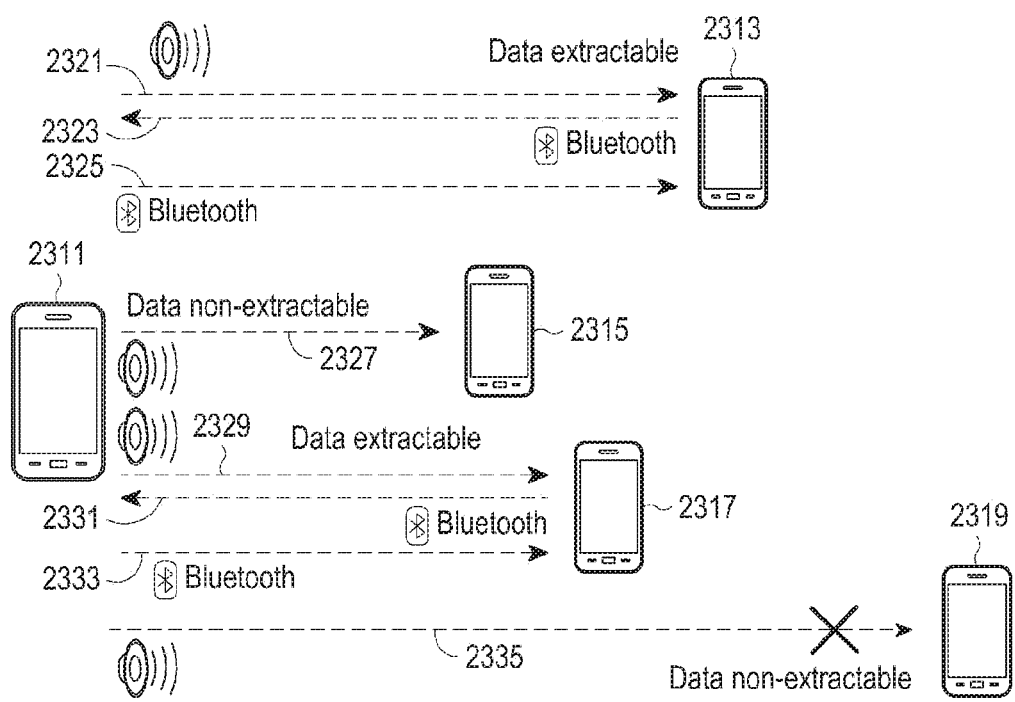
FIG. 23 is a view schematically illustrating still another example of an operation scenario of applying a process of transmitting and receiving data based on sound signals in a wireless communication system according to an embodiment of the present disclosure.

FIG. 23 is a view schematically illustrating still another example of an operation scenario of applying a process of transmitting and receiving data based on sound signals in a wireless communication system according to an embodiment of the present disclosure.

Referring to FIG. 23, it should be noted that another example operation scenario of applying a process for transmitting and receiving data based on sound signals as shown in FIG. 23 is such that a service triggering operation is carried out on multiple devices located within a particular distance based on N geo-fencing.

The wireless communication system includes an initiator device 2311 and multiple ambient devices, e.g., four ambient devices, e.g., device #1 2313, device #2 2315, device #3 2317, and device #4 2319.

The initiator device 2311 sends its PIN code to the ambient devices using short range sound signals. Among the ambient devices, those receiving the sound signals from the initiator device 2311 may detect the PIN code of the initiator device 2311 based on their received sound signals. Having detected the PIN code of the initiator device 2311, the ambient devices send the PIN code of the initiator device 2311, which the ambient devices have detected, to the initiator device 2311.

The initiator device 2311 performs a service triggering operation on the ambient devices that have sent the PIN code of the initiator device 2311.

Such service triggering procedure is described below in detail.

First, the initiator device 2311 sends its PIN code using sound signals (steps 2321, 2327, 2329, and 2335). Here, it is assumed that the initiator device 2311 has sent the PIN code using short range sound signals and that the distance between each of device #1 2313, device #2 2315, and device #3 2317 and the initiator device 2311 is the short range or less while the distance between device #4 2319 and the initiator device 2311 exceeds the short range.

Then, each ambient device of the initiator device 2311 may extract the PIN code which the initiator device 2311 has sent based on the distance from the initiator device 2311 and sound signal analysis capabilities.

That is, device #1 2313 may not only analyze the sound signal that the initiator device 2311 has sent, but also—since the distance between device #1 2313 and the initiator device 2311 is not more than the short range—detect the PIN code that the initiator device 2311 has sent. Having detected the PIN code of the initiator device 2311, device #1 2313 sends the detected PIN code of the initiator device 2311 to the initiator device 2311 (step 2323). Thus, the initiator device 2311 performs a service triggering operation with device #1 2313 (step 2325).

Device #2 2315 is assumed to be unable to analyze the sound signal transmitted from the initiator device 2311. As an example, device #2 2315 might not be able to analyze the sound signal that the initiator device 2311 has sent since it may be produced by a different manufacturer from the initiator device 2311. Accordingly, device #2 2315 cannot detect the PIN code of the initiator device 2311 and is thus unable to send the PIN code of the initiator device 2311 to the initiator device 2311. Thus, the initiator device 2311 cannot perform a service triggering operation with device #2 2315.

Device #3 2317 may not only analyze the sound signal that the initiator device 2311 has sent, but also—since the distance between device #3 2317 and the initiator device 2311 is not more than the short range—detect the PIN code that the initiator device 2311 has sent. Having detected the PIN code of the initiator device 2311, device #3 2317 sends the detected PIN code of the initiator device 2311 to the initiator device 2311 (step 2331). Thus, the initiator device 2311 performs a service triggering operation with device #3 2317 (step 2333).

Since the distance between device #4 2319 and the initiator device 2311 exceeds the short range, device #4 2319 cannot receive the sound signal transmitted from the initiator device 2311. Accordingly, device #4 2319 cannot detect the PIN code of the initiator device 2311 and is thus unable to send the PIN code of the initiator device 2311 to the initiator device 2311. Thus, the initiator device 2311 cannot perform a service triggering operation with device #4 2319.

In the operation scenario where service triggering operations are performed on multiple devices present within a particular distance based on 1:N geo-fencing as set forth above in connection with FIG. 23, although the initiator device sends the PIN code using a sound signal only once, it may be able to perform service triggering operations with the multiple devices.

Further, in the operation scenario where service triggering operations are performed on multiple devices present within a particular distance based on 1:N geo-fencing as set forth above in connection with FIG. 23, the initiator device may choose devices to perform service triggering operations not only based on the distance characteristics of sound signals but also based on whether analysis on sound signals can be performed.

Still another example of an operation scenario of applying a processor for transmitting and receiving data based on sound signals in a wireless communication system according to an embodiment of the present disclosure has been described with reference to FIG. 23. Now described with reference to FIG. 24 is still another example of an operation scenario of applying a process for transmitting and receiving data based on sound signals in a wireless communication system according to an embodiment of the present disclosure.

Figure 24:
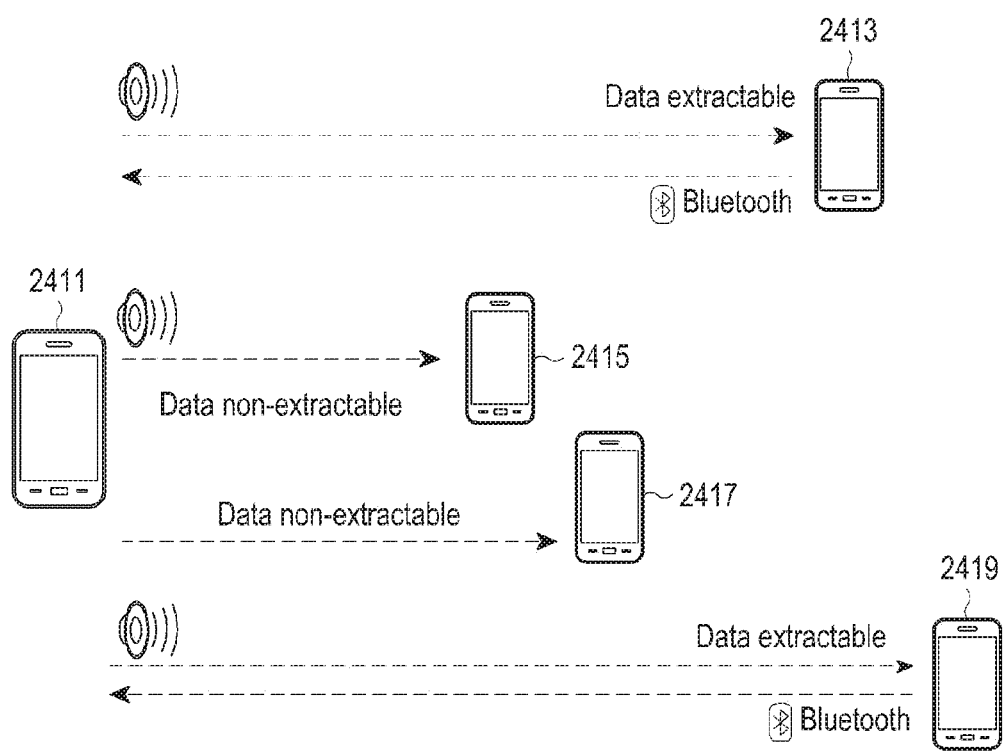
FIG. 24 is a view schematically illustrating still another example of an operation scenario of applying a process of transmitting and receiving data based on sound signals in a wireless communication system according to an embodiment of the present disclosure.

FIG. 24 is a view schematically illustrating still another example of an operation scenario of applying a process of transmitting and receiving data based on sound signals in a wireless communication system according to an embodiment of the present disclosure.

Referring to FIG. 24, it should be noted that another example operation scenario of applying a process for transmitting and receiving data based on sound signals as shown in FIG. 24 is such that a service triggering operation is carried out on multiple devices located outside a particular distance based on exclusive geo-fencing.

The wireless communication system includes an initiator device 2411 and multiple ambient devices, e.g., four ambient devices, e.g., device #1 2413, device #2 2415, device #3 2417, and device #4 2419.

The initiator device 2411 includes multiple speakers, e.g., two speakers, e.g., speaker #1 and speaker #2. The initiator device 2411 sends its PIN code to the ambient devices through speaker #1 using long range sound signals. The initiator device 2411 transmits, through speaker #2, an inverted signal of the long range sound signal that has been transmitted through speaker #1 using the short range sound signal.

Accordingly, the ambient devices located within the short range from the initiator device 2411 cannot detect the PIN code of the initiator device 2411 through an active noise canceling operation, and the ambient devices located within the long range from the initiator device 2411 may detect the PIN code of the initiator device 2411. Thus, having detected the PIN code of the initiator device 2411, the ambient devices present within the long range from the initiator device 2411 send the detected PIN code of the initiator device 2411 to the initiator device 2411.

Such service triggering procedure is described below in detail.

First, the initiator device 2411 sends its PIN code using sound signals. Here, it is assumed that the initiator device 2411 has sent the PIN code using long range sound signals and that the distance between each of device #2 2415 and device #3 2417 and the initiator device 2411 is the long range or less while the distance between each of device #1 2413 and device #4 2319 and the initiator device 2311 exceeds the long range.

Then, each ambient device of the initiator device 2411 may extract the PIN code which the initiator device 2411 has sent based on the distance from the initiator device 2411 and an active noise canceling operation.

That is, since the distance between device #1 2413 and the initiator device 2411 exceeds the long range, device #1 2413 may detect the PIN code that the initiator device 2411 has sent. Having detected the PIN code of the initiator device 2411, device #1 2413 sends the detected PIN code of the initiator device 2411 to the initiator device 2411. Thus, the initiator device 2411 performs a service triggering operation with device #1 2413.

Since the distance between each of device #2 2415 and device #3 2417 and the initiator device 2411 is not more than the long range, each of device #2 2415 and device #3 2417 cannot analyze the sound signal that the initiator device 2411 has sent through an active noise canceling operation. Accordingly, each of device #2 2415 and device #3 2417 cannot detect the PIN code of the initiator device 2411 and is thus unable to send the PIN code of the initiator device 2411 to the initiator device 2411. Thus, the initiator device 2411 cannot perform a service triggering operation with device #2 2415.

Device #4 2419 may not only analyze the sound signal that the initiator device 2411 has sent, but also—since the distance between device #4 2419 and the initiator device 4311 exceeds the long range—detect the PIN code that the initiator device 2411 has sent. Having detected the PIN code of the initiator device 2411, device #4 2419 sends the detected PIN code of the initiator device 2411 to the initiator device 2411. Thus, the initiator device 2411 performs a service triggering operation with device #4 2419.

In the operation scenario where service triggering operations are performed on multiple devices present outside a particular distance based on exclusive geo-fencing as set forth above in connection with FIG. 24, the initiator device may perform service triggering operations with multiple devices by sending the PIN code using original sound symbols through two speakers and simultaneously sending inverted signals of the original sound symbols using inverted sound signals.

Further, in the operation scenario where service triggering operations are performed on multiple devices present outside a particular distance based on exclusive geo-fencing as set forth above in connection with FIG. 24, the initiator device may choose devices to perform service triggering operations based on the distance characteristics of sound signals.

Still another example of an operation scenario of applying a processor for transmitting and receiving data based on sound signals in a wireless communication system according to an embodiment of the present disclosure has been described with reference to FIG. 24. Now described with reference to FIG. 25 is still another example of an operation scenario of applying a process for transmitting and receiving data based on sound signals in a wireless communication system according to an embodiment of the present disclosure.

Figure 25:
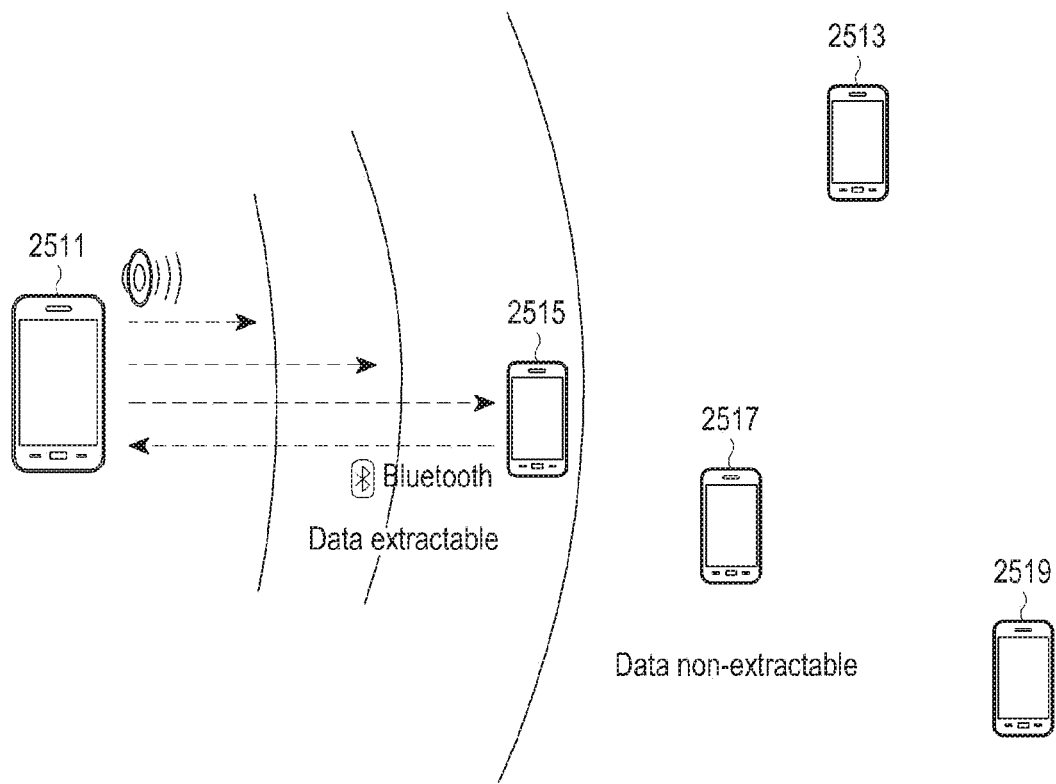
FIG. 25 is a view schematically illustrating still another example of an operation scenario of applying a process of transmitting and receiving data based on sound signals in a wireless communication system according to an embodiment of the present disclosure.

FIG. 25 is a view schematically illustrating still another example of an operation scenario of applying a process of transmitting and receiving data based on sound signals in a wireless communication system according to an embodiment of the present disclosure.

Referring to FIG. 25, it should be noted that still another example operation scenario of applying a process for transmitting and receiving data based on sound signals as shown in FIG. 25 is such that devices are discovered based on variations in volume of sound signals.

The wireless communication system includes an initiator device 2511 and multiple ambient devices, e.g., four ambient devices, e.g., device #1 2513, device #2 2515, device #3 2517, and device #4 2519.

The initiator device 2511 sets the sound signal volume to the lowest level and sends out its PIN code through the sound signal with the lowest volume level. The initiator device 2511 continues to send out the sound signal while incrementing the volume of the sound signal by preset volume steps until a device is detected that detects the PIN code from the initiator device 2511 and sends out, i.e., until the PIN code of the initiator device 2511 is received from another device.

Meanwhile, having detected the PIN code transmitted from the initiator device 2511, the ambient device transmits, to the initiator device 2511, the PIN code that the ambient device has detected.

As shown in FIG. 25, the initiator device 2511 transmits the PIN code of the initiator device 2511 through sound signals until there is an ambient device that transmits the PIN code of the initiator device 2511, i.e., until device #2 2515 sends the PIN code of the initiator device 2511, by sending out sound signals while letting the volume up from the lowest volume level based on volume steps on the PIN code of the initiator device 2511.

As set forth above in connection with FIG. 25, in the operation scenario where devices are discovered based on volume variations in sound signals, the initiator device may discover ambient devices while incrementing the volume of sound signals.

Further, as set forth above in connection with FIG. 25, in the operation scenario where devices are discovered based on volume variations in sound signals, the initiator device may discover the closest ambient device to the initiator device even without detecting the exact distance between the initiator device and ambient devices.

Still another example of an operation scenario of applying a processor for transmitting and receiving data based on sound signals in a wireless communication system according to an embodiment of the present disclosure has been described with reference to FIG. 25. Now described with reference to FIG. 26 is still another example of an operation scenario of applying a process for transmitting and receiving data based on sound signals in a wireless communication system according to an embodiment of the present disclosure.

Figure 26:
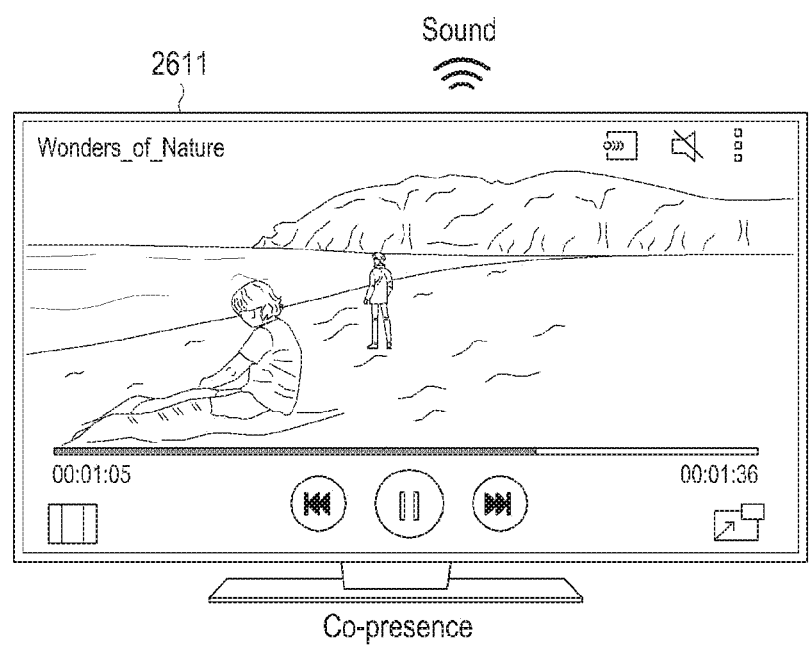
FIG. 26 is a view schematically illustrating still another example of an operation scenario of applying a process of transmitting and receiving data based on sound signals in a wireless communication system according to an embodiment of the present disclosure.

FIG. 26 is a view schematically illustrating still another example of an operation scenario of applying a process of transmitting and receiving data based on sound signals in a wireless communication system according to an embodiment of the present disclosure.

Referring to FIG. 26, it should be noted that still another example operation scenario of applying a process for transmitting and receiving data based on sound signals as shown in FIG. 26 is such that an automated power saving mode is carried out.

Where the distance between a first device 2611, e.g., a TV 2611, and a second device (not shown in FIG. 26), e.g., a smartphone, is a threshold distance or more while the first device 2611 is playing video, the TV 2611 executes a co-presence function. As the co-presence function is executed, the TV 2611 detects whether the TV 2611 is present in the same space as the smartphone. Schemes for detecting whether devices exist within the same space have been described above, and no detailed description thereof is given here.

Upon failing to detect the smartphone present within the same space as the TV 2611, the TV 2611 pauses playing the video on the TV 2611 and shifts its operation mode to the automated power saving mode.

Still another example of an operation scenario of applying a processor for transmitting and receiving data based on sound signals in a wireless communication system according to an embodiment of the present disclosure has been described with reference to FIG. 26. Now described with reference to FIG. 27 is still another example of an operation scenario of applying a process for transmitting and receiving data based on sound signals in a wireless communication system according to an embodiment of the present disclosure.

Figure 27:
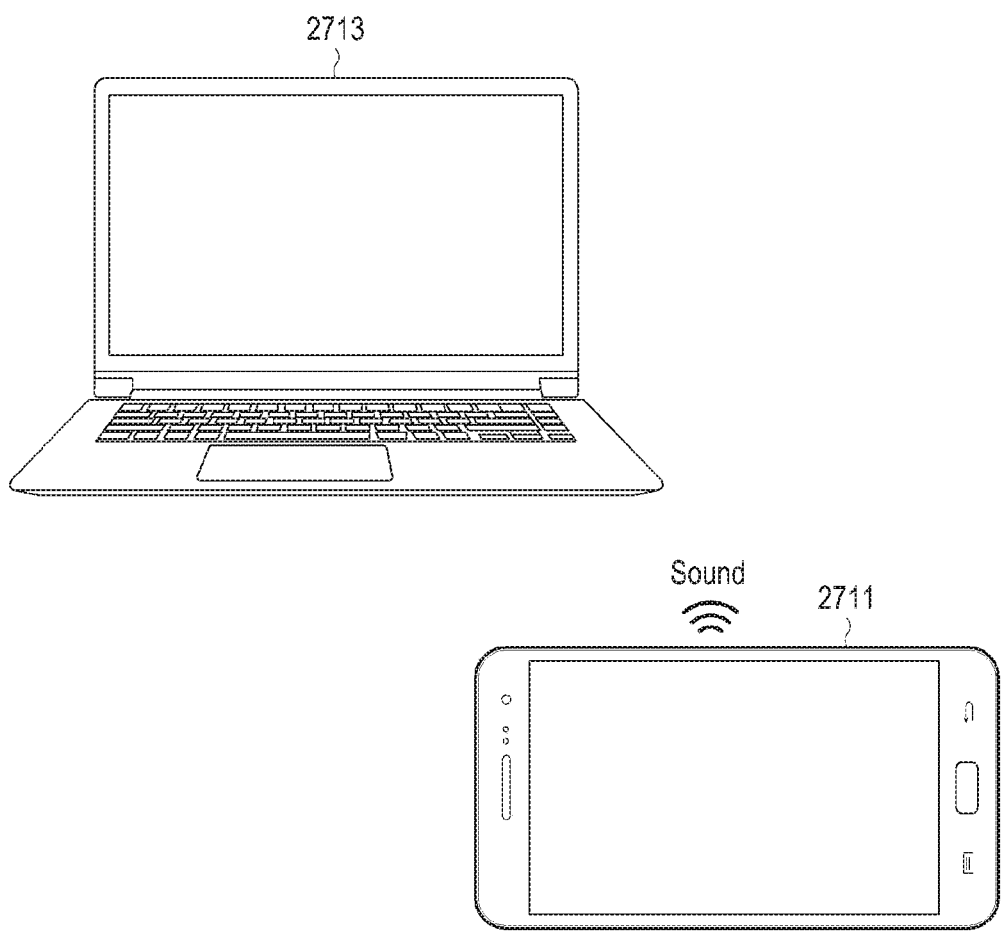
FIG. 27 is a view schematically illustrating still another example of an operation scenario of applying a process of transmitting and receiving data based on sound signals in a wireless communication system according to an embodiment of the present disclosure.

FIG. 27 is a view schematically illustrating still another example of an operation scenario of applying a process of transmitting and receiving data based on sound signals in a wireless communication system according to an embodiment of the present disclosure.

Referring to FIG. 27, it should be noted that still another example operation scenario of applying a process for transmitting and receiving data based on sound signals as shown in FIG. 27 is such that an automated log-in procedure is performed per account.

Where the distance between a first device, e.g., a smartphone 2711, and a second device, e.g., a laptop PC 2713, is not more than a threshold distance, the laptop PC 2713 examines whether the account for the smartphone 2711 exists among accounts registered in the laptop PC 2713. Where the account for the smartphone 2711 is among the accounts registered in the laptop PC 2713 as a result of the examination, the laptop PC 2713 performs an automated account log-in operation and changes the settings of the laptop PC 2713 to be appropriate for the smartphone 2711.

In contrast, unless the account for the smartphone 2711 is among the accounts registered in the laptop PC 2713 as a result of the examination, the laptop PC 2713 identifies whether to register the user account in the laptop PC 2713 on the device of the smartphone 2711 through a sound signal, and where the smartphone 2711 intends to register the user account in the laptop PC 2713, it registers the user account for the smartphone 2711.

Meanwhile, the smartphone 2711 performs the automated account log-in procedure, or after performing the user account registering procedure, performs the automated account log-in procedure, or the smartphone 2711 performs the process that used to be performed before the user account registering procedure, as it is.

Still another example of an operation scenario of applying a processor for transmitting and receiving data based on sound signals in a wireless communication system according to an embodiment of the present disclosure has been described with reference to FIG. 27. Now described with reference to FIG. 28 is still another example of an operation scenario of applying a process for transmitting and receiving data based on sound signals in a wireless communication system according to an embodiment of the present disclosure.

Figure 28:
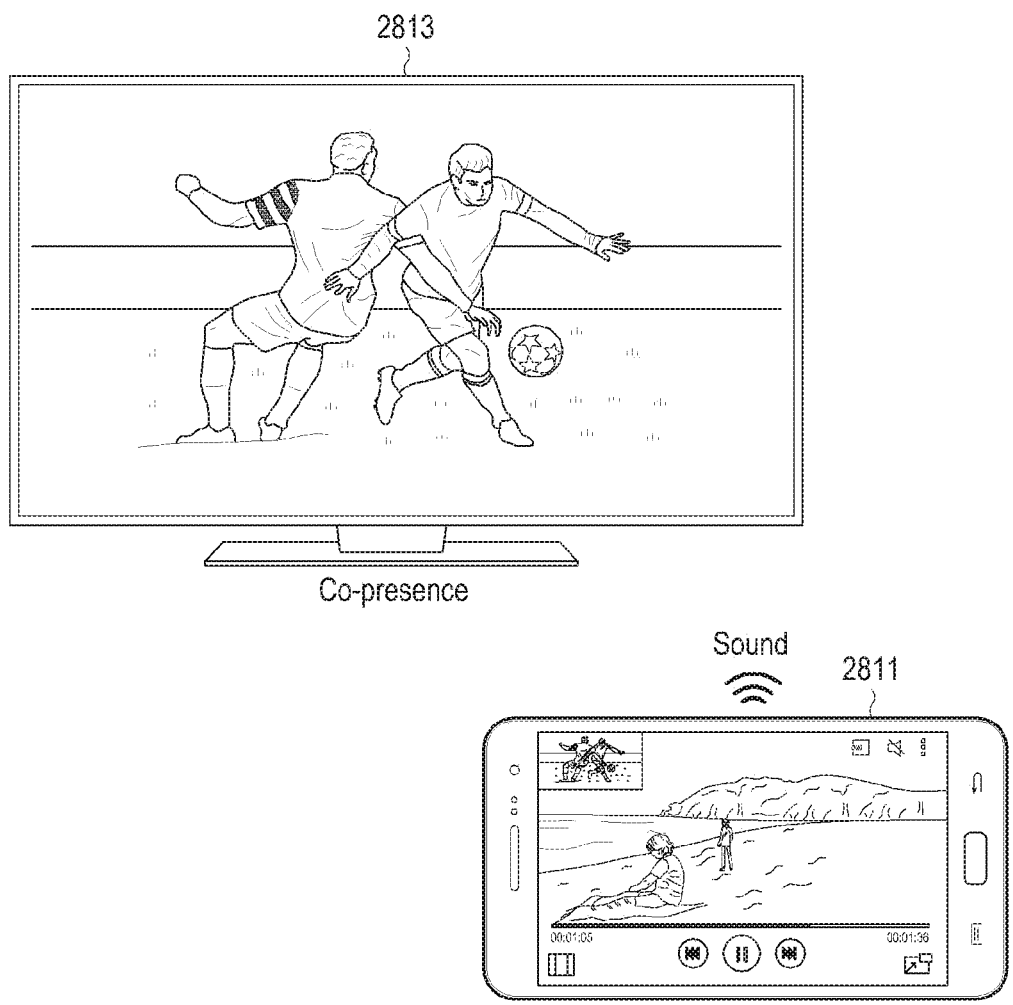
FIG. 28 is a view schematically illustrating still another example of an operation scenario of applying a process of transmitting and receiving data based on sound signals in a wireless communication system according to an embodiment of the present disclosure.

FIG. 28 is a view schematically illustrating still another example of an operation scenario of applying a process of transmitting and receiving data based on sound signals in a wireless communication system according to an embodiment of the present disclosure.

Referring to FIG. 28, it should be noted that still another example operation scenario of applying a process for transmitting and receiving data based on sound signals as shown in FIG. 28 is such that a gravity procedure is carried out.

Where the distance between a first device playing video, e.g., a smartphone 2811, and a second device, e.g., a TV 2813, is not more than a threshold distance, the TV 2813 examines whether the smartphone 2811 and the TV 2813 are present in the same space and whether the distance between the smartphone 2811 and the TV 2813 are less than a preset threshold distance.

Where the result of examination reveals that the smartphone 2811 and the TV 2813 are present in the same space, and the distance between the smartphone 2811 and the TV 2813 is less than a preset threshold distance, the TV 2813 outputs to the smartphone 2811 a message indicating that there is a TV, i.e., the TV 2813, available to the smartphone 2811. Here, the message may be in the form of, e.g., an icon.

Meanwhile, despite the result of examination that the smartphone 2811 and the TV 2813 are present in the same space, and the distance between the smartphone 2811 and the TV 2813 is less than a preset threshold distance, if there is another smartphone using the TV 2813, the TV 2813 abstains from outputting to the smartphone 2811 a message indicating that there is an available TV, i.e., the TV 2813.

Meanwhile, where the icon indicating the presence of the TV 2813 is displayed on the smartphone 2811 and is selected on the smartphone 2811, the video being played on the smartphone 2811 is played on the TV 2813.

Still another example of an operation scenario of applying a processor for transmitting and receiving data based on sound signals in a wireless communication system according to an embodiment of the present disclosure has been described with reference to FIG. 28. Now described with reference to FIG. 29 is still another example of an operation scenario of applying a process for transmitting and receiving data based on sound signals in a wireless communication system according to an embodiment of the present disclosure.

Figure 29:
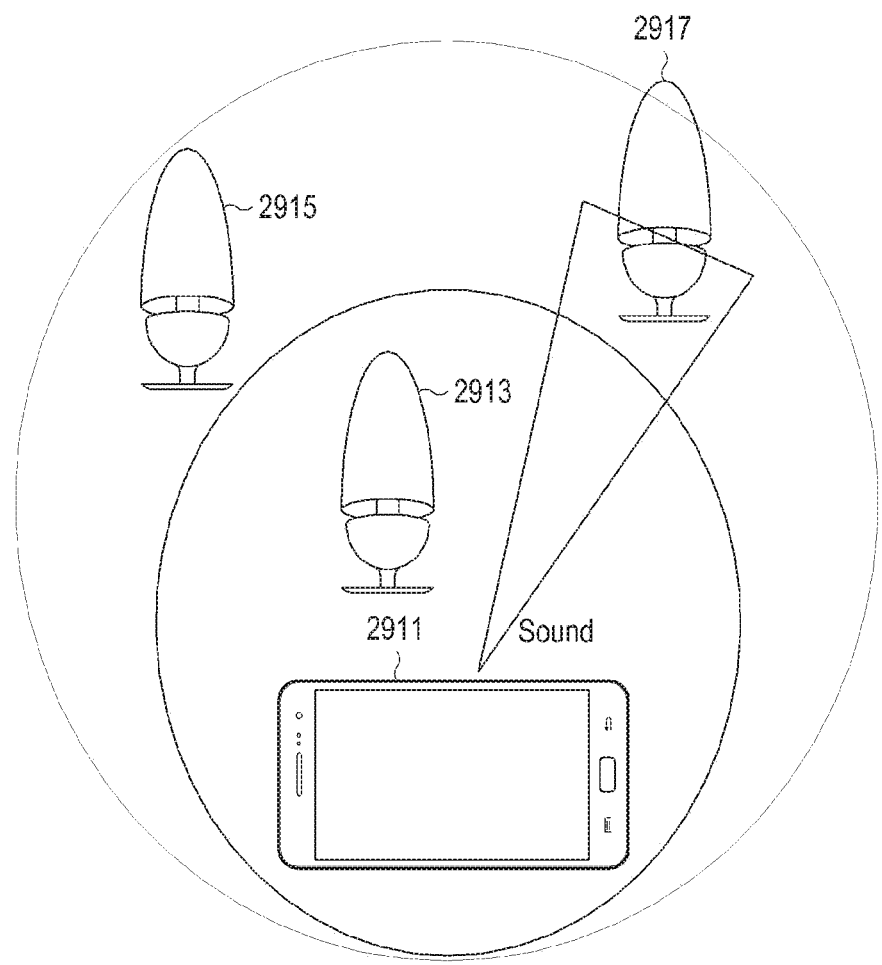
FIG. 29 is a view schematically illustrating still another example of an operation scenario of applying a process of transmitting and receiving data based on sound signals in a wireless communication system according to an embodiment of the present disclosure.

FIG. 29 is a view schematically illustrating still another example of an operation scenario of applying a process of transmitting and receiving data based on sound signals in a wireless communication system according to an embodiment of the present disclosure.

Referring to FIG. 29, it should be noted that still another example operation scenario of applying a process for transmitting and receiving data based on sound signals as shown in FIG. 29 is such that a particular speaker targeting procedure is performed.

A first device 2911, e.g., a smartphone 2911, executes a speaker application (App) on the smartphone 2911. It is assumed that there are multiple speakers, e.g., speaker #1 2913, speaker #2 2915, and speaker #3 2917, around the smartphone 2911. The smartphone 2911 includes a multi-speaker. The smartphone 2911 targets its desired speaker using the multi-speaker. It is assumed in FIG. 29 that the smartphone 2911 targets speaker #1 2913.

Accordingly, the smartphone 2911 may send desired music only to the targeted speaker, i.e., speaker #1 2913.

Still another example of an operation scenario of applying a processor for transmitting and receiving data based on sound signals in a wireless communication system according to an embodiment of the present disclosure has been described with reference to FIG. 29. Now described with reference to FIG. 30 is still another example of an operation scenario of applying a process for transmitting and receiving data based on sound signals in a wireless communication system according to an embodiment of the present disclosure.

Figure 30:
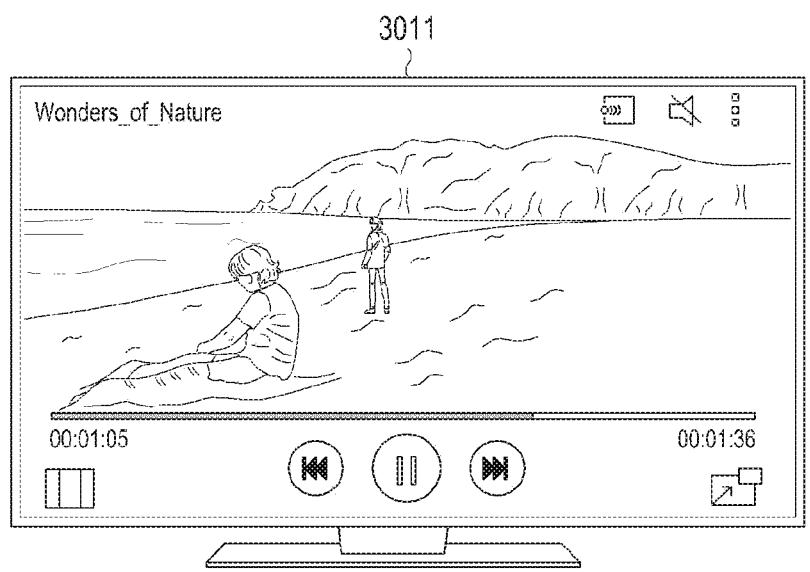
FIG. 30 is a view schematically illustrating still another example of an operation scenario of applying a process of transmitting and receiving data based on sound signals in a wireless communication system according to an embodiment of the present disclosure.
Figure 30:
Figure 30:
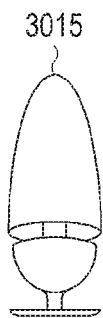

FIG. 30 is a view schematically illustrating still another example of an operation scenario of applying a process of transmitting and receiving data based on sound signals in a wireless communication system according to an embodiment of the present disclosure.

Referring to FIG. 30, it should be noted that still another example operation scenario of applying a process for transmitting and receiving data based on sound signals as shown in FIG. 30 is such that a particular speaker targeting procedure is performed as per another example.

A first device, e.g., a smartphone (not shown in FIG. 30) executes a speaker App. It is assumed that there are a TV 3011 and multiple speakers, e.g., speaker #1 3013 and speaker #2 3015, around the smartphone. The smartphone includes a multi-speaker. The smartphone targets its desired speaker using the multi-speaker. It is assumed in FIG. 30 that the smartphone targets speaker #1 3013.

Accordingly, the smartphone may send desired music only to the targeted speaker, i.e., speaker #1 3013.

Meanwhile, there is proposed a discovery packet according to an embodiment of the present disclosure, which is described below in detail.

The discovery packet is used for mutual recognition among devices, and an example of the discovery packet is a BLE Advertisement message.

It may be needed to detect the state of a device requiring an automated connection service through a discovery procedure, and each device periodically sends out BLE Advertisement messages for mutual recognition among the devices. Accordingly, the BLE Advertisement message includes parameters indicating the state of a corresponding device, i.e., an On/Off parameter, an AP Connected parameter, an AP Connection Required parameter, a P2P Connection Ready parameter, an OOB parameter, and an Account Required parameter. The AP Connected parameter, the AP Connection Required parameter, the P2P Connection Ready parameter, and the OOB parameter are the same as those described above, and no detailed description thereof is given here.

The On/Off parameter may be implemented as, e.g., one bit. Where the On/Off parameter is set as, e.g., a first value, e.g., '1,' this indicates that the corresponding device is being driven, and where the On/Off parameter is set as, e.g., a second value, e.g., '0,' this indicates that the corresponding device is not being driven.

The Account Required parameter, as a parameter indicating whether an account is necessary, may be implemented as, e.g., one bit. The Account Required parameter being set as a first value, e.g., '1,' denotes that an account is necessary, and the Account Required parameter being set as, e.g., a second value, e.g., '0,' denotes that no account is necessary.

Accordingly, each device may detect the state of the ambient devices based on the On/Off parameter, AP Connected parameter, AP Connection Required parameter, P2P Connection Ready parameter, OOB parameter, and Account Required parameter contained in the BLE Advertisement messages received from the ambient devices. Each device may use the so-detected state of the ambient devices in providing a service required for each device.

Figure 31A:
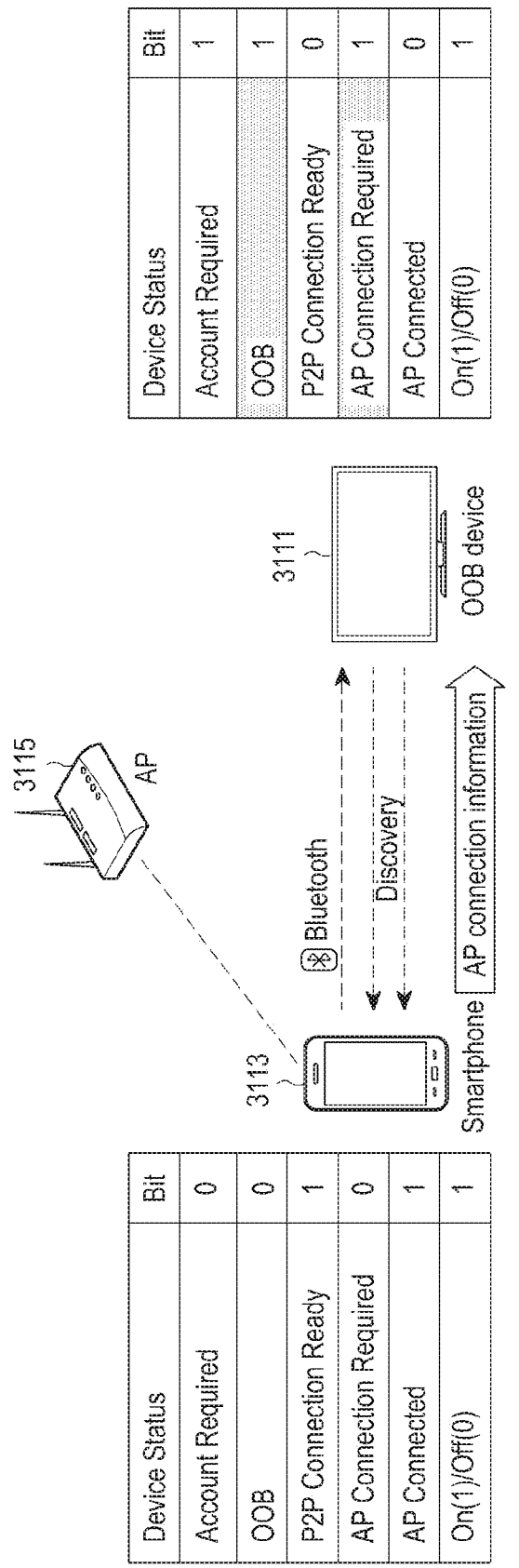
FIGS. 31a and 31b are views schematically illustrating a process of automatically setting up an AP connection based on a discovery packet in a wireless communication system according to an embodiment of the present disclosure.
Figure 31B:
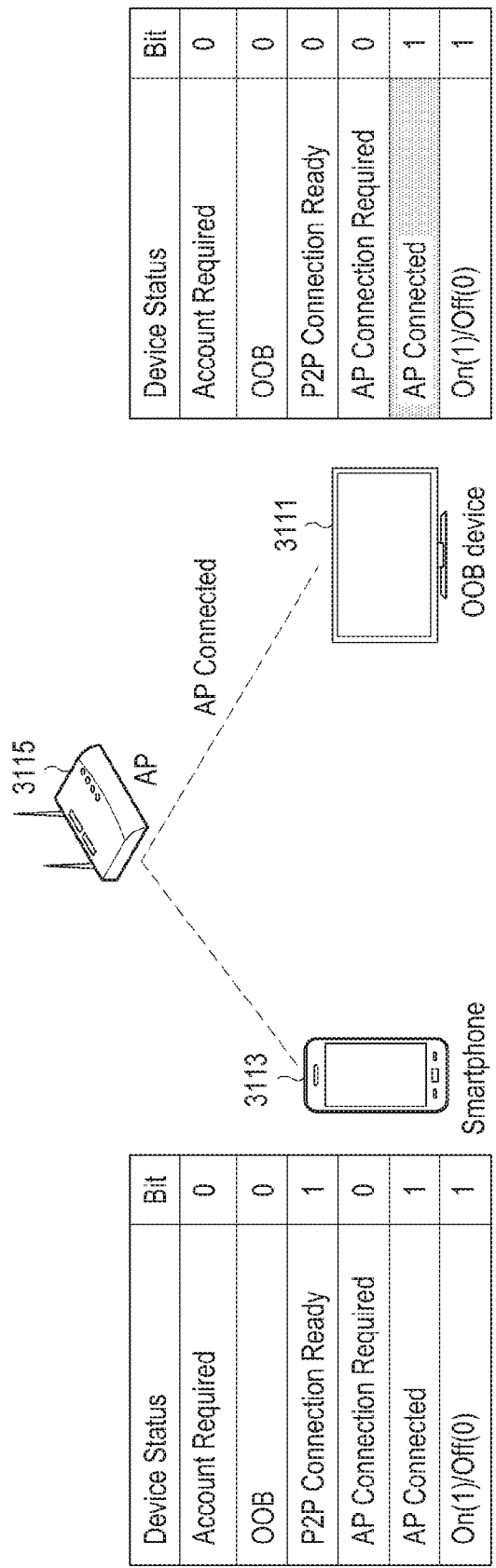

Now described with reference to FIGS. 31a and 31b is a process of automatically setting up an AP connection based on a discovery packet in a wireless communication system according to an embodiment of the present disclosure.

FIGS. 31a and 31b are views schematically illustrating a process of automatically setting up an AP connection based on a discovery packet in a wireless communication system according to an embodiment of the present disclosure.

Referring to FIGS. 31a and 31b, a second device 3113, e.g., a smartphone 3113, periodically sends out BLE Advertisement messages containing parameters indicating device state information of the smartphone 3113, i.e., On/Off parameter, AP Connected parameter, AP Connection Required parameter, P2P Connection Ready parameter, OOB parameter, and Account Required parameter.

Meanwhile, if a first device, e.g., an OOB device 3111, powers on, the OOB device 3111 sends out a BLE Advertisement message containing parameters indicating device state information of the OOB device 3111, i.e., On/Off parameter, AP Connected parameter, AP Connection Required parameter, P2P Connection Ready parameter, OOB parameter, and Account Required parameter.

The smartphone 3113 detects a request for account information and a request for connection with an AP 3115 through the BLE Advertisement message received from the OOB device 3111 after the OOB device 3111 has first powered on. Accordingly, the smartphone 3113 provides the AP connection information and account information that the smartphone 3113 retains to the OOB device 3111 through an inter-device connection.

The OOB device 3111 automatically connects to the AP 3115 and registers account based on the AP connection information and account information received from the smartphone 3113. The OOB device 3111, after connection to the AP 3115, sends out a BLE Advertisement message. Here, each of the parameters contained in the BLE Advertisement message transmitted from the OOB device 3111 after connection with the AP 3115 may differ from each of the parameters contained in the BLE Advertisement message transmitted from the OOB device 3111 before connection with the AP 3115, which is described below in detail.

Each of the parameters contained in the BLE Advertisement message transmitted from the OOB device 3111 before connection with the AP 3115 is as shown in Table 1 below.

TABLE 1

| Device Status | Bit |
| --- | --- |
| Account Required | 1 |
| OOB | 1 |
| P2P Connection Ready | 0 |
| AP Connection Required | 1 |
| AP Connected | 0 |
| On(1)/Off(0) | 1 |

Each of the parameters contained in the BLE Advertisement message transmitted from the OOB device 3111 after connection with the AP 3115 is as shown in Table 2 below.

TABLE 2

| Device Status | Bit |
| --- | --- |
| Account Required | 0 |
| OOB | 0 |
| P2P Connection Ready | 0 |
| AP Connection Required | 0 |
| AP Connected | 1 |
| On(1)/Off(0) | 1 |

A process for automatically setting up an AP connection based on a discovery packet in a wireless communication system according to an embodiment of the present disclosure has been described with reference to FIGS. 31a and 31b. Now described is a process for performing an automated P2P pairing operation based on a discovery packet in a wireless communication system according to an embodiment of the present disclosure.

Figure 32A:
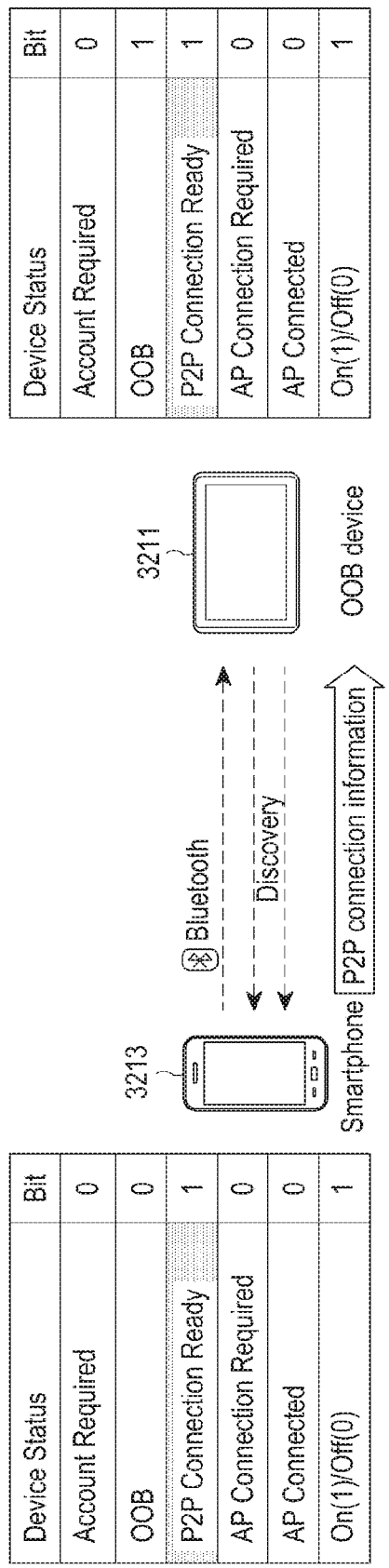
FIGS. 32a and 32b are views schematically illustrating a process of performing a P2P automated pairing operation based on a discovery packet in a wireless communication system according to an embodiment of the present disclosure.
Figure 32B:
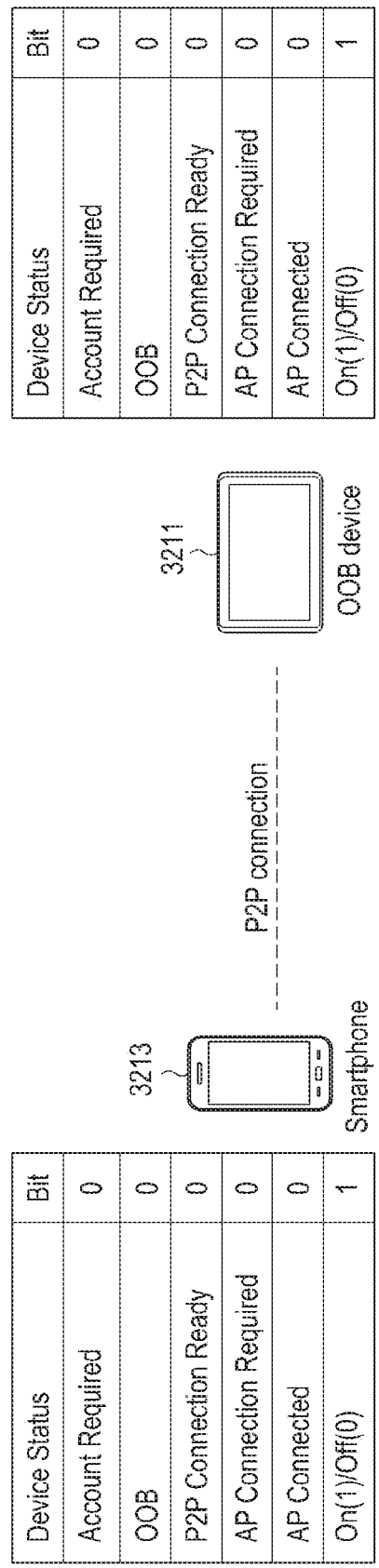

FIGS. 32a and 32b are views schematically illustrating a process of performing a P2P automated pairing operation based on a discovery packet in a wireless communication system according to an embodiment of the present disclosure.

Referring to FIGS. 32a and 32b, a second device, e.g., a smartphone 3213, periodically sends out BLE Advertisement messages containing parameters indicating device state information of the smartphone 3213, i.e., On/Off parameter, AP Connected parameter, AP Connection Required parameter, P2P Connection Ready parameter, OOB parameter, and Account Required parameter.

Meanwhile, if a first device, e.g., an OOB device 3211, powers on, the OOB device 3211 sends out a BLE Advertisement message containing parameters indicating device state information of the OOB device 3211, i.e., On/Off parameter, AP Connected parameter, AP Connection Required parameter, P2P Connection Ready parameter, OOB parameter, and Account Required parameter.

Accordingly, the smartphone 3213 receives the BLE Advertisement message from the OOB device 3211 and detects an attempt for the OOB device 3211 to establish a P2P connection with the smartphone 3213 based on the received BLE Advertisement message. Thus, the smartphone 3213 provides the P2P connection information that the smartphone 3213 retains to the OOB device 3211 through the inter-device connection.

Having received the P2P connection information from the smartphone 3213, the OOB device 3211 performs a connection operation with the smartphone 3213 based on the P2P connection information. The OOB device 3211, after connection with the smartphone 3213, sends out a BLE Advertisement message. Here, each of the parameters contained in the BLE Advertisement message transmitted from the OOB device 3211 after connection with the smartphone 3213 may differ from each of the parameters contained in the BLE Advertisement message transmitted from the OOB device 3211 before connection with the smartphone 3213, which is described below in detail.

Each of the parameters contained in the BLE Advertisement message transmitted from the OOB device 3211 before connection with the smartphone 3213 is as shown in Table 3 below.

TABLE 3

| Device Status | Bit |
| --- | --- |
| Account Required | 0 |
| OOB | 1 |

TABLE 3-continued

| Device Status | Bit |
| --- | --- |
| P2P Connection Ready | 1 |
| AP Connection Required | 0 |
| AP Connected | 0 |
| On(1)/Off(0) | 1 |

Each of the parameters contained in the BLE Advertisement message transmitted from the OOB device 3211 after connection with the smartphone 3213 is as shown in Table 4 below.

TABLE 4

| Device Status | Bit |
| --- | --- |
| Account Required | 0 |
| OOB | 0 |
| P2P Connecton Ready | 0 |
| AP Connection Required | 0 |
| AP Connected | 0 |
| On(1)/Off(0) | 1 |

A process for performing an automated P2P pairing operation based on a discovery packet in a wireless communication system according to an embodiment of the present disclosure has been described with reference to FIGS. 32a and 32b. Now described with reference to FIG. 33 is an example of an internal structure of a transmitting device in a wireless communication system according to an embodiment of the present disclosure.

Figure 33:
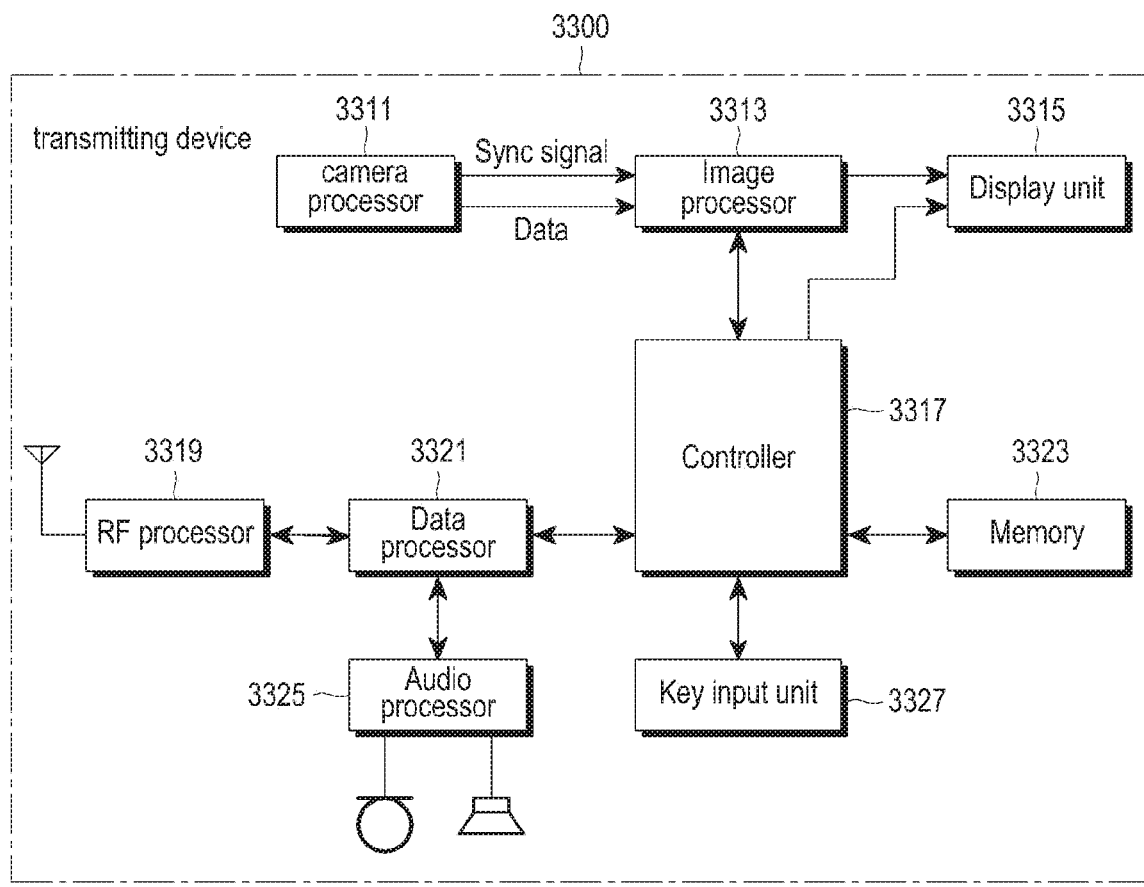
FIG. 33 is a view schematically illustrating an example of an internal structure of a transmitting device in a wireless communication system according to an embodiment of the present disclosure.

FIG. 33 is a view schematically illustrating an example of an internal structure of a transmitting device in a wireless communication system according to an embodiment of the present disclosure.

Referring to FIG. 33, a transmitting device 3300 may connect to an external electronic device (not shown in FIG. 33) using at least one of a communication module, a connector, and an earphone connection jack. Such external electronic device may include one of various devices detachably coupled to the transmitting device 3300 to establish a wired connection, e.g., an earphone, an external speaker, a universal serial bus (USB) memory, a charger, a cradle/dock, a digital media broadcast (DMB) antenna, a mobile payment-related device, a health-care device (e.g., a blood glucose meter), a game player, or a car navigation device.

Further, the external electronic device may be a wirelessly connectable Bluetooth communication device, near field communication (NFC) device, Wi-Fi direct communication device, or a wireless AP. The transmitting device 3300 may wiredly or wirelessly connect to one of a server or other communication devices, e.g., a cellular phone, smartphone, tablet PC, desktop PC, and a server.

The transmitting device 3300 includes a camera processor 3311, an image processor 3313, a display unit 3315, a controller 3317, a radio frequency (RF) processor 3319, a data processor 3321, a memory 3323, an audio processor 3325, and a key input unit 3327.

The RF processor 3319 performs a wireless communication function of the transmitting device 3300. The RF processor 3319 includes an RF transmitter up-converting and amplifying the frequency of a signal transmitted and an RF receiver low-noise amplifying a signal received and down-converting the frequency of the signal.

The data processor 3321 may include a transmitter coding and modulating the transmitted signal and a receiver decoding and demodulating the received signal. That is, the data processor 3321 may include a modem (MODEM) and a codec (CODEC). Here, the CODEC includes a data CODEC processing, e.g., packet data, and an audio CODEC processing audio signals, e.g., voice.

The audio processor 3325 performs a function of playing a reception audio signal output from the audio CODEC of the data processor 3321 or transmitting a transmission audio signal produced from a microphone to the audio CODEC of the data processor 3321.

The key input unit 3327 may include keys for inputting numerical and character information and function keys for configuring various functions.

The memory 3323 may include a program memory and a data memory. The program memory may store programs related to the operations of transmitting and receiving data based on sound signals according to an embodiment of the present disclosure and programs for controlling general operations of the transmitting device 3300. Further the data memory performs a function for temporarily storing data produced while performing the programs.

The memory 3323 may be implemented as any data storage device, such as a read-only memory (ROM), a random access memory (RAM), or a memory card (e.g., a secure digital (SD) card or Memory Stick). The memory 3323 may include a non-volatile memory, a volatile memory, a hard disk drive (HDD), or a solid state drive (SSD).

Further, the memory 3323 may store applications of various functions, such as navigation, video call, game, or time-based alarm applications, images for providing graphical user interfaces (GUI) related thereto, databases or data related to methods for processing user information, documents, or touch inputs, operating programs or background images (menu screen or idle screen) necessary for driving the transmitting device 3300, and images captured by the camera processor 3311.

Further, the memory 3323 may be a medium capable of reading through a machine (e.g., a computer), and the term "machine-readable medium" may be defined as a medium providing data to the machine to enable the machine to perform a particular function. Further, the memory 3323 may include a non-volatile medium and a volatile medium. All the media should be of such a type to enable commands transferred by the media to be detected by the machine-readable physical mechanism.

The machine-readable media include, but are not limited to, at least one of floppy disks, flexible disks, hard disks, magnetic tapes, compact disc read-only memories (CD-ROMs), optical discs, punch cards, paper tapes, RAMs, programmable read-only memories (PROMs), erasable programmable read-only memories (EPROMs), and flash-erasable programmable read-only memories (flash-EPROMs).

The controller 3317 performs the function of controlling the overall operation of the transmitting device 3300. The controller 3317 performs operations related to the operations of transmitting and receiving data based on sound signals according to an embodiment of the present disclosure. Here, the operations related to the operations of transmitting and receiving data based on sound signals according to an embodiment of the present disclosure are the same as those described above in connection with FIGS. 1 to 32*b*, and no detailed description thereof is given here.

The camera processor 3311 includes a camera sensor that captures image data and converts captured optical signals into electrical signals and a signal processor that converts analog image signals captured by the camera sensor into digital data. Here, the camera sensor is assumed to be a charge coupled device (CCD) or complementary metal-oxide-semiconductor (CMOS) sensor, and the signal processor may be implemented as a digital signal processor (DSP). Further, the camera sensor and the signal processor may be implemented integrally or separately.

The image processor 3313 performs image signal processing (ISP) to display image signals output from the camera processor 3311 on the display unit 3315, and the ISP performs functions such as gamma correction, interpolation, spatial alteration, image effects, image scaling, automatic white balancing (AWB), automatic exposure (AE), and automatic focusing (AF). Accordingly, the image processor 3313 processes image signals output from the camera processor 3311 in frame units and outputs the frame image data to be suited for the characteristics and size of the display unit 3315.

Further, the image processor 3313 includes an image codec and compresses frame image data displayed on the display unit 3315 in a preset manner or restores the compressed frame image data to the original frame image data. Here, the image codec may be a joint photographic experts group (JPEG) codec, a moving picture experts group 4 (MPEG-4) codec, or a Wavelet codec. The image processor 3313 is assumed to have an on-screen display (OSD) function and may output on-screen display data according to the size of the screen displayed under the control of the controller 3317.

The display unit 3315 displays image signals output from the image processor 3313 on the screen and displays user data output from the controller 3317. Here, the display unit 3315 may use a liquid crystal display (LCD) in which case the display unit 1815 may include an LCD controller, a memory able to store image data, and an LCD display device. Here, where the LCD is implemented in a touchscreen manner, the LCD may be operated as an input unit, and the display unit 3315 may display keys such as the key input unit 3327.

Where the display unit 3315 is implemented as a touchscreen, the display unit 3315 may output, to the controller 3317, analog signals corresponding to at least one user input entered to the user graphic interface.

The display unit 3315 may receive at least one user input through the user's body (e.g., his thumb or a finger) or the key input unit 3327 (e.g., a stylus pen or electronic pen).

The display unit 3315 may receive a continuous movement (e.g., a drag input) of one touch. The display unit 3315 may output an analog signal corresponding to the continuous movement of the touch entered to the controller 3317.

According to an embodiment of the present disclosure, the touch is not limited to a contact between the touchscreen, i.e., the display unit 3315, and a finger or key input unit 3327, and rather may include a contactless one (for example, the case where the user input means is positioned within a recognition distance (e.g., 1 cm) where the user input means may be detected without a direct contact with the display unit 3315). The distance or interval within which the user input means may be recognized on the display unit 3315 may be varied depending on the performance or structure of the displaying unit 3315. In particular, the display unit 3315 may be configured to output values (including, e.g., voltage values or current values as analog values) detected by a direct touch event and an indirect touch event (i.e., a hovering event), which are different from each other, so that the direct touch event and the hovering event may be detected distinct from each other.

The display unit 3315 may be implemented, e.g., in a resistive, capacitive, infrared, or acoustic wave manner, or in a combination thereof.

Further, the display unit 3315 may include at least two touch panels each capable of sensing touches or approaches of a finger and the key input unit 3327 to be able to receive each of inputs by the finger and the key input unit 3327. At least two touch panels may provide different output values to the controller 3317, and the controller 3317 may recognize the values input from the at least two touchscreen panels as different from each other to identify whether the inputs from the key input unit 3327 are ones by the finger or the key input unit 3327.

The controller 3317 may convert analog signals input from the display unit 3315 into digital signals, and the controller 3317 may control the display unit 3315 using the digital signals. As an example, in response to a direct touch event or hovering event, the controller 3317 may enable an object or shortcut icon (not shown in FIG. 33) displayed on the display unit 3315 to be selected or executed.

The controller 3317 may detect a value (e.g., a current value) output through the display unit 3315 to identify a hovering interval or distance as well as the position of the user input and may convert the identified distance value into a digital signal (e.g., the Z coordinate). Further, the controller 3317 may detect the pressure at which the user input means presses the display unit 3315 by detecting a value (e.g., a current value) output through the display unit 3315 and may convert the detected pressure value into a digital signal.

Although FIG. 33 illustrates the case where in the transmitting device 3300, the camera processor 3311, the image processor 3313, the display unit 3315, the controller 3317, the RF processor 3319, the data processor 3321, the memory 3323, the audio processor 3325, and the key input unit 3327 are implemented in separate units, the transmitting device 3300 may also be implemented in such a manner that at least two of the camera processor 3311, the image processor 3313, the display unit 3315, the controller 3317, the RF processor 3319, the data processor 3321, the memory 3323, the audio processor 3325, and the key input unit 3327 are integrated together.

In contrast, the transmitting device 3300 may also be implemented in a single processor.

An example of an internal structure of a transmitting device in a wireless communication system according to an embodiment of the present disclosure has been described with reference to FIG. 33. Next described with reference to FIG. 34 is an example of an internal structure of a receiving device in a wireless communication system according to an embodiment of the present disclosure.

Figure 34:
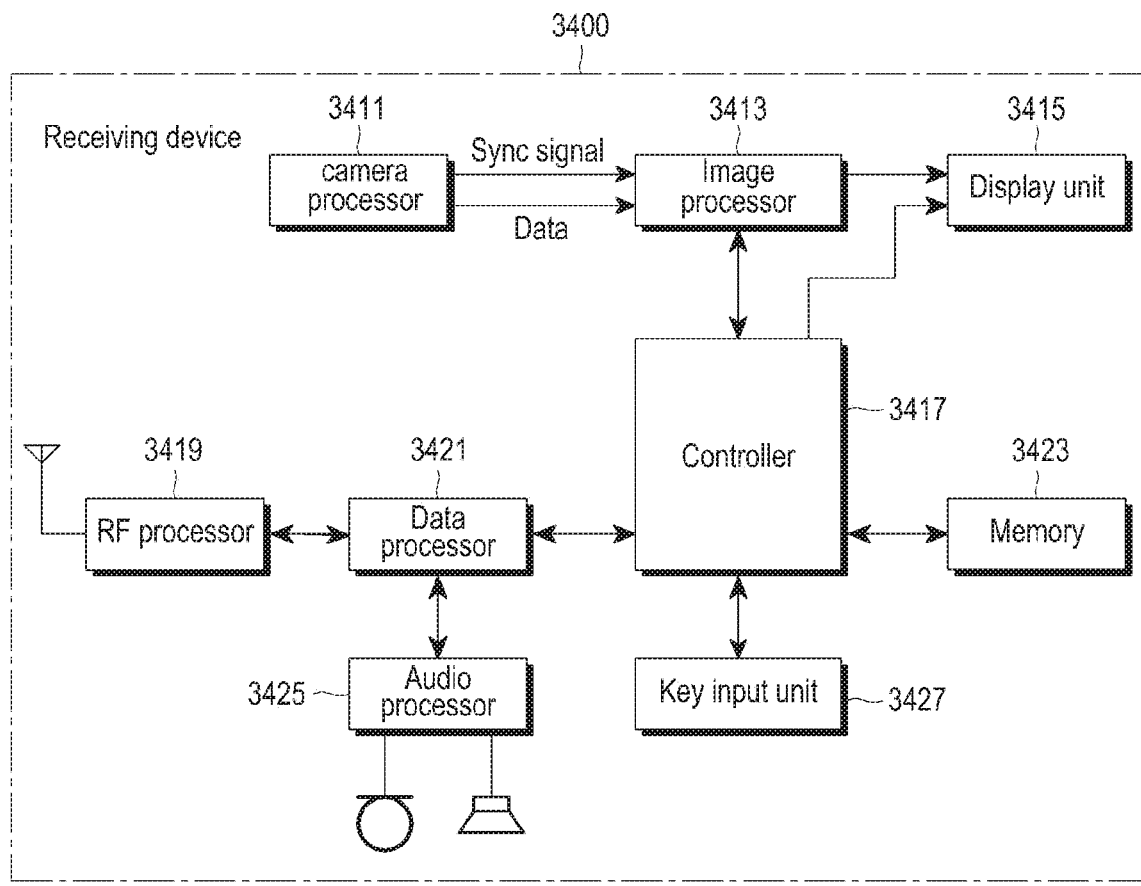
FIG. 34 is a view schematically illustrating an example of an internal structure of a receiving device in a wireless communication system according to an embodiment of the present disclosure.

FIG. 34 is a view schematically illustrating an example of an internal structure of a receiving device in a wireless communication system according to an embodiment of the present disclosure.

Referring to FIG. 34, the receiving device 3400 includes a camera processor 3411, an image processor 3413, a display unit 3415, a controller 3417, an RF processor 3419, a data processor 3421, a memory 3423, an audio processor 3425, and a key input unit 3427.

The camera processor 3411, the image processor 3413, the display unit 3415, the controller 3417, the RF processor 3419, the data processor 3421, the memory 3423, the audio processor 3425, and the key input unit 3427 perform similar operations to the camera processor 3311, the image processor 3313, the display unit 3315, the controller 3317, the RF processor 3319, the data processor 3321, the memory 3323, the audio processor 3325, and the key input unit 3327 described with reference to FIG. 33, and no detailed description thereof is given.

However, the memory 3423 and the controller 3417 are described below in detail.

The memory 3423 may include a program memory and a data memory. The program memory may store programs related to the operations of transmitting and receiving data based on sound signals according to an embodiment of the present disclosure and programs for controlling general operations of the receiving device 3400. Further the data memory performs a function for temporarily storing data produced while performing the programs.

Further, the controller 3417 performs the function of controlling the overall operation of the receiving device 3400. The controller 3417 performs operations related to the operations of transmitting and receiving data based on sound signals according to an embodiment of the present disclosure. Here, the operations related to the operations of transmitting and receiving data based on sound signals according to an embodiment of the present disclosure are the same as those described above in connection with FIGS. 1 to 32b, and no detailed description thereof is given here.

Meanwhile, although FIG. 34 illustrates the case where in the receiving device 3400, the camera processor 3411, the image processor 3413, the display unit 3415, the controller 3417, the RF processor 3419, the data processor 3421, the memory 3423, the audio processor 3425, and the key input unit 3427 are implemented in separate units, the receiving device 3400 may also be implemented in such a manner that at least two of the camera processor 3411, the image processor 3413, the display unit 3415, the controller 3417, the RF processor 3419, the data processor 3421, the memory 3423, the audio processor 3425, and the key input unit 3427 are integrated together.

In contrast, the receiving device 3400 may also be implemented in a single processor.

An example of an internal structure of a receiving device in a wireless communication system according to an embodiment of the present disclosure has been described with reference to FIG. 34. Next described with reference to FIG. 35 is another example of an internal structure of a transmitting device in a wireless communication system according to an embodiment of the present disclosure.

Figure 35:
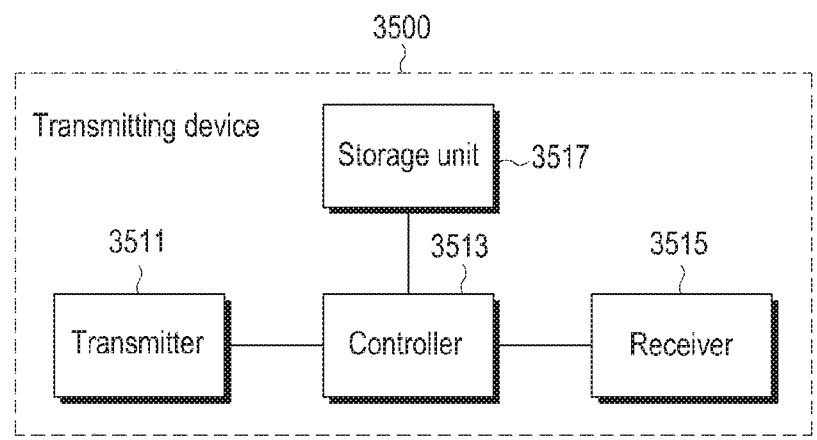
FIG. 35 is a view schematically illustrating another example of an internal structure of a transmitting device in a wireless communication system according to an embodiment of the present disclosure.

FIG. 35 is a view schematically illustrating another example of an internal structure of a transmitting device in a wireless communication system according to an embodiment of the present disclosure.

Referring to FIG. 35, a transmitting device 3500 includes a transmitter 3511, a controller 3513, a receiver 3515, and a storage unit 3517.

The controller 3513 controls the overall operation of the transmitting device 3500, particularly, operations related to the operations of transmitting and receiving data based on sound signals according to an embodiment of the present disclosure. The operations related to the operations of transmitting and receiving data based on sound signals according to an embodiment of the present disclosure are the same as those described above in connection with FIGS. 1 to 32b, and no detailed description thereof is given here.

The transmitter 3511 transmits various signals and messages to, e.g., a receiving device included in the wireless communication system under the control of the controller 3513. Here, various signals and messages transmitted by the transmitter 3511 are the same as those described above in connection with FIGS. 1 to 32b, and no detailed description thereof is repeated.

Further, the receiver 3515 receives various signals and messages from, e.g., a receiving device included in the wireless communication system under the control of the controller 3513. Here, various signals and messages received by the receiver 3515 are the same as those described above in connection with FIGS. 1 to 32*b*, and no detailed description thereof is repeated.

The storage unit 3517 stores programs and various data related to the operations related to the operations of transmitting and receiving data based on sound signals, according to an embodiment of the present disclosure, performed by the transmitting device 3500 under the control of the controller 3513.

The storage unit 3517 stores various signals and messages received from, e.g., the receiving device, by the receiver 3515.

Meanwhile, although FIG. 35 illustrates a case where, in the transmitting device 3500, the transmitter 3511, the controller 3513, the receiver 3515, and the storage unit 3517 are implemented in separate units, the transmitting device 3500 may also be implemented so that at least two of the transmitter 3511, the controller 3513, the receiver 3515, and the storage unit 3517 are integrated together.

Further, the transmitting device 3500 may also be implemented in a single processor.

Another example of an internal structure of a transmitting device in a wireless communication system according to an embodiment of the present disclosure has been described with reference to FIG. 35. Next described with reference to FIG. 36 is another example of an internal structure of a receiving device in a wireless communication system according to an embodiment of the present disclosure.

Figure 36:
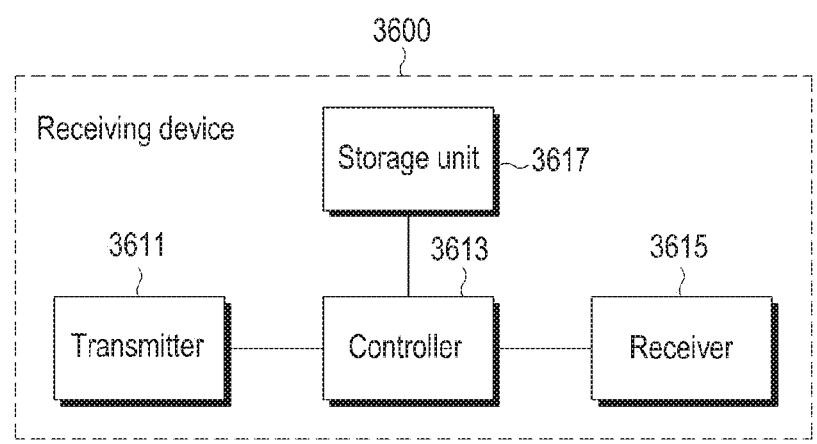
FIG. 36 is a view schematically illustrating another example of an internal structure of a receiving device in a wireless communication system according to an embodiment of the present disclosure.

FIG. 36 is a view schematically illustrating another example of an internal structure of a receiving device in a wireless communication system according to an embodiment of the present disclosure.

Referring to FIG. 36, a receiving device 3600 includes a transmitter 3611, a controller 3613, a receiver 3615, and a storage unit 3617.

The controller 3613 controls the overall operation of the receiving device 3600, particularly, operations related to the operations of transmitting and receiving data based on sound signals according to an embodiment of the present disclosure. The operations related to the operations of transmitting and receiving data based on sound signals according to an embodiment of the present disclosure are the same as those described above in connection with FIGS. 1 to 32*b*, and no detailed description thereof is given here.

The transmitter 3611 transmits various signals and messages to, e.g., a transmitting device included in the wireless communication system under the control of the controller 3613. Here, various signals and messages transmitted by the transmitter 3611 are the same as those described above in connection with FIGS. 1 to 32*b*, and no detailed description thereof is repeated.

Further, the receiver 3615 receives various signals and messages from, e.g., a transmitting device included in the wireless communication system under the control of the controller 3613. Here, various signals and messages received by the receiver 3615 are the same as those described above in connection with FIGS. 1 to 32*b*, and no detailed description thereof is repeated.

The storage unit 3617 stores programs and various data related to the operations related to the operations of transmitting and receiving data based on sound signals, according to an embodiment of the present disclosure, performed by the receiving device 3600 under the control of the controller 3613.

The storage unit 3617 stores various signals and messages received from, e.g., the transmitting device, by the receiver 3615.

Meanwhile, although FIG. 36 illustrates a case where, in the receiving device 3600, the transmitter 3611, the controller 3613, the receiver 3615, and the storage unit 3617 are implemented in separate units, the receiving device 3600 may also be implemented so that at least two of the transmitter 3611, the controller 3613, the receiver 3615, and the storage unit 3617 are integrated together.

Further, the receiving device 3600 may also be implemented in a single processor.

Another example of an internal structure of a receiving device in a wireless communication system according to an embodiment of the present disclosure has been described with reference to FIG. 36. Next described with reference to FIG. 37 is an internal structure of an AP in a wireless communication system according to an embodiment of the present disclosure.

Figure 37:
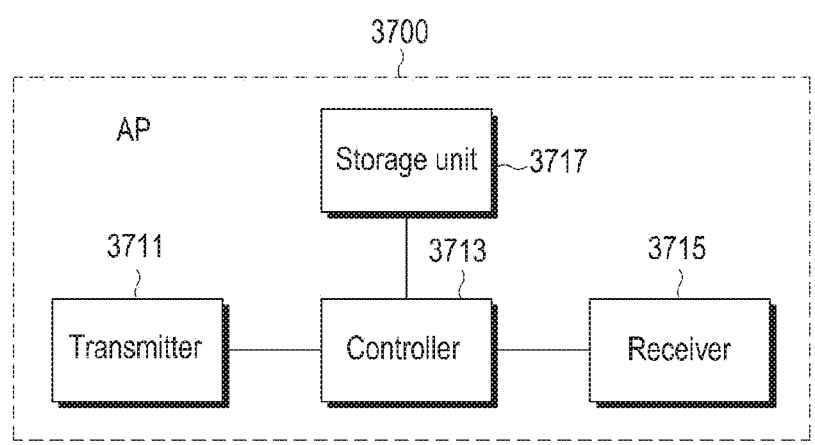
FIG. 37 is a view schematically illustrating an internal structure of an AP in a wireless communication system according to an embodiment of the present disclosure.

FIG. 37 is a view schematically illustrating an internal structure of an AP in a wireless communication system according to an embodiment of the present disclosure.

Referring to FIG. 37, an AP 3700 includes a transmitter 3711, a controller 3713, a receiver 3715, and a storage unit 3717.

The controller 3713 controls the overall operation of the AP 3700, particularly, operations related to the operations of transmitting and receiving data based on sound signals according to an embodiment of the present disclosure. The operations related to the operations of transmitting and receiving data based on sound signals according to an embodiment of the present disclosure are the same as those described above in connection with FIGS. 1 to 32*b*, and no detailed description thereof is given here.

The transmitter 3711 transmits various signals and messages to, e.g., a transmitting device and receiving device included in the wireless communication system under the control of the controller 3713. Here, various signals and messages transmitted by the transmitter 3711 are the same as those described above in connection with FIGS. 1 to 32*b*, and no detailed description thereof is repeated.

Further, the receiver 3715 receives various signals and messages to, e.g., a transmitting device and receiving device included in the wireless communication system under the control of the controller 3713. Here, various signals and messages received by the receiver 3715 are the same as those described above in connection with FIGS. 1 to 32*b*, and no detailed description thereof is repeated.

The storage unit 3717 stores programs and various data related to the operations related to the operations of transmitting and receiving data based on sound signals, according to an embodiment of the present disclosure, performed by the AP 3700 under the control of the controller 3713.

The storage unit 3717 stores various signals and messages received from, e.g., the transmitting device and receiving device, by the receiver 3715.

Meanwhile, although FIG. 37 illustrates a case where, in the AP 3700, the transmitter 3711, the controller 3713, the receiver 3715, and the storage unit 3717 are implemented in separate units, the AP 3700 may also be implemented so that at least two of the transmitter 3711, the controller 3713, the receiver 3715, and the storage unit 3717 are integrated together.

Further, the AP 3700 may be implemented in a single processor.

Particular aspects of the present disclosure may be implemented as computer readable codes in a computer readable recording medium. The computer readable recording medium is a data storage device that may store data readable by a computer system. Examples of the computer readable recording medium may include read only memories (ROMs), random access memories (RAMs), CD-ROMs, magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner Functional programs, codes, and code segments to attain various embodiments of the present disclosure may be readily interpreted by skilled programmers in the art to which the present disclosure pertains.

The apparatuses and methods according to embodiments of the present disclosure may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer). The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this present disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for transmitting data based on a sound signal, by a transmitting device, in a wireless communication system, the method comprising:
   transmitting a sound packet corresponding to the data,
   wherein the sound packet includes at least one sound symbol, and each of the at least one sound symbol includes at least one sound sub symbol,
   wherein the wireless communication system is configured to support a plurality of sound symbol types, and
   wherein each of the plurality of sound symbol types is mapped to a preset data value.

2. The method of claim 1, wherein a number of the at least one sound sub symbol included in the sound symbol is determined based on a data reception distance within which receiving the sound packet is possible.

3. The method of claim 1, wherein a length of the sound symbol is determined based on a data reception distance within which receiving the sound packet is possible.

4. The method of claim 3, wherein the data reception distance includes a first data reception distance, a second data reception distance, and a third data reception distance,
   wherein the first data reception distance is a reference data reception distance,
   wherein the second data reception distance is not more than the first data reception distance,
   wherein the third data reception distance exceeds the first data reception distance, and
   wherein a sound symbol targeting the first data reception distance is longer in length than a sound symbol targeting the second data reception distance and is equal or shorter in length than a sound symbol targeting the third data reception distance.

5. The method of claim 1, wherein a volume of the sound symbol is determined based on a data reception distance within which receiving the sound packet is possible.

6. The method of claim 5, wherein the data reception distance includes a first data reception distance, a second data reception distance, and a third data reception distance,
   wherein the first data reception distance is a reference data reception distance,
   wherein the second data reception distance is not more than the first data reception distance,
   wherein the third data reception distance exceeds the first data reception distance, and
   wherein a sound symbol targeting the first data reception distance is larger in volume than a sound symbol targeting the second data reception distance and is equal or smaller in volume than a sound symbol targeting the third data reception distance.

7. The method of claim 1, further comprising:
   transmitting a message including device state information about the transmitting device,
   wherein the device state information includes at least one of a parameter indicating whether the transmitting device is driven, a parameter indicating whether the transmitting device is connected with an access point (AP), a parameter indicating whether the transmitting device needs to connect to the AP, a parameter indicating whether the transmitting device needs a peer-to-peer (P2P) connection, a parameter indicating whether the transmitting device is a device that is first powered and driven, or a parameter indicating whether an account is required.

8. A method for receiving data based on a sound signal, by a receiving device, in a wireless communication system, the method comprising:
- receiving a sound packet corresponding to the data,
- wherein the sound packet includes at least one sound symbol, and each of the at least one sound symbol includes at least one sound sub symbol,
- wherein the wireless communication system is configured to support a plurality of sound symbol types, and
- wherein each of the plurality of sound symbol types is mapped to a preset data value.

9. The method of claim 8, wherein a length of the sound symbol is determined based on a data reception distance within which receiving the sound packet is possible.

10. The method of claim 9, wherein the data reception distance includes a first data reception distance, a second data reception distance, and a third data reception distance,
- wherein the first data reception distance is a reference data reception distance,
- wherein the second data reception distance is not more than the first data reception distance,
- wherein the third data reception distance exceeds the first data reception distance, and
- wherein a sound symbol targeting the first data reception distance is longer in length than a sound symbol targeting the second data reception distance and is equal or shorter in length than a sound symbol targeting the third data reception distance.

11. The method of claim 8, wherein a volume of the sound symbol is determined based on a data reception distance within which receiving the sound packet is possible.

12. The method of claim 11, wherein the data reception distance includes a first data reception distance, a second data reception distance, and a third data reception distance,
- wherein the first data reception distance is a reference data reception distance,
- wherein the second data reception distance is not more than the first data reception distance,
- wherein the third data reception distance exceeds the first data reception distance, and
- wherein a sound symbol targeting the first data reception distance is larger in volume than a sound symbol targeting the second data reception distance and is equal or smaller in volume than a sound symbol targeting the third data reception distance.

13. A transmitting device to transmit data based on a sound signal in a wireless communication system, the device comprising:
- a transmitter; and
- a controller coupled with the transmitter and configured to transmit a sound packet corresponding to the data,
- wherein the sound packet includes at least one sound symbol, and each of the at least one sound symbol includes at least one sound sub symbol,
- wherein the wireless communication system is configured to support a plurality of sound symbol types, and
- wherein each of the plurality of sound symbol types is mapped to a preset data value.

14. The device of claim 13, wherein a number of the at least one sound sub symbol included in the sound symbol is determined based on a data reception distance within which receiving the sound packet is possible.

15. The device of claim 13, wherein a length of the sound symbol is determined based on a data reception distance within which receiving the sound packet is possible.

16. The device of claim 15, wherein the data reception distance includes a first data reception distance, a second data reception distance, and a third data reception distance,
- wherein the first data reception distance is a reference data reception distance,
- wherein the second data reception distance is not more than the first data reception distance,
- wherein the third data reception distance exceeds the first data reception distance, and
- wherein a sound symbol targeting the first data reception distance is longer in length than a sound symbol targeting the second data reception distance and is equal or shorter in length than a sound symbol targeting the third data reception distance.

17. The device of claim 13, wherein a volume of the sound symbol is determined based on a data reception distance within which receiving the sound packet is possible.

18. The device of claim 17, wherein the data reception distance includes a first data reception distance, a second data reception distance, and a third data reception distance,
- wherein the first data reception distance is a reference data reception distance,
- wherein the second data reception distance is not more than the first data reception distance,
- wherein the third data reception distance exceeds the first data reception distance, and
- wherein a sound symbol targeting the first data reception distance is larger in volume than a sound symbol targeting the second data reception distance and is equal or smaller in volume than a sound symbol targeting the third data reception distance.

19. The device of claim 13, wherein the controller is further configured to transmit a message including device state information about the transmitting device,
- wherein the device state information includes at least one of a parameter indicating whether the transmitting device is driven, a parameter indicating whether the transmitting device is connected with an access point (AP), a parameter indicating whether the transmitting device needs to connect to the AP, a parameter indicating whether the transmitting device needs a peer-to-peer (P2P) connection, a parameter indicating whether the transmitting device is a device that is first powered and driven, or a parameter indicating whether an account is required.

20. A receiving device to receive data based on a sound signal in a wireless communication system, the device comprising:
- a receiver; and
- a controller coupled with the receiver and configured to receive a sound packet corresponding to the data,
- wherein the sound packet includes at least one sound symbol,
- wherein each of the at least one sound symbol includes at least one sound sub symbol,
- wherein the wireless communication system is configured to support a plurality of sound symbol types, and
- wherein each of the plurality of sound symbol types is mapped to a preset data value.

\* \* \* \* \*